US012668135B2

(12) United States Patent
     Tyerman et al.

(10) Patent No.: US 12,668,135 B2
(45) Date of Patent: Jun. 30, 2026

(54) BATTERY PACKS FOR UTILITY VEHICLE ELECTRIC DRIVETRAINS

(71) Applicant: Hexagon Purus North America Holdings Inc., Costa Mesa, CA (US)

(72) Inventors: Landon Tyerman, Kelowna (CA); Eric M. Coupal-Sikes, Kelowna (CA)

(73) Assignee: Hexagon Purus North America Holdings Inc., Costa Mesa, CA (US)

( * ) Notice: Subject to any disclaimer, the term of this patent is extended or adjusted under 35 U.S.C. 154(b) by 290 days.

(21) Appl. No.: 18/425,704

(22) Filed: Jan. 29, 2024

(65) Prior Publication Data

US 2024/0166060 A1     May 23, 2024

Related U.S. Application Data

(63) Continuation of application No. PCT/US2022/040950, filed on Aug. 19, 2022.
     (Continued)

(51) Int. Cl.
     *B60L 50/64*        (2019.01)
     *B60K 1/04*         (2019.01)
     (Continued)

(52) U.S. Cl.
     CPC ................ *B60L 50/64* (2019.02); *B60K 1/04* (2013.01); *B60L 58/18* (2019.02);
     (Continued)

(58) Field of Classification Search
     CPC .......... B60L 50/64; B60L 58/18; B60K 1/04; B60K 2001/005; B60K 2001/0438; H01M 10/613; H01M 10/625; H01M 10/656; H01M 10/425; H01M 50/249; H01M 50/262; H01M 50/242; H01M 50/204; H01M 50/271; H01M 2010/4271; H01M 2220/20

See application file for complete search history.

(56) References Cited

U.S. PATENT DOCUMENTS

| | | |
|---|---|---|
| 1,551,594 A | 9/1925 | Maurice |
| 1,678,033 A | 7/1928 | Brumbaugh |
| (Continued) | | |

FOREIGN PATENT DOCUMENTS

| | | |
|---|---|---|
| AU | 2018232986 | 4/2019 |
| CN | 2647706 | 10/2004 |
| (Continued) | | |

OTHER PUBLICATIONS

Kenworth, "K270E, Zero Emissions", 2020, in 2 pages.
(Continued)

*Primary Examiner* — John D Walters
(74) *Attorney, Agent, or Firm* — Snell & Wilmer LLP

(57)                ABSTRACT

A battery system for an electric vehicle includes a battery assembly including a housing that houses one or more battery cells for storing power for an electric vehicle drive system, the housing having an elongate flat outer shape, wherein the housing has a height, a width, and a length, wherein at least one of the length or the width is at least 5 times the height; and one or more mounting systems for attaching the battery assembly to a frame member of an electric vehicle.

25 Claims, 32 Drawing Sheets

Related U.S. Application Data

(60) Provisional application No. 63/260,613, filed on Aug. 26, 2021.

(51) Int. Cl.

| | |
|---|---|
| *B60L 58/18* | (2019.01) |
| *H01M 10/42* | (2006.01) |
| *H01M 10/613* | (2014.01) |
| *H01M 10/625* | (2014.01) |
| *H01M 10/656* | (2014.01) |
| *H01M 50/204* | (2021.01) |
| *H01M 50/242* | (2021.01) |
| *H01M 50/249* | (2021.01) |
| *H01M 50/262* | (2021.01) |
| *H01M 50/271* | (2021.01) |
| *B60K 1/00* | (2006.01) |

(52) U.S. Cl.

CPC ....... *H01M 10/425* (2013.01); *H01M 10/613* (2015.04); *H01M 10/625* (2015.04); *H01M 10/656* (2015.04); *H01M 50/204* (2021.01); *H01M 50/242* (2021.01); *H01M 50/249* (2021.01); *H01M 50/262* (2021.01); *H01M 50/271* (2021.01); *B60K 2001/005* (2013.01); *B60K 2001/0438* (2013.01); *H01M 2010/4271* (2013.01); *H01M 2220/20* (2013.01)

(56) References Cited

U.S. PATENT DOCUMENTS

| | | | |
|---|---|---|---|
| 3,760,134 A | 9/1973 | McCray | |
| 3,883,794 A | 5/1975 | Sivley | |
| 4,248,323 A | 2/1981 | Gaffney | |
| 4,317,497 A | 3/1982 | Alt et al. | |
| 4,365,681 A | 12/1982 | Singh | |
| 4,435,990 A | 3/1984 | Chalmers | |
| 5,421,600 A | 6/1995 | Jones et al. | |
| 5,460,234 A | 10/1995 | Matsuura et al. | |
| 5,558,949 A | 9/1996 | Iwatsuki et al. | |
| 5,585,205 A | 12/1996 | Kohchi | |
| 5,854,517 A | 12/1998 | Hines | |
| 6,148,928 A | 11/2000 | Spears | |
| 6,188,574 B1 | 2/2001 | Anazawa | |
| 6,443,253 B1 | 9/2002 | Whitehead et al. | |
| 6,547,020 B2 | 4/2003 | Maus et al. | |
| 6,575,258 B1 | 6/2003 | Clemmer | |
| 6,624,610 B1 | 9/2003 | Ono et al. | |
| 6,668,957 B2 | 12/2003 | King | |
| 6,926,027 B1 | 8/2005 | Sorensen | |
| 6,971,657 B2 | 12/2005 | King et al. | |
| 7,051,825 B2 | 5/2006 | Masui et al. | |
| 7,144,039 B2 | 12/2006 | Kawasaki et al. | |
| 7,174,967 B2 | 2/2007 | Raimondo et al. | |
| 7,237,644 B2 | 7/2007 | Matsumoto et al. | |
| 7,398,849 B2 | 7/2008 | Yoshida | |
| 7,507,499 B2 | 3/2009 | Zhou et al. | |
| 7,543,454 B2 | 6/2009 | Harris | |
| 7,686,720 B2 | 3/2010 | Nikolai | |
| 7,854,443 B2 | 12/2010 | Alguera | |
| 7,931,105 B2 | 4/2011 | Sato et al. | |
| 8,037,960 B2 | 10/2011 | Kiya | |
| 8,051,934 B2 | 11/2011 | Kiya et al. | |
| 8,096,708 B2 | 1/2012 | Harrington | |
| 8,122,989 B2 | 2/2012 | Burchett | |
| 8,127,876 B2 | 3/2012 | Phillips | |
| 8,276,697 B2 | 10/2012 | Takasaki | |
| 8,342,279 B1 | 1/2013 | Florus et al. | |
| 8,397,853 B2 | 3/2013 | Stefani et al. | |
| 8,464,817 B2 | 6/2013 | Usami et al. | |
| 8,474,559 B2 | 7/2013 | Sogabe | |
| 8,505,950 B2 | 8/2013 | Kolda | |
| 8,517,126 B2 | 8/2013 | Atarashi | |
| 8,596,685 B2 | 12/2013 | Mauduit et al. | |
| 8,616,319 B2 | 12/2013 | Yokoyama et al. | |
| 8,672,354 B2 | 3/2014 | Kim et al. | |
| 8,701,842 B2 | 4/2014 | Anderson | |
| 8,764,469 B2 | 7/2014 | Lamb | |
| 8,776,927 B2 | 7/2014 | Akazawa et al. | |
| 8,778,527 B2 | 7/2014 | Lee | |
| 8,783,396 B2 | 7/2014 | Bowman | |
| 8,789,635 B2 | 7/2014 | Franzen et al. | |
| 8,794,361 B2 | 8/2014 | Lim et al. | |
| 8,839,901 B1 | 9/2014 | Bradshaw | |
| 8,905,170 B2 | 12/2014 | Kyoden et al. | |
| 9,033,078 B2 | 5/2015 | Fillion et al. | |
| 9,033,085 B1 | 5/2015 | Rawlinson | |
| 9,056,557 B2 | 6/2015 | Kedzierski | |
| 9,061,712 B2 | 6/2015 | Patberg et al. | |
| 9,077,019 B2 | 7/2015 | Kosaki et al. | |
| 9,085,226 B2 | 7/2015 | Matsuda et al. | |
| 9,103,092 B2 | 8/2015 | Ueda | |
| 9,108,497 B2 | 8/2015 | Harrison, III et al. | |
| 9,108,691 B2 | 8/2015 | Fanourakis et al. | |
| 9,205,749 B2 | 12/2015 | Sakamoto | |
| 9,227,582 B2 | 1/2016 | Katayama et al. | |
| 9,283,838 B2 | 3/2016 | Ohashi | |
| 9,315,173 B1 | 4/2016 | Gray et al. | |
| 9,321,352 B2 | 4/2016 | Pierce et al. | |
| 9,409,495 B2 | 8/2016 | Kobayashi | |
| 9,457,652 B2 | 10/2016 | Sloan et al. | |
| 9,586,490 B2 | 3/2017 | Yamamaru et al. | |
| 9,636,984 B1 | 5/2017 | Baccouche et al. | |
| 9,682,618 B2 | 6/2017 | Baik et al. | |
| 9,776,665 B2 | 10/2017 | Garay et al. | |
| 9,812,685 B2 | 11/2017 | Nozaki et al. | |
| 9,879,802 B2 | 1/2018 | Getts | |
| 9,884,545 B1 | 2/2018 | Addanki et al. | |
| 9,884,552 B2 | 2/2018 | Sloan et al. | |
| 9,887,570 B2 | 2/2018 | Johnsen et al. | |
| 9,902,348 B2 | 2/2018 | Takeda | |
| 9,914,355 B2 | 3/2018 | Sloan et al. | |
| 10,000,908 B2 | 6/2018 | Ota et al. | |
| 10,017,037 B2 | 7/2018 | Newman et al. | |
| 10,121,609 B2 | 11/2018 | Coursol | |
| 10,160,344 B2 | 12/2018 | Newman | |
| 10,166,883 B2 | 1/2019 | Brendecke et al. | |
| 10,177,356 B1 | 1/2019 | Yang et al. | |
| 10,183,698 B2 | 1/2019 | Ta et al. | |
| 10,193,112 B2 | 1/2019 | Zimbru, Jr. et al. | |
| 10,199,781 B2 | 2/2019 | Deatherage | |
| 10,201,913 B2 | 2/2019 | McNeilus et al. | |
| 10,236,496 B2 | 3/2019 | Nakayama et al. | |
| 10,245,972 B2 | 4/2019 | Healy et al. | |
| 10,259,329 B2 | 4/2019 | Hosaka et al. | |
| 10,308,132 B2 | 6/2019 | Milton et al. | |
| 10,358,023 B2 | 7/2019 | Hegewald et al. | |
| 10,358,024 B2 | 7/2019 | Yugami et al. | |
| 10,414,351 B2 | 9/2019 | Katano | |
| 10,421,345 B2 | 9/2019 | Kerspe et al. | |
| 10,427,627 B2 | 10/2019 | Fukazu et al. | |
| 10,457,156 B2 | 10/2019 | Takizawa et al. | |
| 10,464,613 B2 | 11/2019 | Okura | |
| 10,486,515 B2 | 11/2019 | Saeki | |
| 10,493,837 B1 | 12/2019 | Angelo et al. | |
| 10,516,146 B2 | 12/2019 | Fees et al. | |
| 10,543,796 B2 | 1/2020 | Isafushi et al. | |
| 10,559,858 B2 | 2/2020 | Goitsuka et al. | |
| 10,569,634 B2 | 2/2020 | Dawley | |
| 10,583,746 B2 | 3/2020 | Ogaki et al. | |
| 10,589,788 B1 | 3/2020 | Milton et al. | |
| 10,589,797 B2 | 3/2020 | Milton et al. | |
| 10,604,188 B2 | 3/2020 | Yoshii | |
| 10,611,408 B2 | 4/2020 | Fritz et al. | |
| 10,641,431 B2 | 5/2020 | Mallick et al. | |
| 10,654,530 B2 | 5/2020 | Milton et al. | |
| 10,661,680 B2 | 5/2020 | Milton et al. | |
| 10,661,844 B2 | 5/2020 | Milton et al. | |
| 10,668,807 B2 | 6/2020 | Milton et al. | |
| 10,670,191 B2 | 6/2020 | Yeggy | |
| 10,688,856 B2 | 6/2020 | Kasai et al. | |
| 10,688,857 B2 | 6/2020 | Tsuyuzaki et al. | |
| 10,696,155 B2 | 6/2020 | Sloan et al. | |

(56) References Cited

U.S. PATENT DOCUMENTS

| | | |
|---|---|---|
| 10,696,251 B2 | 6/2020 | Muramatsu et al. |
| 10,703,416 B2 | 7/2020 | Okura et al. |
| 10,752,102 B2 | 8/2020 | Lampsa et al. |
| 10,823,333 B2 | 11/2020 | Criel et al. |
| 10,843,677 B1 | 11/2020 | Paradis |
| 10,899,214 B2 | 1/2021 | Sloan et al. |
| 10,998,595 B2 * | 5/2021 | Winger .................. B60L 58/19 |
| 11,040,610 B2 | 6/2021 | Sloan et al. |
| 11,043,707 B2 | 6/2021 | Sloan et al. |
| 11,043,714 B2 * | 6/2021 | Sloan ...................... B60K 1/04 |
| 11,046,192 B2 | 6/2021 | Aufdencamp |
| 11,110,786 B2 | 9/2021 | Loacker |
| 11,124,076 B1 | 9/2021 | Borghi |
| 11,155,148 B2 | 10/2021 | Chung et al. |
| 11,312,221 B2 | 4/2022 | Sloan et al. |
| 11,345,331 B2 | 5/2022 | Mckibben et al. |
| 11,465,482 B2 | 10/2022 | Menon et al. |
| 11,498,435 B2 | 11/2022 | Herbert et al. |
| 11,652,250 B2 | 5/2023 | Sloan et al. |
| 11,685,268 B2 | 6/2023 | Sjohom |
| 11,712,937 B1 | 8/2023 | Daugherty |
| 11,718,194 B2 | 8/2023 | Miler |
| 11,772,474 B2 | 10/2023 | Sloan et al. |
| 11,776,335 B1 | 10/2023 | Schubert et al. |
| 11,780,337 B2 | 10/2023 | Sloan et al. |
| 11,904,676 B2 | 2/2024 | Blomstrand |
| 11,919,343 B2 | 3/2024 | McKibben et al. |
| 11,926,207 B2 | 3/2024 | McKibben et al. |
| 11,938,804 B2 | 3/2024 | Andersson |
| 12,070,996 B2 | 8/2024 | Kvalden |
| 12,157,362 B2 | 12/2024 | Sloan et al. |
| 12,403,757 B2 * | 9/2025 | Kumagai ............... B62D 21/02 |
| 12,502,942 B1 * | 12/2025 | Murphy .................. B60K 1/04 |
| 2004/0134699 A1 | 7/2004 | Shimizu |
| 2004/0178602 A1 | 9/2004 | King et al. |
| 2004/0231831 A1 | 11/2004 | Houck et al. |
| 2005/0162015 A1 | 7/2005 | Yamaguchi et al. |
| 2005/0218136 A1 | 10/2005 | Kotani et al. |
| 2006/0102398 A1 | 5/2006 | Mizuno |
| 2007/0092764 A1 | 4/2007 | Kobayashi |
| 2008/0169139 A1 | 7/2008 | Kramer |
| 2008/0169144 A1 | 7/2008 | DeGrave et al. |
| 2008/0225483 A1 | 9/2008 | Kahn et al. |
| 2008/0258682 A1 | 10/2008 | Li |
| 2009/0014224 A1 | 1/2009 | Rydberg |
| 2009/0136844 A1 | 5/2009 | Watanabe et al. |
| 2009/0201650 A1 | 8/2009 | Hauser et al. |
| 2010/0000816 A1 | 1/2010 | Okada |
| 2010/0062329 A1 | 3/2010 | Muis |
| 2010/0065344 A1 | 3/2010 | Collings, III |
| 2010/0112843 A1 | 5/2010 | Heichal et al. |
| 2010/0163326 A1 | 7/2010 | Takamura et al. |
| 2010/0175940 A1 | 7/2010 | Taneda et al. |
| 2010/0320012 A1 | 12/2010 | van der Stappen et al. |
| 2010/0320040 A1 | 12/2010 | Anderson |
| 2011/0068622 A1 | 3/2011 | Ikeno et al. |
| 2011/0114398 A1 | 5/2011 | Bianco |
| 2011/0260530 A1 | 10/2011 | Steffka et al. |
| 2011/0287287 A1 | 11/2011 | Kang |
| 2012/0055725 A1 | 3/2012 | Mizoguchi et al. |
| 2012/0090907 A1 | 4/2012 | Store et al. |
| 2012/0103714 A1 | 5/2012 | Choi et al. |
| 2012/0160583 A1 | 6/2012 | Rawlinson |
| 2012/0175177 A1 | 7/2012 | Lee et al. |
| 2012/0255799 A1 | 10/2012 | Kohler et al. |
| 2012/0312612 A1 | 12/2012 | Harrision, III et al. |
| 2013/0001384 A1 | 1/2013 | Karlsson et al. |
| 2013/0065099 A1 | 3/2013 | Mishima |
| 2013/0108404 A1 | 5/2013 | Okumura et al. |
| 2013/0108897 A1 | 5/2013 | Christian et al. |
| 2013/0118456 A1 | 5/2013 | Gutscher et al. |
| 2013/0248268 A1 | 9/2013 | Matsuda et al. |
| 2014/0141288 A1 | 5/2014 | Kim et al. |
| 2014/0287284 A1 | 9/2014 | Shibata |
| 2014/0338999 A1 | 11/2014 | Fujii et al. |
| 2014/0367183 A1 | 12/2014 | Matsuda |
| 2015/0194712 A1 | 7/2015 | He et al. |
| 2015/0291056 A1 | 10/2015 | Nozaki |
| 2016/0079795 A1 | 3/2016 | Patterson et al. |
| 2016/0087256 A1 | 3/2016 | Wagner et al. |
| 2016/0190526 A1 | 6/2016 | Yamada et al. |
| 2016/0226041 A1 | 8/2016 | Jackson et al. |
| 2016/0297283 A1 | 10/2016 | Sakamoto et al. |
| 2017/0012506 A1 | 1/2017 | Naito et al. |
| 2017/0225558 A1 | 8/2017 | Newman et al. |
| 2017/0282709 A1 | 10/2017 | Sasaki et al. |
| 2017/0320382 A1 | 11/2017 | Milton et al. |
| 2018/0022389 A1 | 1/2018 | Kageyama et al. |
| 2018/0062125 A1 | 3/2018 | Kaneshige |
| 2018/0145382 A1 | 5/2018 | Harris et al. |
| 2018/0183118 A1 | 6/2018 | Harris et al. |
| 2018/0190960 A1 | 7/2018 | Harris et al. |
| 2018/0201110 A1 | 7/2018 | Yin et al. |
| 2018/0319263 A1 | 11/2018 | Hegewald et al. |
| 2018/0333905 A1 | 11/2018 | Tong et al. |
| 2018/0339594 A1 | 11/2018 | Brown et al. |
| 2018/0370368 A1 | 12/2018 | Kronsteiner et al. |
| 2019/0036181 A1 | 1/2019 | Tokozakura et al. |
| 2019/0061505 A1 | 2/2019 | Cavus et al. |
| 2019/0074495 A1 | 3/2019 | Haeusler et al. |
| 2019/0074497 A1 | 3/2019 | Haeusler et al. |
| 2019/0081298 A1 | 3/2019 | Matecki et al. |
| 2019/0084397 A1 | 3/2019 | Yugami et al. |
| 2019/0181517 A1 | 6/2019 | Kellner et al. |
| 2019/0202312 A1 | 7/2019 | Aufdencamp |
| 2019/0202429 A1 | 7/2019 | Richter et al. |
| 2019/0229314 A1 | 7/2019 | Ribbentrop et al. |
| 2019/0263449 A1 | 8/2019 | Ta et al. |
| 2019/0291560 A1 | 9/2019 | Lampsa et al. |
| 2019/0296541 A1 | 9/2019 | Mensch et al. |
| 2019/0302764 A1 | 10/2019 | Smith et al. |
| 2019/0326573 A1 | 10/2019 | Ozawa et al. |
| 2019/0393571 A1 | 12/2019 | Weicker et al. |
| 2020/0002828 A1 | 1/2020 | Mills et al. |
| 2020/0083573 A1 | 3/2020 | Caliskan et al. |
| 2020/0088299 A1 | 3/2020 | Baumer et al. |
| 2020/0094669 A1 | 3/2020 | DeLizo et al. |
| 2020/0139808 A1 | 5/2020 | Rike |
| 2020/0152938 A1 | 5/2020 | Winger et al. |
| 2020/0156500 A1 | 5/2020 | Huff et al. |
| 2020/0157769 A1 | 5/2020 | Huff et al. |
| 2020/0180848 A1 | 6/2020 | Snyder et al. |
| 2020/0198458 A1 | 6/2020 | Volkmer et al. |
| 2020/0247225 A1 | 8/2020 | Kochi et al. |
| 2020/0259143 A1 | 8/2020 | Sloan et al. |
| 2020/0269642 A1 | 8/2020 | Alguera |
| 2020/0331536 A1 | 10/2020 | Sloan et al. |
| 2020/0335840 A1 | 10/2020 | Sloan et al. |
| 2020/0369228 A1 | 11/2020 | Kageyama et al. |
| 2020/0384854 A1 | 12/2020 | Sloan et al. |
| 2020/0406777 A1 | 12/2020 | Nguyen et al. |
| 2021/0036649 A1 | 2/2021 | Iwazaki |
| 2021/0094400 A1 | 4/2021 | Loacker et al. |
| 2021/0129688 A1 | 5/2021 | Sawada |
| 2021/0155224 A1 | 5/2021 | McKibben et al. |
| 2021/0213821 A1 | 7/2021 | Sloan et al. |
| 2021/0218101 A1 | 7/2021 | Menon et al. |
| 2021/0380001 A1 * | 12/2021 | Hörder .................. B60L 50/66 |
| 2022/0111716 A1 | 4/2022 | McKibben et al. |
| 2022/0274494 A1 | 9/2022 | McKibben et al. |
| 2022/0348113 A1 | 11/2022 | Delrieu |
| 2022/0388392 A1 | 12/2022 | Abbott |
| 2023/0001986 A1 | 1/2023 | Hendriks |
| 2023/0066866 A1 | 3/2023 | Smith |
| 2023/0126938 A1 | 4/2023 | Takaguchi et al. |
| 2023/0158880 A1 | 5/2023 | Ragot |
| 2023/0311597 A1 | 10/2023 | McKibben et al. |
| 2023/0318084 A1 | 10/2023 | Sloan et al. |
| 2023/0406086 A1 | 12/2023 | Sloan et al. |
| 2023/0415556 A1 | 12/2023 | Wolf |
| 2023/0415587 A1 | 12/2023 | Sloan et al. |
| 2024/0140154 A1 | 5/2024 | McKibben et al. |
| 2024/0149657 A1 | 5/2024 | Coupal-Sikes et al. |
| 2024/0166040 A1 | 5/2024 | Coupal-Sikes et al. |

(56) References Cited

U.S. PATENT DOCUMENTS

| | | | |
|---|---|---|---|
| 2024/0166069 A1 | 5/2024 | McKibben et al. | |
| 2024/0186614 A1 | 6/2024 | Sloan et al. | |
| 2024/0253700 A1 | 8/2024 | Zarpelon | |
| 2024/0286480 A1* | 8/2024 | Kumagai | B62D 21/09 |
| 2024/0300324 A1 | 9/2024 | Oko | |
| 2024/0416764 A1 | 12/2024 | Sloan et al. | |

FOREIGN PATENT DOCUMENTS

| | | |
|---|---|---|
| CN | 103863080 | 6/2014 |
| CN | 104993151 | 10/2015 |
| CN | 105438262 | 3/2016 |
| CN | 107848386 | 3/2018 |
| CN | 110914585 | 3/2020 |
| CN | 217270085 | 8/2022 |
| DE | 3940843 A1 | 6/1991 |
| DE | 4132741 A1 | 4/1993 |
| DE | 101 08 713 A1 | 9/2002 |
| DE | 10 2006 009 189 | 7/2007 |
| DE | 10 2011 109 024 | 1/2013 |
| DE | 10 2012 109062 | 3/2014 |
| DE | 10 2013 000112 | 3/2014 |
| DE | 10 2017 005313 | 12/2018 |
| EP | 1 577 143 | 9/2005 |
| EP | 2 008 917 | 12/2008 |
| EP | 2 554 420 | 5/2014 |
| EP | 2 712 748 | 5/2017 |
| EP | 2 712 788 | 2/2020 |
| EP | 3 640 123 | 4/2020 |
| ES | 1079022 | 4/2013 |
| GB | 491788 | 9/1938 |
| GB | 527052 | 10/1940 |
| GB | 744973 | 2/1956 |
| GB | 2546535 | 7/2017 |
| GB | 2555906 | 5/2018 |
| JP | 2004-142524 | 5/2004 |
| JP | 2008-265685 | 11/2008 |
| JP | 2010-100207 | 5/2010 |
| JP | 2014-069686 | 4/2014 |
| KR | 10-1998-0035495 | 8/1998 |
| KR | 10-2017-0000950 | 1/2017 |
| KR | 10-2549321 | 6/2023 |
| WO | WO 2008/010045 | 1/2008 |
| WO | WO 2014/044618 | 3/2014 |
| WO | WO 2016/086326 | 6/2016 |
| WO | WO 2016/210329 | 12/2016 |
| WO | WO 2018/123337 | 7/2018 |
| WO | WO 2020/041630 | 2/2020 |
| WO | WO 2020/215018 | 10/2020 |
| WO | WO 2020/215023 | 10/2020 |
| WO | WO 2021/108429 | 6/2021 |
| WO | WO 2022/092994 | 5/2022 |
| WO | WO 2022/125929 | 6/2022 |
| WO | WO 2023/027959 | 3/2023 |
| WO | WO 2023/027960 | 3/2023 |
| WO | WO 2023/027961 | 3/2023 |
| WO | WO 2023/027965 | 3/2023 |
| WO | WO 2024/025711 | 2/2024 |

OTHER PUBLICATIONS

International Search Report and Written Opinion issued in PCT Application No. PCT/US2022/040950, mailed Jan. 26, 2023, in 22 Pages.

Tuma, "How to store lithium ion battery cell pack in electric bus?", dated Jul. 3, 2019, in 7 pages.

Tuma, Sliding Rails for Ebus Lithium Battery Pack Tray Automatic Bus Door Opening Mechanism, dated Aug. 15, 2019, in 3 pages.

* cited by examiner

BATTERY PACKS FOR UTILITY VEHICLE ELECTRIC DRIVETRAINS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

Field of the Invention

This application is directed to battery packs or modules powering electric motors to propel vehicles, in particular for trucks and other utility vehicles of various types.

Description of the Related Art

Electric vehicles have become more and more popular in recent years. This is particularly true among passenger vehicles. The use of electric motors and batteries to propel heavy and medium duty utility vehicles has been much less prevalent. Equipping utility vehicles such as these with well-designed electric drivetrains presents unique complexities.

SUMMARY

The present disclosure describes embodiments of modular, thin, flat, and/or substantially flat battery assemblies that can be used in various configurations with electric vehicles, such as medium and heavy-duty trucks and the like. The battery assemblies disclosed herein can be efficient to manufacture, utilize space efficiently, be mounted in various locations, be combined into sets of two or more assemblies to increase electrical power storage capacity, and/or the like.

According to some embodiments, a battery assembly for an electric vehicle comprises: a housing that defines an interior space, the housing comprising: a perimeter frame; a top cover connected to a top portion of the perimeter frame; and a bottom cover connected to a bottom portion of the perimeter frame; wherein the perimeter frame comprises a plurality of elongate frame members connected together at their ends to form a perimeter of the housing, the plurality of elongate frame members comprising at least a forward frame member, a rearward frame member, a first lateral side frame member, and a second lateral side frame member; wherein at least the first lateral side frame member and the second lateral side frame member comprise a cross-sectional profile configured to at least partially absorb impact loads resulting from a crash, the cross-sectional profile comprising a plurality of braces separated by voids; a plurality of battery modules positioned within the interior space of the housing, each of the plurality of battery modules comprising one or more battery cells, a positive electric terminal, a negative electric terminal, a coolant inlet, and a coolant outlet; and a rack structure positioned within the interior space of the housing and coupled to the perimeter frame, the rack structure comprising a plurality of support elements that cooperate to retain the plurality of battery modules with respect to the housing.

In some embodiments, the top cover of the housing is flat. In some embodiments, the top portion of the perimeter frame comprises a recessed area that receives the top cover such that the top cover does not extend above the perimeter frame. In some embodiments, the top cover comprises a thickness that is no greater than 60% of a thickness of at least the first lateral side frame member and the second lateral side frame member. In some embodiments, the bottom cover of the housing is flat. In some embodiments, the bottom portion of the perimeter frame comprises a recessed area that receives the bottom cover such that the bottom cover does not extend below the perimeter frame. In some embodiments, the housing comprises an elongate shape having a length, a width, and a height, wherein at least one of the length or the width is at least 5 times the height. In some embodiments, the at least one of the length or the width is at least 8 times the height. In some embodiments, both of the length and the width are at least 5 times the height. In some embodiments, the housing comprises a substantially flat top shape such that the battery assembly can be mounted adjacent a second battery assembly having a housing with a substantially flat bottom shape. In some embodiments, at least the first lateral side frame member and the second lateral side frame member comprise extruded structures. In some embodiments, each of the plurality of elongate frame members comprise extruded structures. In some embodiments, the plurality of elongate frame members are welded together to form a continuous perimeter. In some embodiments, each of the plurality of elongate frame members comprise extruded aluminum. In some embodiments, at least two of the plurality of elongate frame members comprise an external surface extending along a vertical direction, the external surface comprising one or more mounting bracket fastening features for coupling thereto of a mounting bracket assembly. In some embodiments, the one or more mounting bracket fastening features comprise one or more of a hole, a slot, a thread, or a stud. In some embodiments, the at least two of the plurality of elongate frame members comprises the forward frame member and the rearward frame member. In some embodiments, the battery assembly further comprises a mounting bracket assembly for attaching the battery assembly to a vehicle frame, the mounting bracket assembly comprising: a housing bracket configured to be coupled to an external vertically extending surface of one of the plurality of elongate frame members; a vehicle bracket configured to be coupled to a vehicle frame member; and one or more vibration dampening assemblies coupling the housing bracket to the vehicle bracket. In some embodiments, the housing bracket comprises a vertically extending portion that comprises one or more openings for receiving one or more fasteners to couple the vertically extending portion of the housing bracket to the external vertically extending surface of the one of the plurality of elongate frame members. In some embodiments, the battery assembly is a first battery assembly, wherein the vertically extending portion of the housing bracket comprises an upper portion and a lower portion, wherein the upper portion comprises the one or more openings for receiving the one or more fasteners, and wherein the lower portion comprises a second one or more openings for receiving a second one or more fasteners to couple the vertically extending portion of the housing bracket to an external vertically extending surface of an elongate frame member of a second battery assembly positioned underneath and adjacent to the first battery assembly. In some embodiments, the plurality of battery modules are grouped into a first bank and a second bank, with a central space positioned between the first bank and the second bank, and with the coolant inlet and the coolant outlet of each of the plurality of battery modules positioned facing the central space; and wherein the battery assembly further comprises one or more coolant lines positioned within the central space, fluidly coupled to the coolant inlets and the coolant outlets of the plurality of battery modules, and fluidly coupleable through the perimeter frame to an externally located coolant pump. In some embodiments, the battery assembly further comprises a power electronics module attached to an external front surface of the forward frame member or to an external rear surface of the rearward frame member, the power electronics module comprising at least battery management system (BMS) components electrically coupleable to the plurality of battery modules to control charging of and power distribution from the plurality of battery modules. In some embodiments, the power electronics module is removably attached to the external front surface of the forward frame member or to the external rear surface of the rearward frame member. In some embodiments, the power electronics module comprises: a housing defining an internal cavity that houses the BMS components; one or more electrical connectors for electrically coupling an electric vehicle drive system to the plurality of battery modules, the one or more electrical connectors being positioned at least partially external to the internal cavity of the power electronics module housing; and a guard member extending laterally from the housing of the power electronics module and positioned such that the one or more electrical connectors are positioned between the guard member and the external front surface of the forward frame member or the external rear surface of the rearward frame member to which the power electronics module is attached.

According to some embodiments, a battery system for an electric vehicle comprises: a battery assembly comprising a housing that houses one or more battery cells for storing power for an electric vehicle drive system, the housing comprising an elongate flat outer shape defined by a top surface, a bottom surface, a forward surface, a rearward surface, a first lateral side surface, and a second lateral side surface, wherein the housing comprises a height measured between the top surface and the bottom surface, a width measured between the first lateral side surface and the second lateral side surface, and a length measured between the forward surface and the rearward surface, wherein at least one of the length or the width is at least 5 times the height, wherein each of a pair of external surfaces selected from the forward surface and the rearward surface or the first lateral side surface and the second lateral side surface comprises one or more fastening features that comprise one or more of a hole, a slot, a thread, or a stud; and a plurality of mounting bracket assemblies for attaching the battery assembly to a frame member of an electric vehicle, the plurality of mounting bracket assemblies including at least a first mounting bracket assembly for supporting a first of the pair of external surfaces, and a second mounting bracket assembly for supporting a second of the pair of external surfaces, wherein each of the plurality of mounting bracket assemblies comprises: a housing bracket configured to be coupled to one of the external surfaces using the one or more fastening features; a vehicle bracket configured to be coupled to the frame member of the electric vehicle; and one or more vibration dampening assemblies coupling the housing bracket to the vehicle bracket.

In some embodiments, the pair of external surfaces comprises the forward surface and the rearward surface. In some embodiments, the housing bracket comprises a vertically extending portion that comprises one or more openings for receiving one or more fasteners to couple the vertically extending portion of the housing bracket to the one of the external surfaces using the one or more fastening features. In some embodiments, the one or more openings of the vertically extending portion comprise horizontally extending slots. In some embodiments, the vehicle bracket comprises a vertically extending portion configured to be coupled to the frame member of the electric vehicle. In some embodiments, the frame member of the electric vehicle comprises a beam extending along a longitudinal direction, wherein the vertically extending portion of the vehicle bracket extends along the longitudinal direction, and wherein the vertically extending portion of the housing bracket extends along a lateral direction that is perpendicular to the longitudinal direction. In some embodiments, the battery assembly is a first battery assembly, wherein the vertically extending portion of the housing bracket comprises an upper portion and a lower portion, wherein the upper portion comprises the one or more openings for receiving the one or more fasteners, and wherein the lower portion comprises a second one or more openings for receiving a second one or more fasteners to couple the vertically extending portion of the housing bracket to an external surface of a second battery assembly positioned underneath and adjacent to the first battery assembly. In some embodiments, the at least one of the length or the width is at least 8 times the height. In some embodiments, both of the length and the width are at least 5 times the height. In some embodiments, each of the plurality of mounting bracket assemblies comprises at least two vibration dampening assemblies coupling the housing bracket to the vehicle bracket. In some embodiments, each of the at least two vibration dampening assemblies comprises: a compressible member positioned at least partially between the housing bracket and the vehicle bracket; and a fastener that passes through the housing bracket, the compressible member, and the vehicle bracket. In some embodiments, the fastener of a first of the at least two vibration dampening assemblies is oriented parallel to the fastener of a second of the at least two vibration dampening assemblies. In some embodiments, the battery system further comprises a power electronics module attached to the forward surface or to the rearward surface of the housing, the power electronics module comprising at least battery management system (BMS) components electrically coupleable to the one or more battery cells to control charging of and power distribution from the one or more battery cells. In some embodiments, the power electronics module is removably attached to the forward surface or to the rearward surface of the housing. In some embodiments, the power electronics module comprises: a housing defining an internal cavity that houses the BMS components; one or more electrical connectors for electrically coupling the electric vehicle drive system to the one or more battery cells, the one or more electrical connectors being positioned at least partially external to the internal cavity of the power electronics module housing; and a guard member extending laterally from the housing of the power electronics module and positioned such that the one or more electrical connectors are positioned between the guard member and the forward or rearward surface to which the power electronics module is attached. In some embodiments, the battery assembly is a first battery assembly, and the frame member of the electric vehicle is a first longitudinally extending beam, wherein the battery system further comprises a second battery assembly, the second battery assembly comprising a housing that houses one or more additional battery cells for storing power for the electric vehicle drive system, wherein the housing of the second battery assembly is positioned on top of the first battery assembly and is shaped to fit within a space bounded laterally by the first lateral side surface of the first battery assembly housing at an outboard side and by the first longitudinally extending beam at an inboard side, and wherein the battery system further comprises: a power electronics module positioned remote from the second battery assembly; and one or more cable assemblies that at least electrically couple the power electronics module to the second battery assembly. In some embodiments, the one or more cable assemblies further fluidly couple the power electronics module to the second battery assembly. In some embodiments, the electric vehicle further comprises a second longitudinally extending beam spaced laterally apart from the first longitudinally extending beam, wherein the power electronics module is positioned between the first longitudinally extending beam and the second longitudinally extending beam, wherein the battery system further comprises a third battery assembly, the third battery assembly comprising a housing that houses one or more additional battery cells for storing power for the electric vehicle drive system, wherein the housing of the third battery assembly is positioned on top of the first battery assembly and is shaped to fit within a space bounded laterally by the second lateral side surface of the first battery assembly housing at an outboard side and by the second longitudinally extending beam at an inboard side, and wherein the battery system further comprises one or more cable assemblies that at least electrically couple the power electronics module to the third battery assembly.

According to some embodiments, an electric vehicle comprises: a vehicle frame member; an electric vehicle drive system; a first battery assembly and a second battery assembly, each of the first battery assembly and the second battery assembly comprising a housing that houses one or more battery cells for storing power for the electric vehicle drive system, the housing comprising: a perimeter frame that forms an elongate flat shape, the perimeter frame comprising first and second opposing perimeter walls having external surfaces that define a length therebetween, and third and fourth opposing perimeter walls having external surfaces that define a width therebetween; a first cover coupled to a first side of the perimeter frame, the first cover comprising a flat external surface; and a second cover coupled to a second side of the perimeter frame, the second cover comprising a flat external surface, wherein the flat external surface of the first cover and the flat external surface of the second cover define a height therebetween, wherein at least one of the length or the width is at least 5 times the height, and wherein the first perimeter wall comprises one or more fastening features that comprises one or more of a hole, a slot, a thread, or a stud; and a mounting bracket assembly that attaches both of the first battery assembly and the second battery assembly to the vehicle frame member, the mounting bracket assembly comprising: a housing bracket coupled to the first perimeter walls of both of the first battery assembly and the second battery assembly using the one or more fastening features; and a vehicle bracket coupled to the vehicle frame member, wherein the first battery assembly and the second battery assembly are positioned such that the second cover of the first battery assembly is adjacent to and facing the first cover of the second battery assembly.

In some embodiments, the mounting bracket assembly further comprises one or more vibration dampening assemblies coupling the housing bracket to the vehicle bracket. In some embodiments, the second cover of the first battery assembly is in contact with the first cover of the second battery assembly. In some embodiments, the second cover of the first battery assembly is spaced apart from the first cover of the second battery assembly by a distance that is no greater than 20% of height. In some embodiments, the second cover of the first battery assembly is spaced apart from the first cover of the second battery assembly by a distance that is no greater than 10% of height. In some embodiments, the at least one of the length or the width is at least 8 times the height. In some embodiments, both of the length and the width are at least 5 times the height. In some embodiments, the vehicle frame member comprises a beam that supports at least a portion of the electric vehicle drive system and that extends along a longitudinal direction of the electric vehicle, wherein the first battery assembly and the second battery assembly are each positioned underneath the vehicle frame member. In some embodiments, the first battery assembly and the second battery assembly are positioned above a cab of the electric vehicle, with the first cover and the second cover oriented to be substantially parallel to a horizontal plane. In some embodiments, the first battery assembly and the second battery assembly are positioned behind a cab of the electric vehicle, with first cover and the second cover oriented to be substantially parallel to a vertical plane. In some embodiments, the second perimeter wall opposite the first perimeter wall comprises one or more fastening features that comprises one or more of a hole, a slot, a thread, or a stud; and wherein the electric vehicle further comprises a second mounting bracket assembly that attaches both of the first battery assembly and the second battery assembly to at least one of the vehicle frame member or a second vehicle frame member, the second mounting bracket assembly comprising: a housing bracket coupled to the second perimeter walls of both of the first battery assembly and the second battery assembly using the one or more fastening features of the second perimeter walls; and a vehicle bracket coupled to the at least one of the vehicle frame member or the second vehicle frame member. In some embodiments, the second mounting bracket assembly further comprises one or more vibration dampening assemblies coupling the housing bracket of the second mounting bracket assembly to the vehicle bracket of the second mounting bracket assembly. In some embodiments, the one or more vibration dampening assemblies comprises at least two vibration dampening assemblies coupling the housing bracket of the second mounting bracket assembly to the vehicle bracket of the second mounting bracket assembly. In some embodiments, each of the at least two vibration dampening assemblies comprises: a compressible material positioned at least partially between the housing bracket and the vehicle bracket; and a fastener that passes through the housing bracket, the compressible material, and the vehicle bracket. In some embodiments, the fastener of a first of the at least two vibration dampening assemblies is oriented parallel to the fastener of a second of the at least two vibration dampening assemblies. In some embodiments, the housing bracket comprises a first portion and a second portion aligned with the first portion, the first portion comprising one or more openings for receiving one or more fasteners to couple the first portion of the housing bracket to the first perimeter wall of the first battery assembly using the one or more fastening features, the second portion comprising one or more openings for receiving one or more fasteners to couple the second portion of the housing bracket to the first perimeter wall of the second battery assembly using the one or more fastening features. In some embodiments, the one or more openings of the first portion and the second portion of the housing bracket comprise slots that extend along a direction parallel to the first cover of the second battery assembly. In some embodiments, the one or more openings of the first and second portions of the housing bracket comprise slots that extend along a direction perpendicular to the first cover of the second battery assembly. In some embodiments, the vehicle bracket comprises a first portion comprising one or more openings for receiving one or more fasteners to couple the first portion of the vehicle bracket to the vehicle frame member, wherein the first portion of the vehicle bracket is oriented perpendicular to the first portion of the housing bracket. In some embodiments, the vehicle bracket comprises a first portion comprising one or more openings for receiving one or more fasteners to couple the first portion of the vehicle bracket to the vehicle frame member, wherein the first portion of the vehicle bracket is oriented parallel to the first portion of the housing bracket.

According to some embodiments, a battery system for an electric vehicle comprises: a battery assembly comprising a housing that houses one or more battery cells for storing power for an electric vehicle drive system, the housing comprising: a perimeter frame that forms an elongate flat shape, the perimeter frame comprising first and second opposing perimeter walls having external surfaces that define a length therebetween, and third and fourth opposing perimeter walls having external surfaces that define a width therebetween, wherein the perimeter walls of the perimeter frame each comprise a cross-sectional profile comprising a plurality of braces separated by voids; a first cover coupled to a first side of the perimeter frame, the first cover comprising a flat external surface; and a second cover coupled to a second side of the perimeter frame, the second cover comprising a flat external surface, wherein the flat external surface of the first cover and the flat external surface of the second cover define a height therebetween, wherein at least one of the length or the width is at least 5 times the height, and wherein at least one of the perimeter walls of the perimeter frame comprises one or more fastening features that comprises one or more of a hole, a slot, a thread, or a stud; and a mounting bracket that comprises one or more openings for attaching the mounting bracket to the at least one of the perimeter walls of the perimeter frame using the one or more fastening features.

According to some embodiments, a battery system for an electric vehicle comprises: a battery assembly comprising a housing that houses one or more battery cells for storing power for an electric vehicle drive system, the housing comprising an elongate flat outer shape, wherein the housing comprises a height, a width, and a length, wherein at least one of the length or the width is at least 5 times the height; and one or more mounting systems attached to a perimeter of the housing and configured to attach the battery assembly to a frame member of an electric vehicle.

In some embodiments, the at least one of the length or the width is at least 8 times the height. In some embodiments, both of the length and the width are at least 5 times the height. In some embodiments, the housing comprises: a perimeter frame that forms the elongate flat outer shape, the perimeter frame comprising first and second opposing perimeter walls having external surfaces that define the length therebetween, and third and fourth opposing perimeter walls having external surfaces that define the width therebetween; a first cover coupled to a first side of the perimeter frame, the first cover comprising a flat external surface; and a second cover coupled to a second side of the perimeter frame, the second cover comprising a flat external surface, wherein the flat external surface of the first cover and the flat external surface of the second cover define the height therebetween. In some embodiments, the perimeter walls of the perimeter frame each comprise an impact-absorbing cross-sectional profile. In some embodiments, the perimeter walls of the perimeter frame each comprise a cross-sectional profile comprising a plurality of braces separated by voids. In some embodiments, at least one of the perimeter walls of the perimeter frame comprises one or more fastening features that comprises one or more of a hole, a slot, a thread, or a stud; and wherein the one or more mounting systems comprises a mounting bracket that comprises one or more openings for attaching the mounting bracket to the at least one of the perimeter walls of the perimeter frame using the one or more fastening features. In some embodiments, the battery assembly is a first battery assembly, and the battery system further comprises: a second battery assembly comprising a second housing that houses one or more battery cells for storing power for the electric vehicle drive system, the second housing comprising an elongate flat outer shape, wherein the second housing comprises a height, a width, and a length, wherein at least one of the length or the width of the second housing is at least 5 times the height of the second housing, and wherein the one or more mounting systems are configured to attach both of the first battery assembly and the second battery assembly to the frame member, with at least one surface of the second battery assembly positioned abutting or adjacent to at least one surface of the first battery assembly.

BRIEF DESCRIPTION OF THE DRAWINGS

Features of the invention can be better understood from the following detailed description when read in conjunction with the accompanying schematic drawings, which are for illustrative purposes only. The drawings include the following figures.

DETAILED DESCRIPTION

Figure 1:
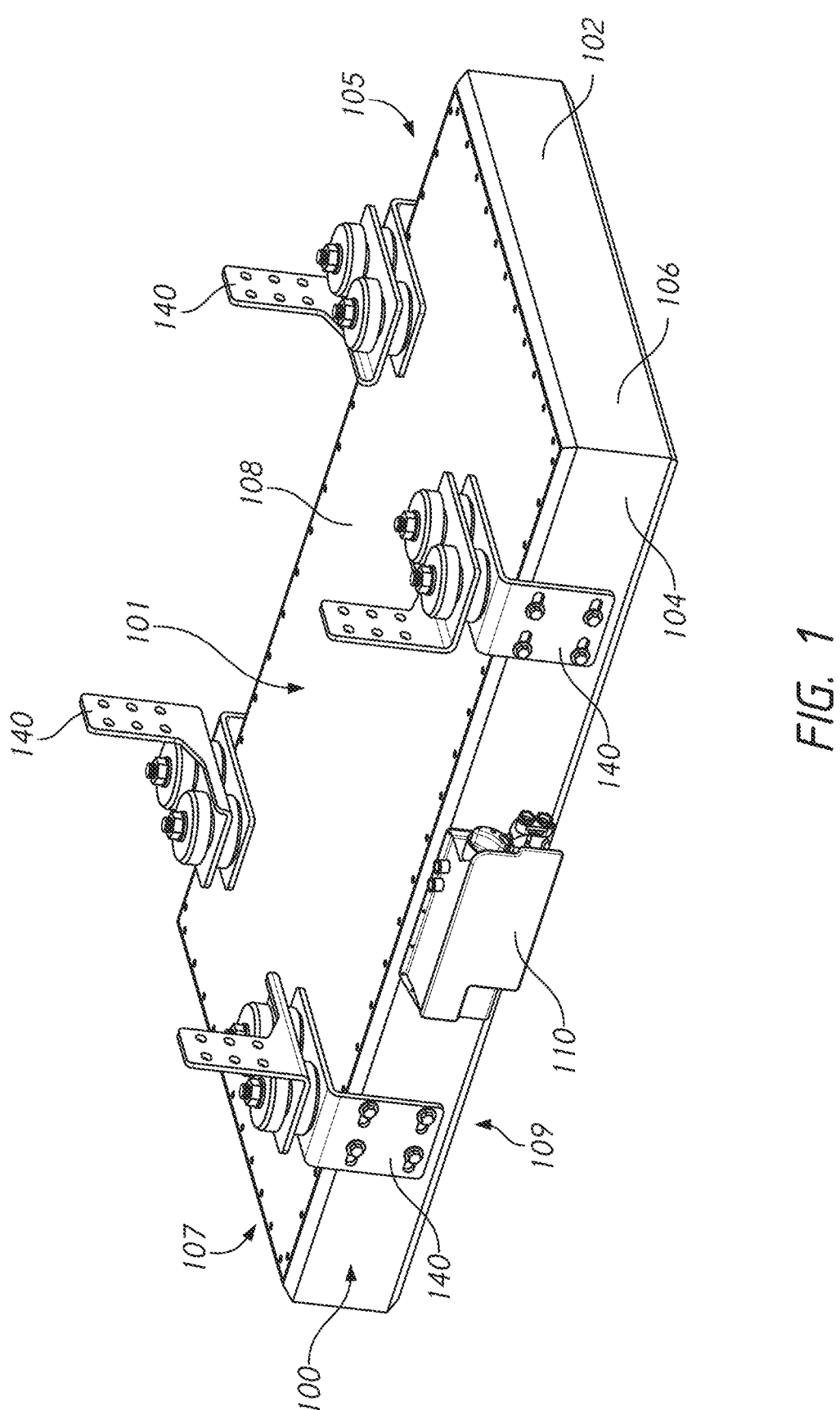
FIG. 1 is a perspective view of an embodiment of a battery assembly.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

The present disclosure describes a variety of embodiments of modular, thin, flat, and/or substantially flat battery packs or battery assemblies that can be used in various configurations with electric vehicles, such as medium and heavy-duty trucks and the like. The battery assemblies disclosed herein can be efficient to manufacture, utilize space efficiently, be mounted in various locations, be combined into sets of two or more assemblies to increase electrical power storage capacity, and/or the like.

Current battery assemblies or battery packs for medium and heavy-duty vehicles, such as trucks, delivery vans, and/or the like, are typically custom designed to fit a particular vehicle and/or application. This requires, for example, building a custom shaped housing to fit within a particular envelope of space, engineering battery cells and power electronics to fit within that custom shape, and/or the like. Designing such custom battery packs or assemblies can be complicated, time-consuming, and expensive. Further, manufacturing of such custom battery packs or assemblies can be expensive due to, for example, relatively low volume production.

The battery assemblies and related components disclosed herein have a variety of benefits over prior designs. For example, some embodiments comprise a housing that forms a generally elongate, flat, and/or relatively thin shape. For example, some embodiments may form a shape that is generally rectangular or cuboid in shape, and that may have a relatively high length-to-thickness and/or width-to-thickness ratio. Further, such designs may include a flat or substantially flat top and/or bottom surface (e.g., the surfaces of the rectangular or cuboid shape having the largest surface areas) that allow for a number of benefits. For example, a flat top surface can enable the battery assembly to be mounted below and abutting the frame rails of a truck without any portion of the battery assembly extending into an area above the bottom of the frame rails of the truck. Such a design can also be mounted in various other locations, such as in a roof mounted arrangement (e.g., above the cab of a truck), in a behind the cab ("BTC") arrangement (e.g., mounted vertically behind the cab of a truck). Further, such a design can enable two or more battery packs or assemblies to be stacked on top of one another in a configuration that efficiently uses available space. This can be beneficial, for example, because some vehicles or use cases may only require the power storage capacity of a single battery assembly, while other vehicles or use cases may require the power storage capacity of multiple battery assemblies. By designing a battery assembly that is modular (e.g., that can be used alone or that can be combined with one or more other battery assemblies) various vehicles and use cases can be accommodated with one or more of the same or substantially the same battery assemblies. This can have a number of benefits, including more efficient manufacturing due to, for example, higher production volume.

Another benefit of designs disclosed herein is that some assemblies include a unique mounting system that can accommodate more than one battery module or assembly on a single mounting bracket. Such designs can help to increase rigidity, decrease the overall package size of the system, increase the ease of installation and/or serviceability, and/or the like. In some embodiments, the mounting systems include vibration dampening features that help to reduce vibrations, such as vibrations caused by a truck traveling over rough roads, from being transmitted to the battery assemblies.

Further, various embodiments disclosed herein comprise a structural perimeter frame that defines a perimeter of a battery module or assembly housing, with one or more large flat sheets or covers coupled to either side of the structural perimeter frame to form the top and bottom surfaces of the battery assembly. The structural perimeter frame may comprise, for example, an extruded component having a cross-sectional profile that is optimized for crash impact resistance, weight, size, strength and/or the like. The structural perimeter frame may further comprise a number of mounting features, such as holes, slots, threads, and/or the like that enable mounting brackets and/or other components to be coupled to the structural perimeter frame.

Another benefit of various designs disclosed herein is that the power electronics, supporting electronics, battery management system electronic components, and/or the like that are used to manage the individual battery cells of a battery pack or assembly can also be included in a modular, separable, replaceable, and/or the like power electronics module. For example, some embodiments include a power electronics module removably mounted to a side wall of a battery housing (e.g., a wall other than the top and bottom surfaces, such as a wall that forms part of the structural perimeter frame). In some embodiments, the power electronics module is configured to not extend beyond planes defined by the top and bottom surfaces of the battery assembly housing. Such an arrangement can be beneficial, for example, to enable two or more battery assemblies to be stacked on top of one another, to enable the top and/or bottom surfaces of the battery assemblies to be positioned against and/or close to a portion of the vehicle, and/or the like.

Example Battery Assembly and Use Cases

FIG. 1 illustrates a perspective view of an example embodiment of a battery assembly 100 (e.g., battery assembly, battery pack, battery system, and/or the like). The battery assembly 100 desirably comprises an elongate flat, rectangular, or cuboid shaped housing 101 formed by a perimeter frame or structure 102 having a first or top cover 108 attached to one side thereof and a second or bottom cover 109 attached to another side thereof. The perimeter frame 102 may comprise, for example, four walls including first, second, third, and fourth walls 104, 105, 106, and 107. In some embodiments, the first and second walls 104 and 105 may be referred to as opposing front/forward and back/rearward walls, respectively, and third and fourth walls 106 and 107 may be referred to as first and second opposing lateral side walls, respectively. Such terminology is not intended to limit the orientation of the battery assembly 100 with respect to a vehicle, however. As described below, the battery assembly 100 can be mounted to a vehicle in a variety of orientations.

The housing 101 of the battery assembly 100 may house a plurality of battery modules for storing electrical energy, as further described below. The housing 101 of the battery assembly 100 may further have a number of components attached thereto. For example, FIG. 1 illustrates four mounting systems 140 (e.g., mounting systems, mounting bracket assemblies, mounting assemblies, and/or the like) attached to the opposing front and back perimeter walls 104, 105. Further, FIG. 1 illustrates a power electronics module 110 attached to the front perimeter wall 104. Further details of specific features and the construction of the battery assembly 100 are described below with reference to FIGS. 8A through 8M.

FIG. 1 illustrates that the housing 101 of the battery assembly 100 can comprise a relatively elongate, thin, slender, and/or the like shape. For example, a thickness measured between the top and bottom covers 108, 109 may be relatively small compared to a length measured between front and back perimeter walls 104, 105 and/or a width measured between first and second lateral side walls 106, 107. Such a shape can be desirable, for example, to enable the battery assembly 100 to be positioned in a number of locations on various electric vehicles, to enable multiple battery assemblies 100 to be stacked on top of one another and/or positioned adjacent to one another on various electric vehicles, and/or the like. Various examples of such configurations are described below with reference to FIGS. 2A through 2B, 3A through 3C, 4A through 4B, 5A through 5C, and 6A through 6C.

Figure 2A:
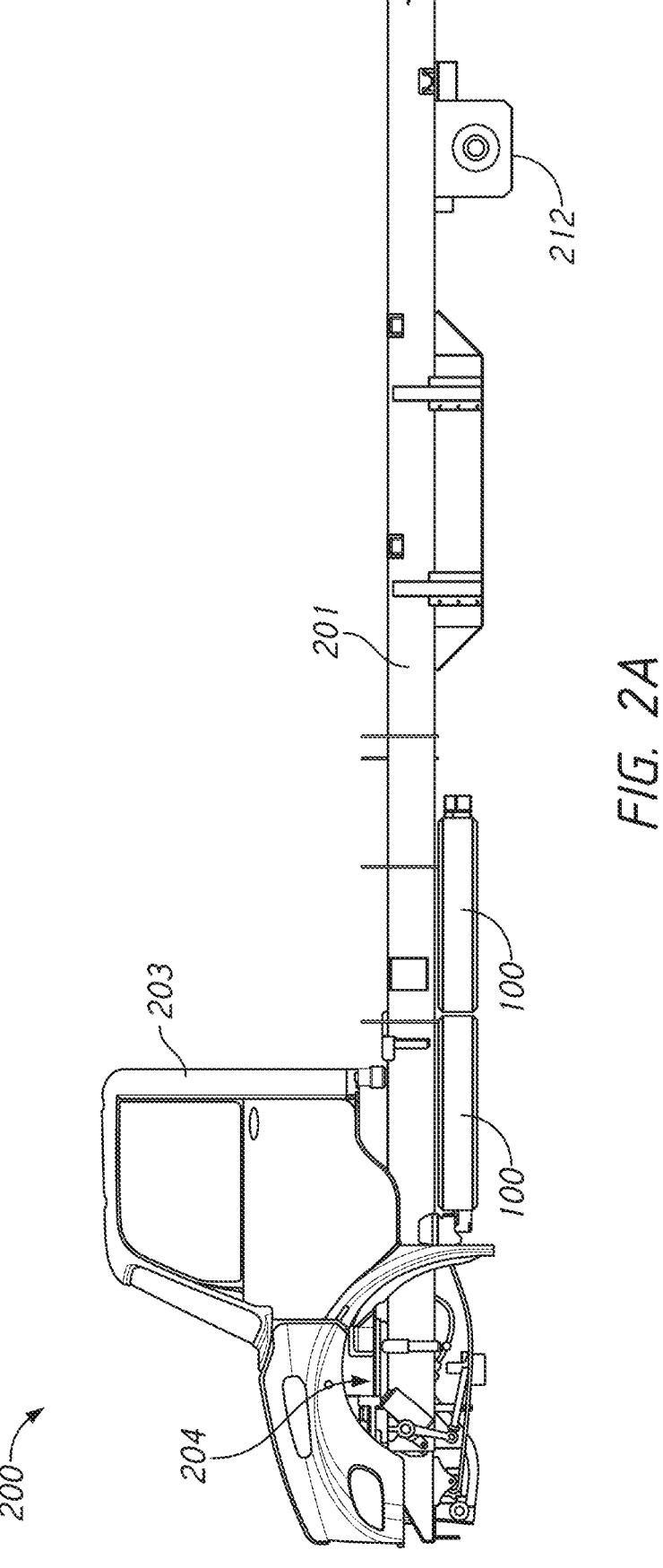
FIGS. 2A-2B illustrate an embodiment of an electric vehicle that positions two of the battery assemblies of FIG. 1 underneath a vehicle frame member.
Figure 2B:
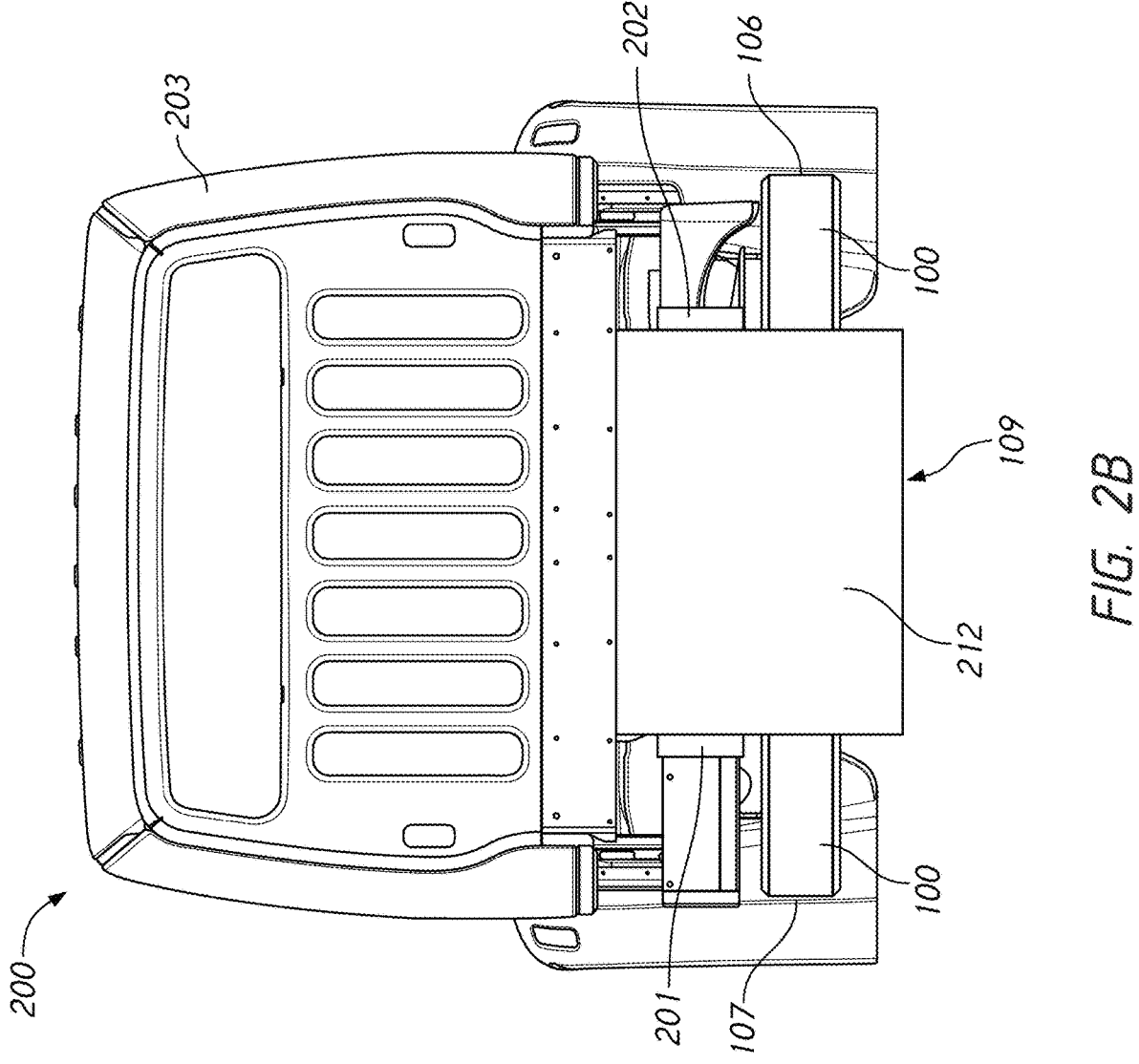

Medium and heavy duty commercial vehicles, such as commercial trucks used for various purposes, are generally classified by gross vehicle weight rating (GVWR). For example, class 4 trucks include smaller box trucks and delivery trucks, and class 5 trucks include bucket trucks, cherry pickers, and various other trucks. Classes 6 and 7 include larger trucks, such as beverage trucks, rack trucks, school buses, street sweepers, garbage trucks, city transit buses, and/or the like. The largest on road commercial vehicles include classes 8 and 9, which, for example, include most semi trucks, big rigs, cement trucks, dump trucks, and the like. The modular battery assemblies disclosed herein can be easily used in any of these classes of vehicles, without needing to redesign the battery assembly and/or the housing of the battery assembly to fit each different vehicle or class of vehicle. For example, FIGS. 2A and 2B illustrate an example of an electric vehicle 200 having a vehicle frame configuration typical of a class 6 or class 7 truck. FIG. 2A is a side view of the electric vehicle 200, and FIG. 2B is a rear view of the electric vehicle 200.

FIGS. 2A and 2B illustrate only certain portions of the electric vehicle 200, which includes first and second longitudinal frame members 201, 202, and a cab 203 supported by the longitudinal frame members 201, 202. The longitudinal frame members 201 and 202 may be referred to as beams, frame rails, and/or the like. In some trucks, the longitudinal frame members 201 and 202 comprise a C-shaped or U-shaped cross-section or various other cross-sectional shapes. The frame members 201 and 202 may further support an axle drive assembly 212 and a front end accessory assembly 204. The axle drive assembly 212 may be configured to utilize electrical power to drive a rear axle, and the front end accessory assembly 204 may comprise, for example, various components that support the axle drive assembly 212 and other components of the electric vehicle drive system, such as components that handle power distribution, charging, cooling, and/or the like.

FIG. 2A shows an example location of such a front end accessory component assembly 204. Additional details of front end accessory assemblies that may be used with the embodiments disclosed herein are shown and described in U.S. Pat. No. 11,043,707, titled ELECTRIC FRONT END ACCESSORY DEVICES ASSEMBLY, which is incorporated by reference herein in its entirety.

The electric vehicle 200 includes two battery assemblies 100 attached to and suspended underneath the longitudinal frame members 201, 202. In some embodiments, suspending battery assemblies underneath the frame members is referred to as an underslung configuration. In this embodiment, the two battery assemblies 100 are positioned back to back (e.g., the back walls 105 of the perimeter structures 102 are abutting each other, or are at least facing each other and spaced apart by a relatively small distance). The two battery assemblies 100 are desirably aligned with one another, such as the top covers 108 being aligned with one another and the first and second lateral side walls 106 and 107 being aligned with one another. Although not shown in these figures, the battery assemblies 100 may be attached to the longitudinal frame members 201, 202 using a variety of mounting systems, including the mounting bracket assemblies 140 shown in FIG. 1.

The packaging of the battery assemblies 100 on the electric vehicle 200 can be desirable, for example, because the battery assemblies 100 fit well within the overall width of the truck (e.g., the lateral side walls 106, 107 do not extend laterally beyond fairings of the truck, which are not shown in FIG. 2B, but which can be assumed to extend substantially straight downward from the lateral edges of the cab 203). Further, the bottoms of the battery assemblies 100, such as the bottom covers 109, are positioned high enough to have a relatively large amount of ground clearance, as can be seen in FIGS. 2A and 2B. Desirably, the bottoms of the battery assemblies 100 are positioned above the bottom of the wheel rims so that the battery assemblies 100 will not contact the ground in the event of a flat tire.

Figure 3A:
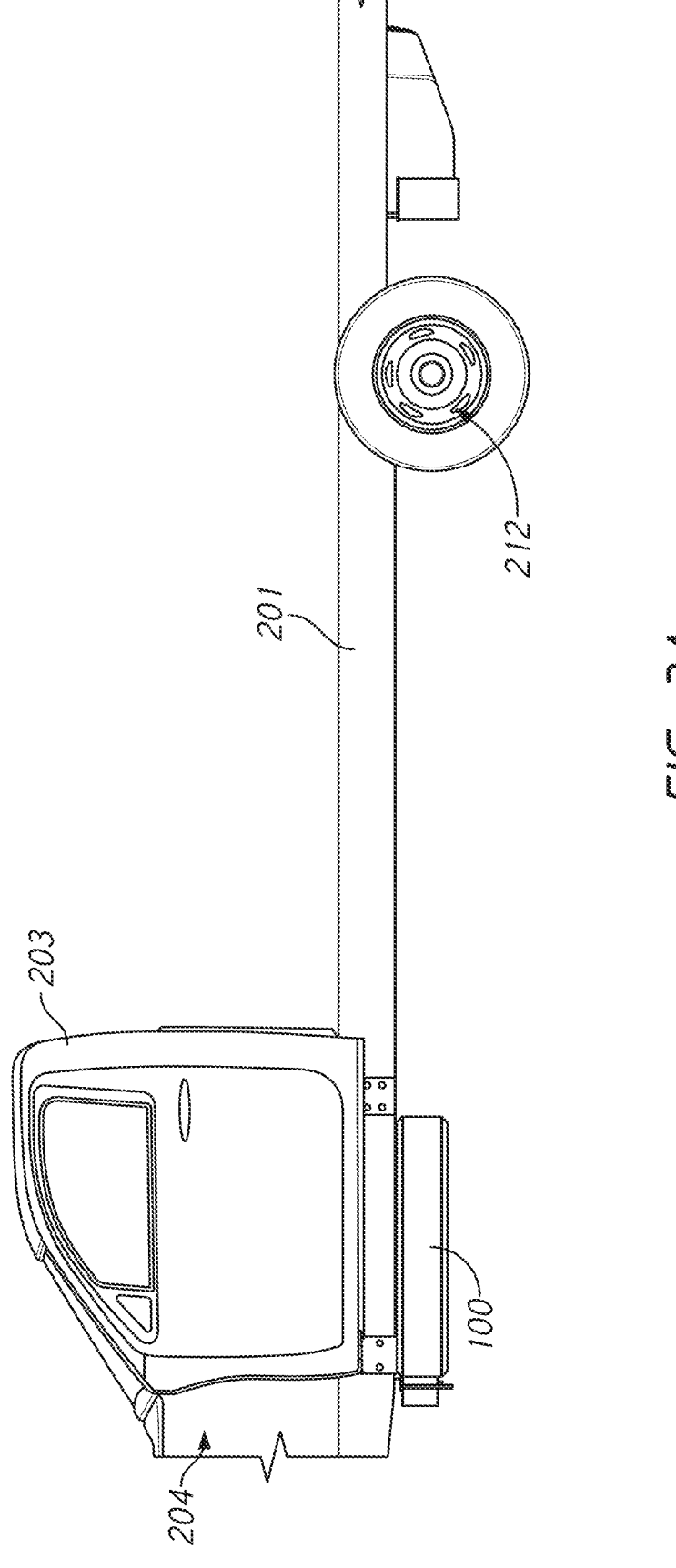
FIGS. 3A-3C illustrate another embodiment of an electric vehicle that positions one or two of the battery assemblies of FIG. 1 underneath a vehicle frame member.
Figure 3B:
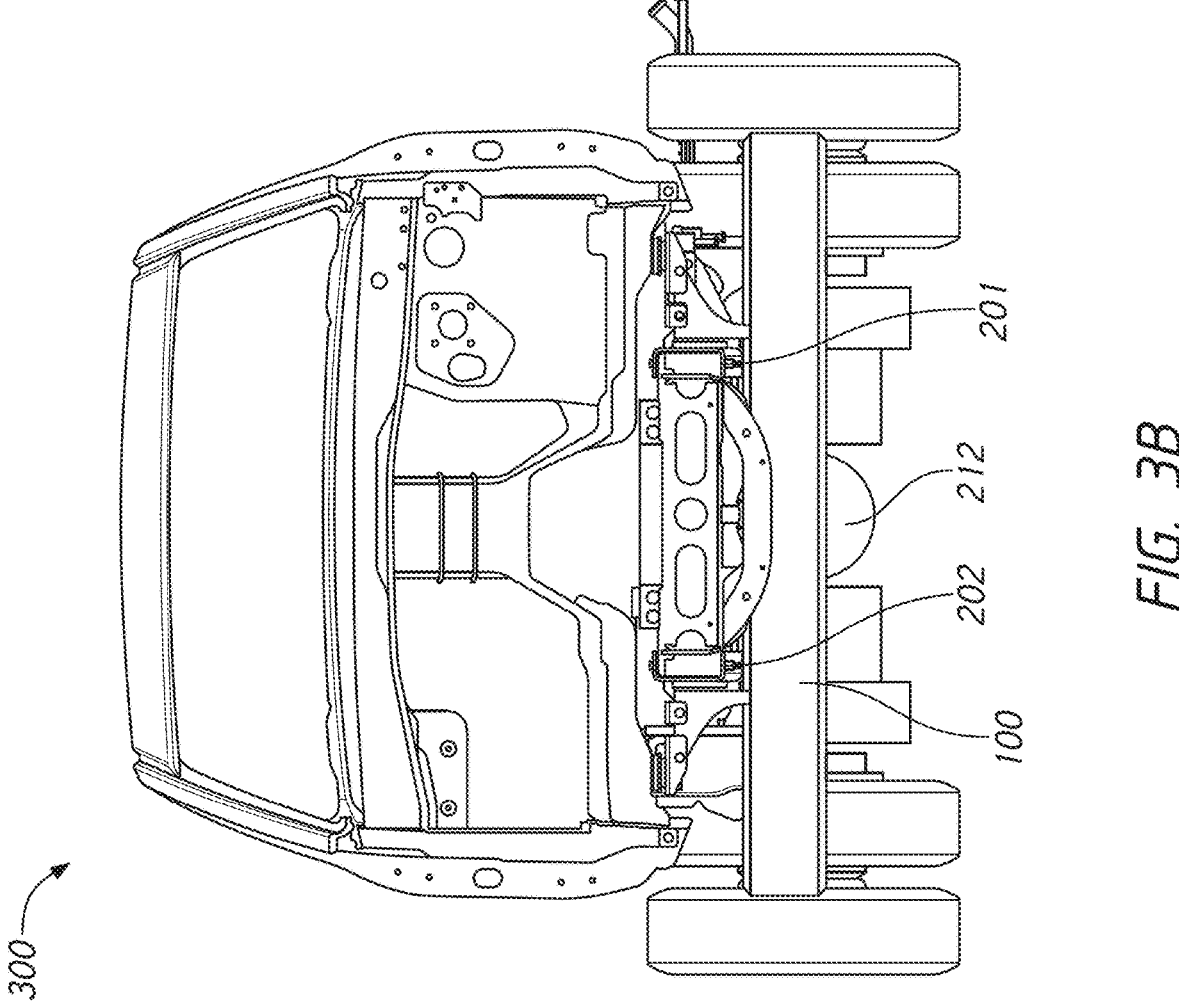
Figure 3C:
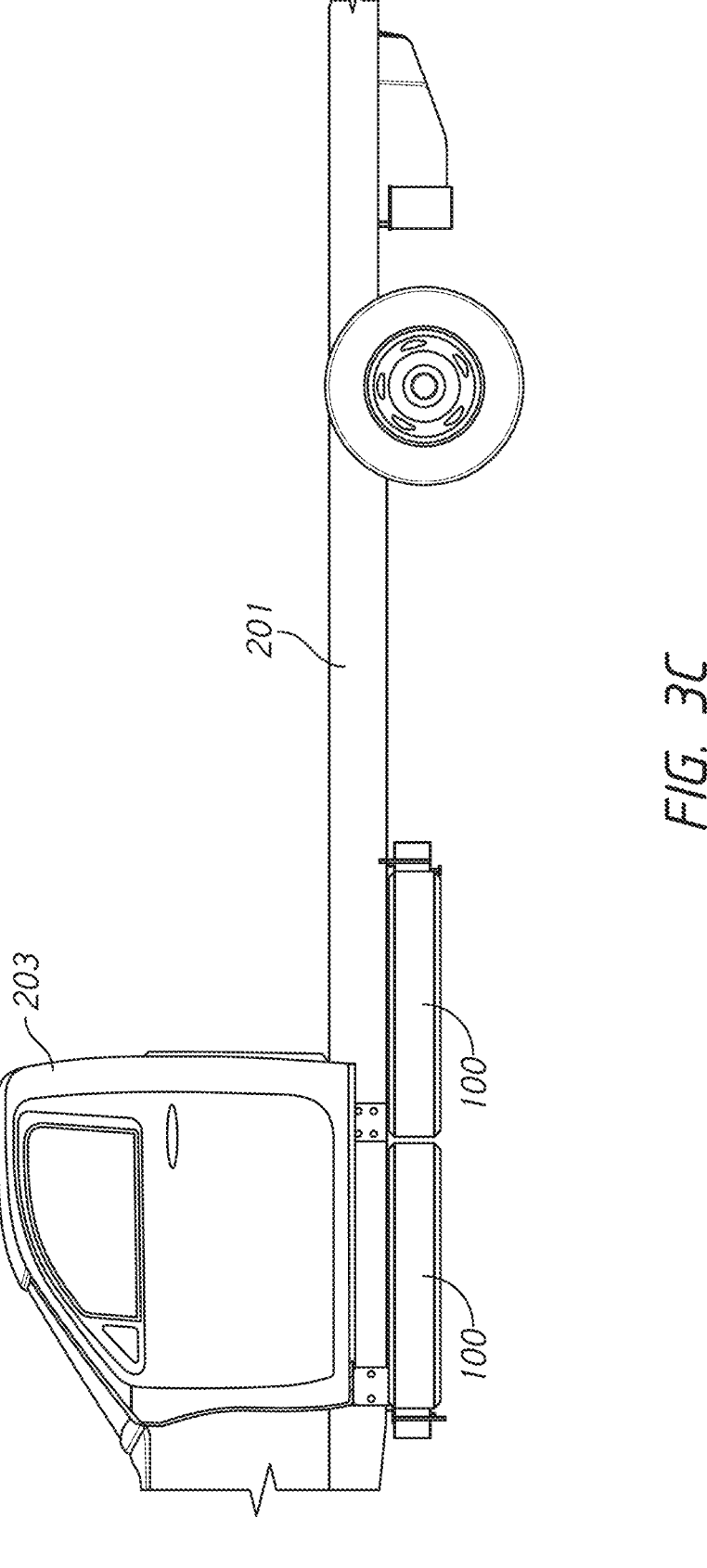

Turning now to FIGS. 3A through 3C, these figures illustrate another example of an electric vehicle 300. As with FIGS. 2A-2B, only certain portions of the electric vehicle 300 are shown. FIG. 3A is a side view, FIG. 3B is a front view, and FIG. 3C is another side view. The electric vehicle 300 includes a frame and size typical of a class 4 or 5 medium duty truck. The electric vehicle 300 shares many similarities with the electric vehicle 200, but on a somewhat smaller scale. For example, the electric vehicle 300 includes first and second longitudinal frame members 201, 202, and the frame members 201, 202 support a cab 203, an axle drive assembly 212, and a front-end accessory assembly 204. One difference from the electric vehicle 200 is that the electric vehicle 300 of FIG. 3A includes only a single battery assembly 100. In this case, the battery assembly 100 is positioned substantially beneath the cab 203. Using only one battery assembly 100 may be desirable, for example, because the electric vehicle 300 may have lower power requirements than the electric vehicle 200. If additional range is required, however, an additional battery assembly 100 may be added, as is shown in the alternative version of FIG. 3C. In FIG. 3C, a second battery assembly 100 has been added behind the first battery assembly 100, in an arrangement similar to as shown in FIG. 2A for the electric vehicle 200. As with the electric vehicle 200, a mounting bracket assembly is not shown in FIGS. 3A through 3C, but various mounting arrangements may be used, including the mounting bracket assemblies 140 shown in FIG. 1. Similarly to the electric vehicle 200, the battery assemblies 100 fit well within an overall width of the electric vehicle 300 and desirably sit high enough that they will not contact the ground in the event of a flat tire.

Figure 4A:
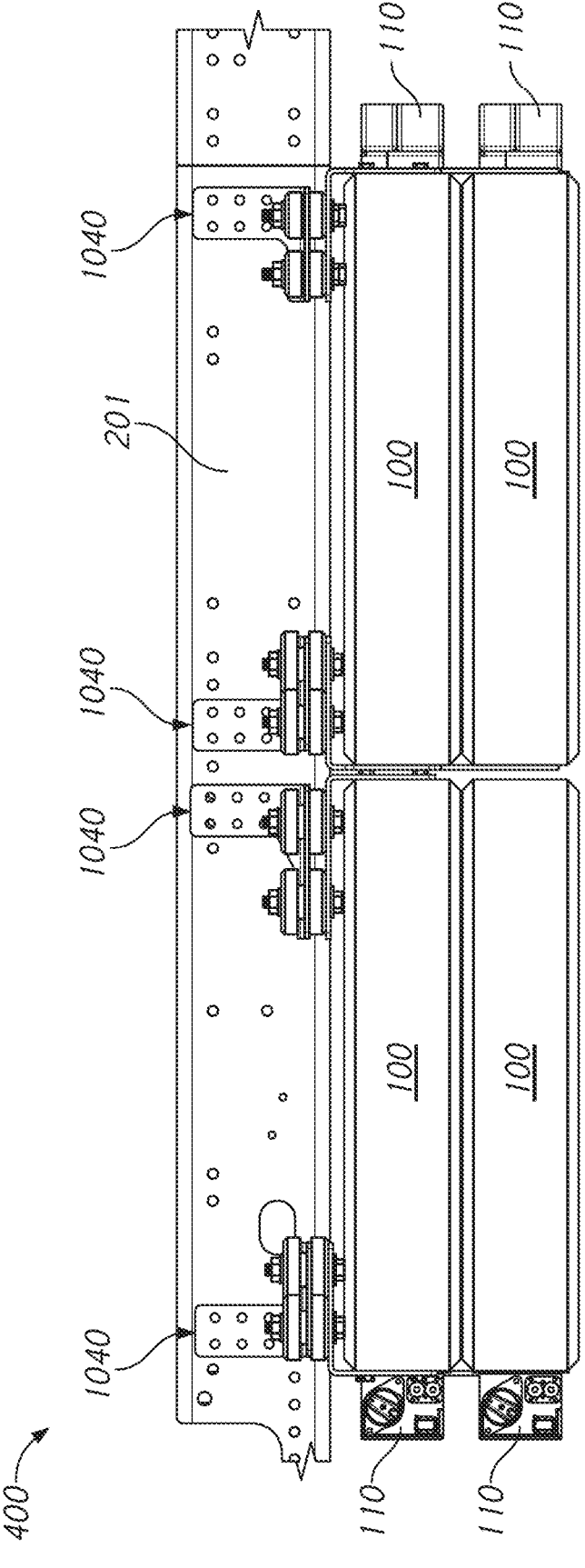
FIGS. 4A-4B illustrate another embodiment of an electric vehicle that positions four of the battery assemblies of FIG. 1 underneath a vehicle frame member.
Figure 4B:
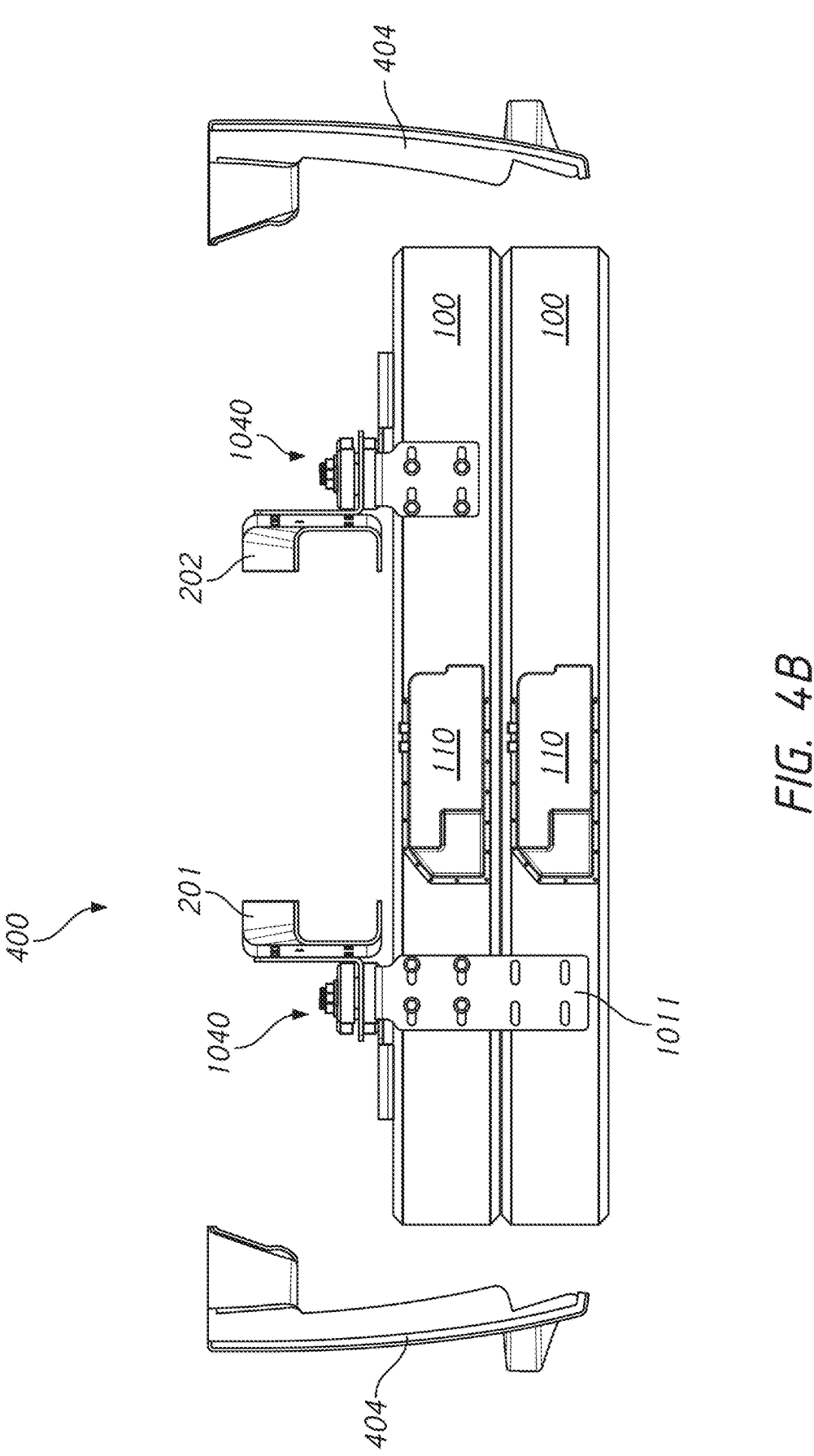

FIGS. 4A and 4B illustrate a portion of another electric vehicle 400. In this case, the electric vehicle 400 represents a typical class 7 or 8 vehicle, such as a semi truck. FIG. 4A is a side view, and FIG. 4B is a front view. The electric vehicle 400 includes first and second longitudinal frame members 201, 202, and fairings 404. The fairings 404 may, for example, extend downward from a cab (not shown in these figures).

The electric vehicle 400 is an example of an electric vehicle that may require more power and/or range than the smaller and lighter electric vehicles 200 and 300. Accordingly, the electric vehicle 400 includes a greater number of battery assemblies 100. In this case, the electric vehicle 400 includes four battery assemblies 100 stacked and positioned together in a relatively small overall envelope. As shown in the side view of FIG. 4A, two top battery assemblies 100 are positioned back to back underneath the frame rails 201, 202, similar to the arrangement used in electric vehicles 200 and 300 discussed above. Additionally, however, two additional lower battery assemblies 100 are positioned back to back and underneath the top two battery assemblies 100. With reference to the back view of FIG. 4B, this stacked arrangement may use a mounting bracket assembly 1040 that is different than the mounting bracket assemblies 140 of FIG. 1, such as by having an extended housing bracket 1011 that couples a single mounting bracket assembly 1040 to more than one battery assembly 100. Further details of the mounting bracket assemblies 1040 are described below with reference to FIG. 10B.

It should be noted that, as with FIGS. 2A through 2B and 3A through 3C, FIGS. 4A through 4B are intended to illustrate some of the main concepts of attaching the battery assemblies 100 in various ways, and these figures do not illustrate every component of the electric vehicle or the mounting systems of the battery assemblies. For example, on the right side of FIG. 4B, the right side mounting bracket assembly 1040 is illustrated as a mounting bracket assembly 140 as shown in FIG. 1 that is intended to hold a single battery assembly 100. In some embodiments, a mounting bracket assembly 1040 that is configured to hold both of the battery assemblies 100, as is shown on the left side of FIG. 4B, may be used. Further, the mounting bracket assembly 1040 shown on the left side of FIG. 4B does not show any fasteners coupling the mounting bracket assembly 1040 to the lower battery assembly 100, but such fasteners may be included.

Figures 5A, 5B:
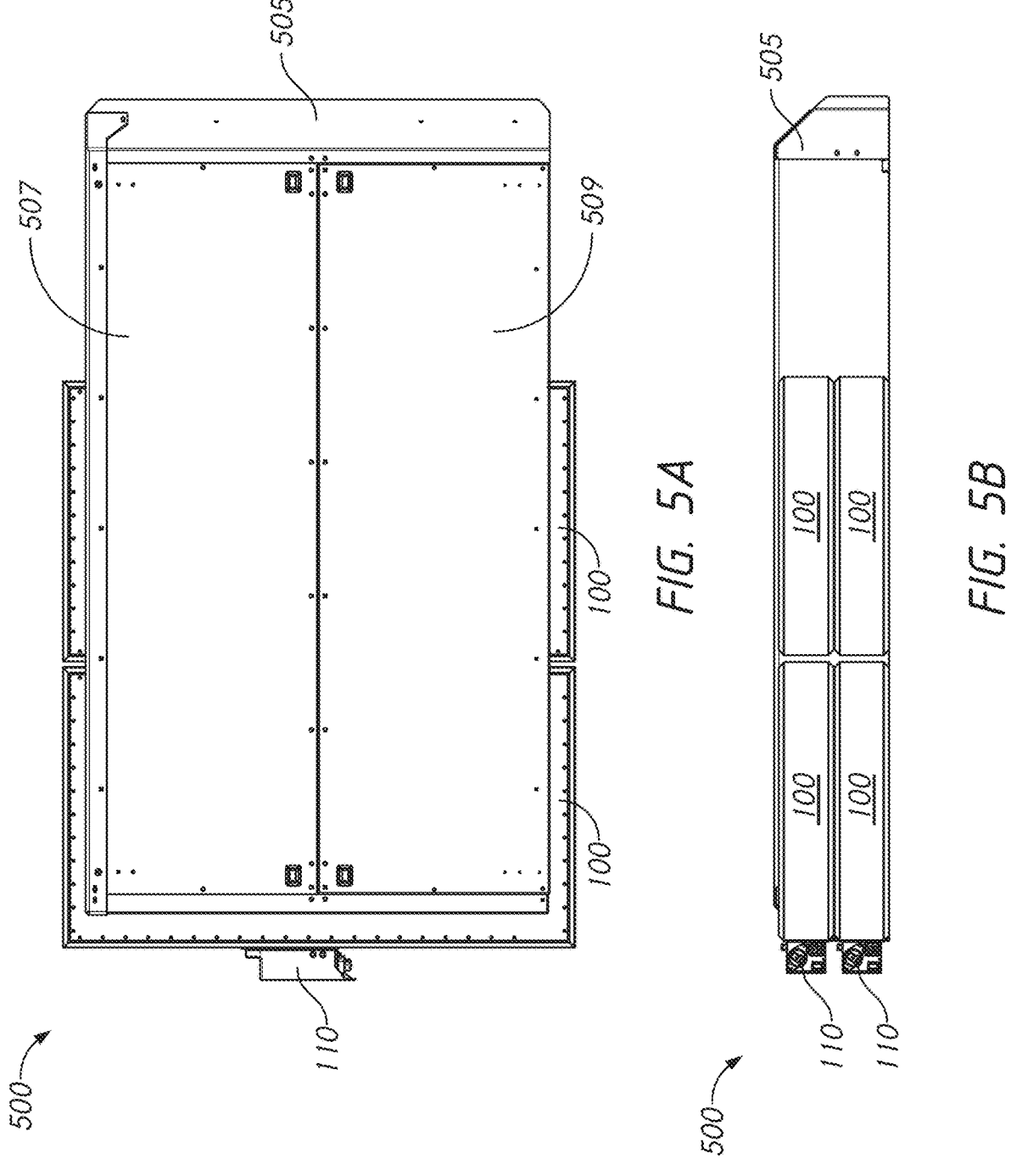
FIGS. 5A-5C illustrate another embodiment of an electric vehicle that positions four of the battery assemblies of FIG. 1 in a roof mount configuration.
Figure 5C:
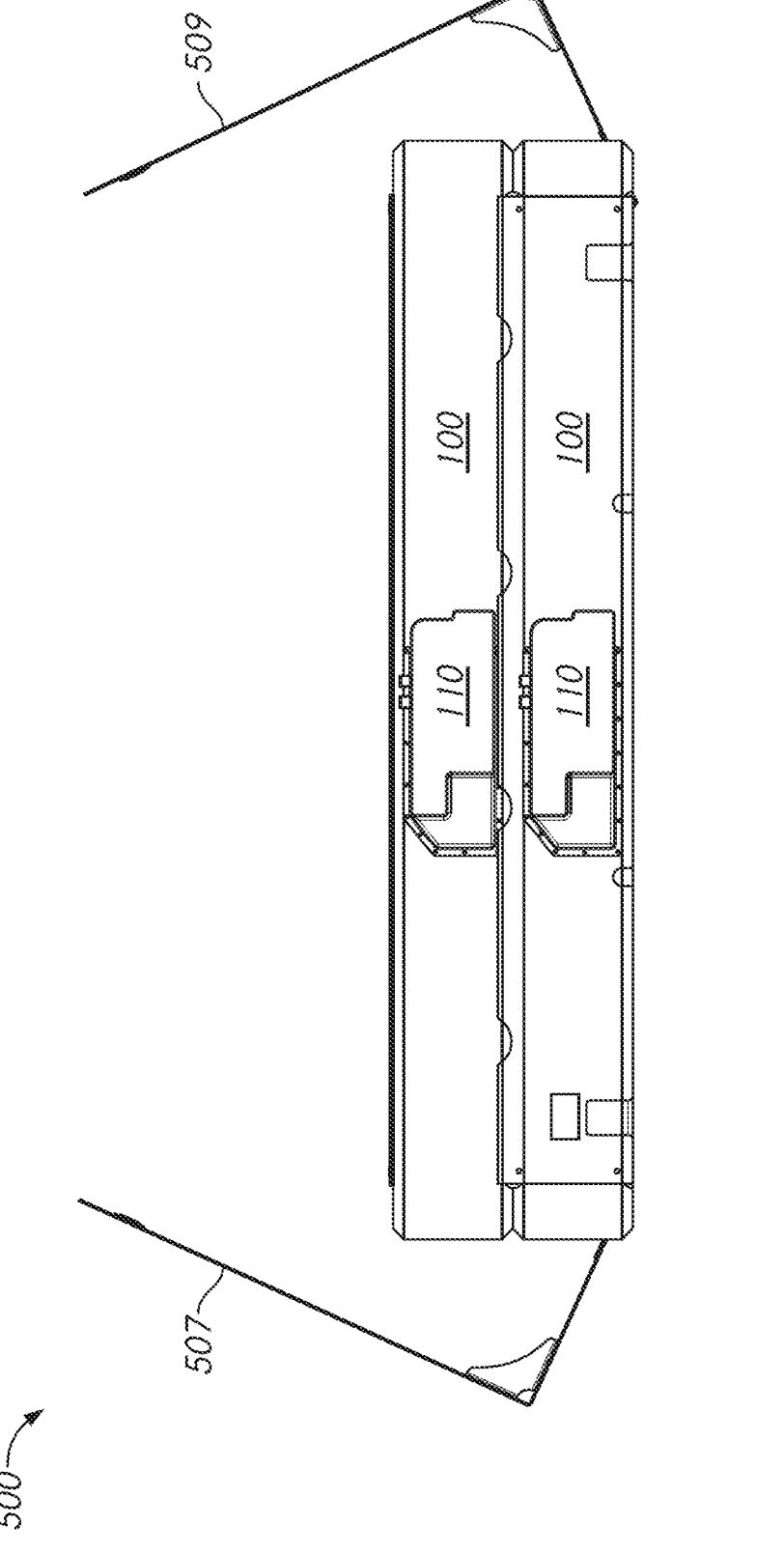

FIGS. 5A through 5C and 6A through 6C illustrate additional variations of how multiple battery assemblies 100 may be attached to, for example, a class 7 or 8 vehicle, such as a semi cab, in arrangements other than underneath the frame rails. For example, FIGS. 5A through 5C illustrate four battery assemblies 100 in a roof mount configuration of an electric vehicle 500. FIG. 5A is a top view, FIG. 5B is a side view, and FIG. 5C is a rear view, with two access panels 507, 509 of roof enclosure 505 in an open configuration. In FIGS. 5A and 5B, the access panels 507 and 509 of the roof enclosure 505 are in a closed configuration.

The roof mount embodiment of FIGS. 5A through 5C does not illustrate mounting bracket assemblies; however, similar mounting bracket assemblies as used for other embodiments may also be used in this embodiment. For example, mounting bracket assemblies that attach to the perimeter structure or frame of the battery assemblies 100 may be used. Further, mounting bracket assemblies that attach two or more stacked battery assemblies to the same mounting bracket may be used. The arrangement of the four battery assemblies 100 of FIGS. 5A-5C with respect to one another may be the same or similar as the arrangement of the four battery assemblies 100 of FIGS. 4A-4B with respect to one another, with a main difference being how the set of four battery assemblies 100 is attached to the vehicle.

Figures 6A, 6B, 6C:
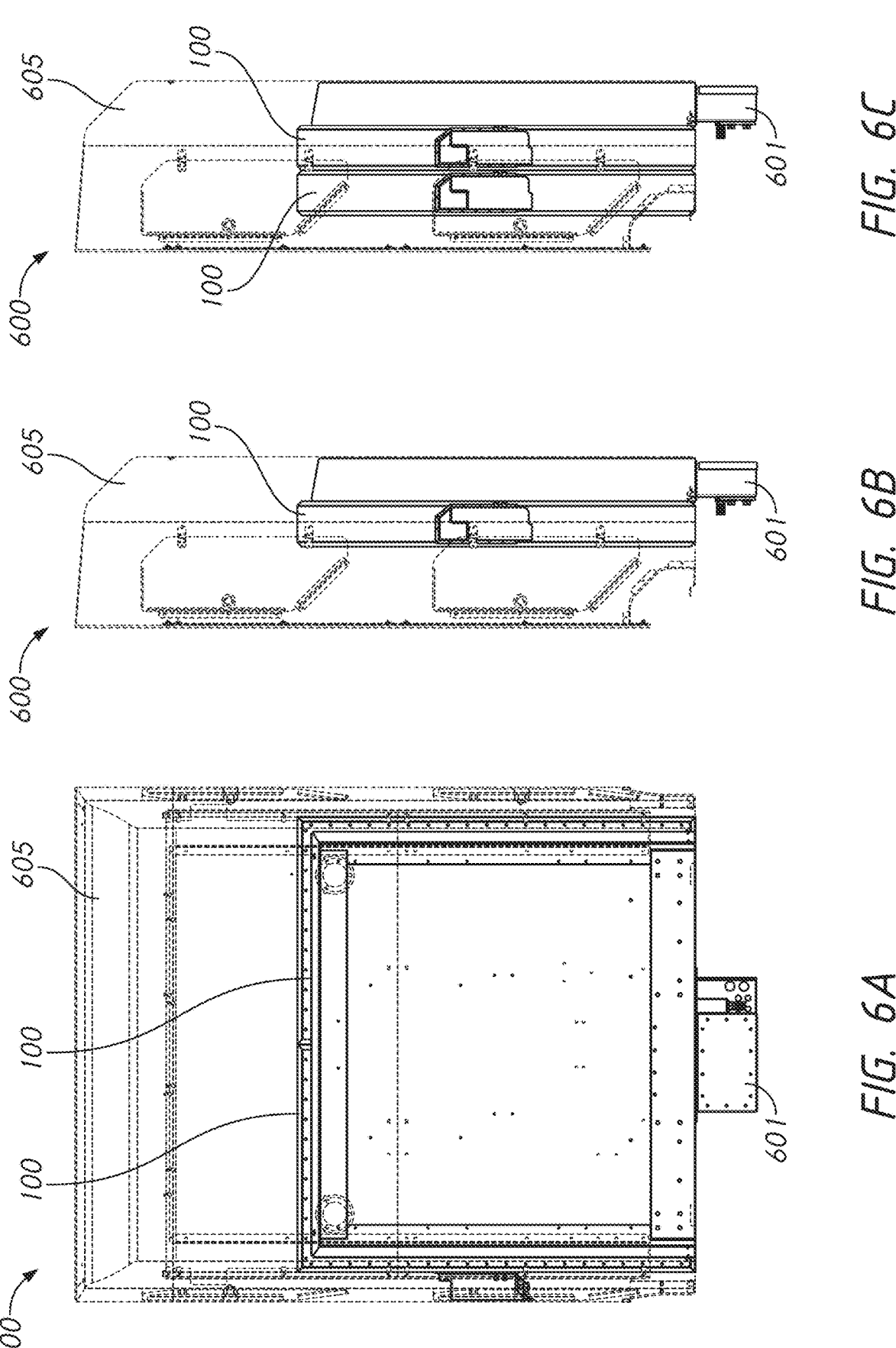
FIGS. 6A-6C illustrate another embodiment of an electric vehicle that positions two or four of the battery assemblies of FIG. 1 in a behind-the-cab mount configuration.

Turning now to FIGS. 6A through 6C, these figures illustrate two (FIG. 6B) or four (FIG. 6C) battery assemblies 100 in a behind the cab ("BTC") configuration of a class 7 or 8 electric vehicle 600 (with only the BTC enclosure portion of the vehicle 600 shown in these figures). FIG. 6A is a back view, and FIGS. 6B and 6C are side views. The BTC configuration includes an enclosure 605 that is supported by a frame member 601. The enclosure 605 is shown partially transparent in each of these figures. The frame member 601 may, for example, be coupled to longitudinal frame members similar to longitudinal frame members 201, 202 of FIG. 4B. The enclosure 605 and/or frame member 601 may support the two or four battery assemblies 100 using various configurations of mounting bracket assemblies, including mounting bracket assemblies similar to mounting bracket assemblies 140 of FIG. 10A or 1040 of FIG. 10B. The relative positioning of the four battery assemblies 100 can be similar to or the same as the underslung configuration of FIG. 4A or the roof mount configuration of FIG. 5B. The above-discussed examples illustrate several examples of how one or more of the modular individual battery pack assemblies 100 can be used in various use cases without having to design use case specific housings and internal structures for each specific use case.

Although the embodiments of FIGS. 4A, 5B, and 6C all include four battery assemblies 100 in the same or similar relative positioning, the modularity of these designs can allow for different configurations that accommodate different use cases. For example, more battery assemblies 100 may be used, fewer battery assemblies 100 may be used, the battery assemblies 100 may be positioned in different relative locations, and/or the like.

In some embodiments, two or more of the above mounting configurations may be used in combination. For example, four battery assemblies 100 could be mounted in an underslung configuration (e.g., FIG. 4A), and four battery assemblies 100 could be mounted in BTC configuration (e.g., FIG. 6C). In such a configuration, if, for example, each battery assembly has an approximately 138 kWh capacity, the total capacity of the system may be approximately 1100 kWh.

Example Battery Assembly Construction

Figure 7A:
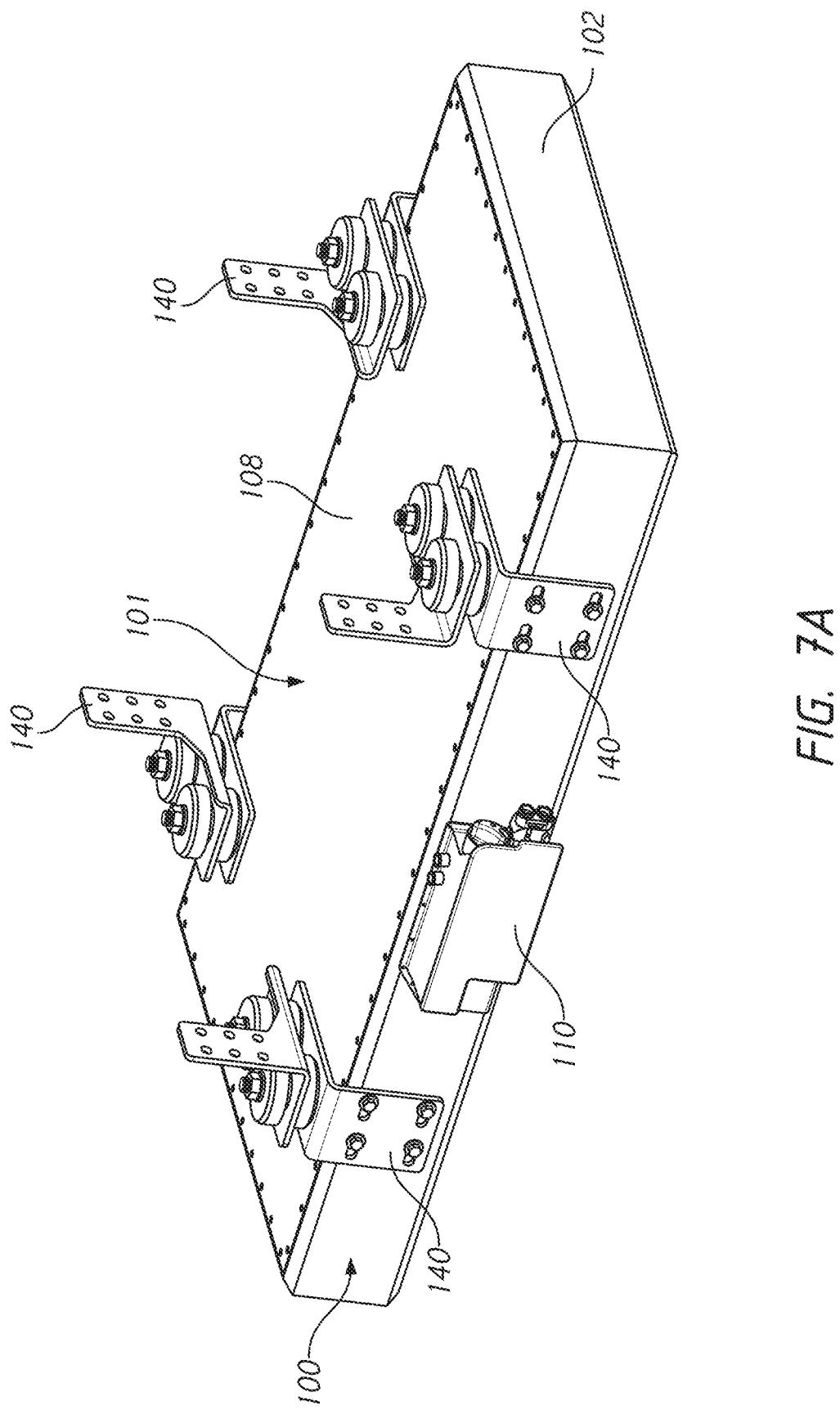
FIGS. 7A-7C illustrate additional features of the battery assembly of FIG. 1.
Figure 7B:
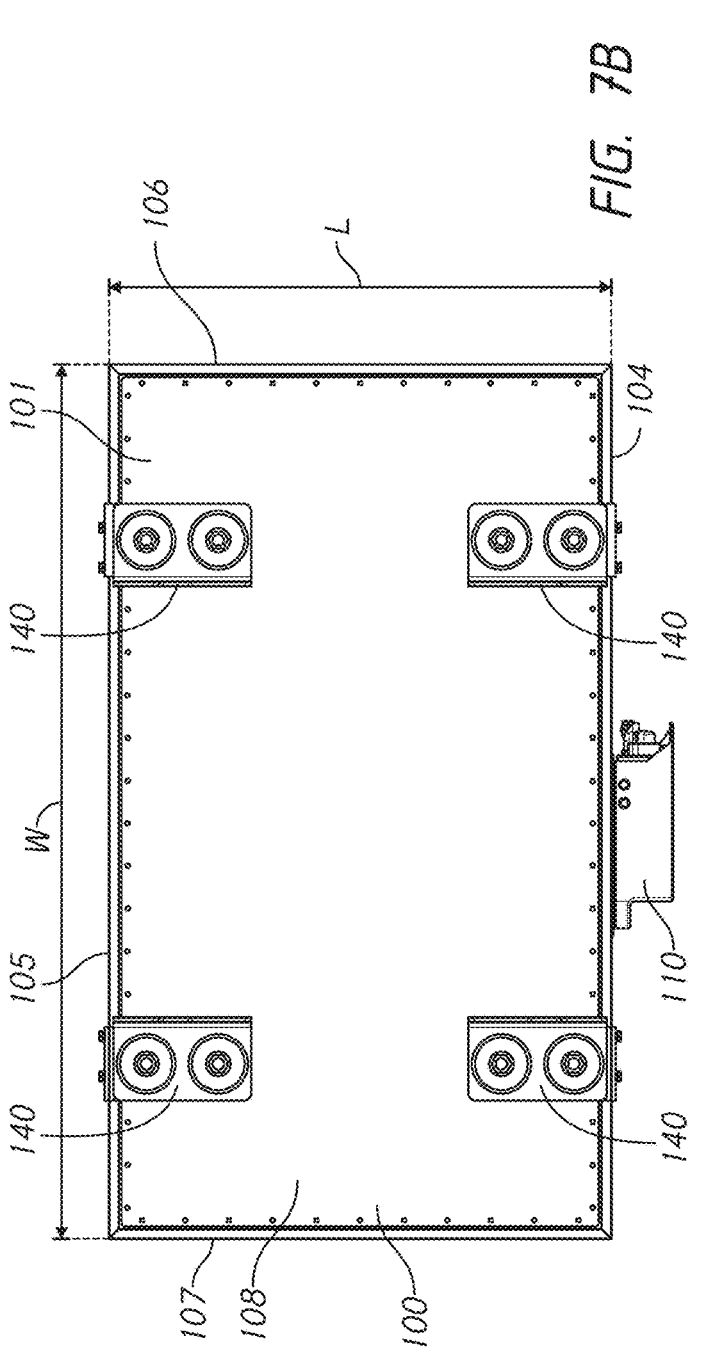
Figure 7C:
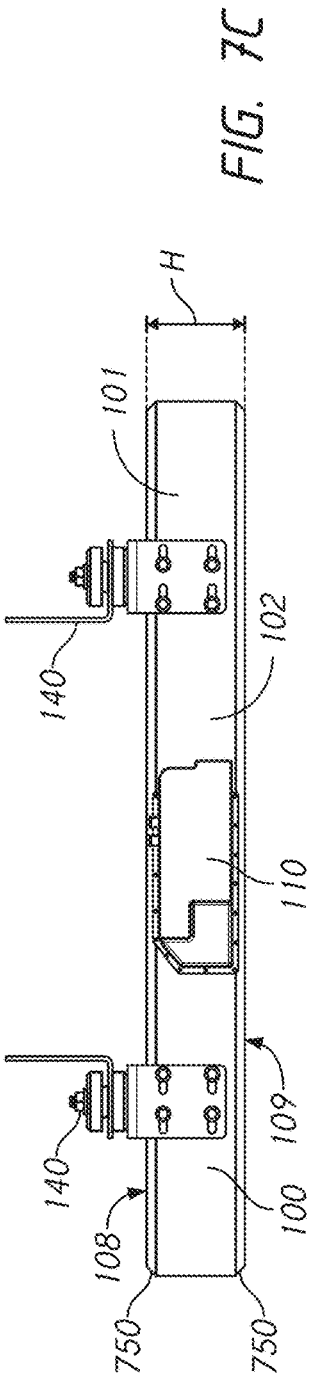

FIGS. 7A through 7C and 8A through 8M illustrate additional details of the battery assembly 100 of FIG. 1. FIGS. 7A, 7B, and 7C depict perspective, top, and front views, respectively, of the battery assembly 100 with the mounting bracket assemblies 140 coupled thereto. As discussed above, the battery assembly 100 desirably comprises a housing 101 having a thin, elongate flat structure, such as rectangular or cuboid. With reference to FIGS. 7B and 7C, the housing 101 comprises a length L measured between external faces of perimeter walls 104 and 105, a width W measured between external surfaces of perimeter walls 106 and 107, and a height H measured between external surfaces of the top and bottom covers 108 and 109 and/or the external top and bottom surfaces of the perimeter frame 102.

The elongate rectangular or flat shape of the housing 101 can be desirable, for example, to enable a single configuration of battery assembly 100 to be used in a variety of applications, either alone or in combination with a plurality of other battery assemblies 100. Some examples of such applications are discussed above. In some embodiments, the elongate rectangular or flat shape of the housing 101 can be described as a housing having a relatively high ratio of width and/or length to height. For example, in the embodiment of FIGS. 7B and 7C, the ratio of width W to height H is approximately 9:1 and the ratio of length L to height H is approximately 5:1. In some embodiments, it can be desirable for at least one of these ratios to be at least 5:1. In some embodiments, it can be desirable for at least one of these ratios (or for both of these ratios) to be at least three-, four-, five-, six-, seven-, eight-, nine-, 10-, or more-to-one. In some embodiments, the width W is the longest of these three dimensions, and the width W is desirably set such that the width W will fit between fairings of a truck when the battery assembly 100 is mounted underneath frame rails, such as is shown in FIG. 4B.

The concepts discussed above with respect to the various ratios may also be used with other housing shapes that are not rectangular or cuboid in shape. For example, if a battery assembly includes a housing that is not rectangular or cuboid in shape, the same ratios as discussed above may be used, but the method of majoring the distances W, L, and H may be different. For example, a three-dimensional coordinate system having three orthogonal directions may be utilized, and the distances W, L, and H may correspond to a measurement along each of the three orthogonal directions between the outermost portions of the battery assembly housing.

It should be noted that, although the shape of the housing 101 and/or of the top and bottom covers 108, 109 is described herein as being flat or substantially flat, some embodiments may not be completely flat. For example, the top and/or bottom covers 108, 109 may take various forms that include, for example, braces, ridges, cutouts, ribs, contoured shapes, and/or the like that may assist in increasing the structural integrity of the covers, reducing the weight of the covers, and/or the like. In some embodiments, even if the top and/or bottom covers 108, 109 include such features, the battery assembly may be configured such that the battery assembly 100 still does not have any features that extend beyond a plane defined by the top and bottom edges of the perimeter structure or perimeter frame 102 (e.g., the top and bottom edges of the extrusion structure 851 shown in FIG. 8B). This can be desirable, for example, to enable the battery assemblies 100 to still be stacked and/or positioned close to and/or abutting the underside of the frame rails or other frame members of a vehicle. With reference to FIG. 7C, some embodiments of battery assemblies may comprise upper and lower chamfers 750 that, for example, avoid a sharp edge at the corners of the elongate flat or rectangular shape.

Figure 8B:
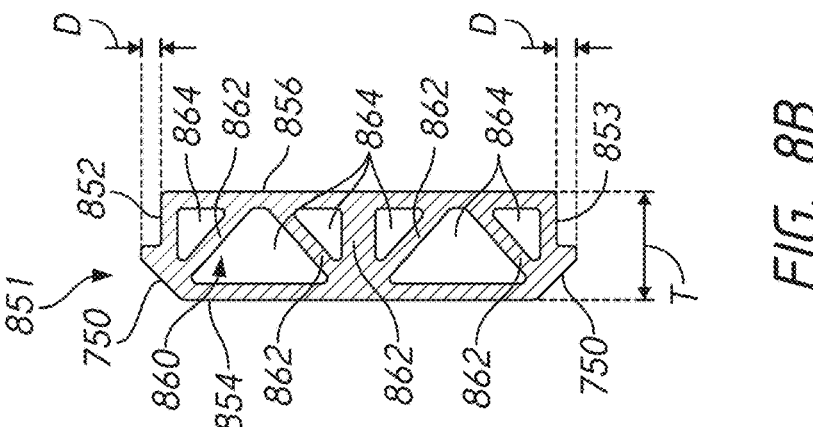
FIGS. 8A-8M illustrate various components that can be used in constructing the battery assembly of FIG. 1.
Figure 8A:
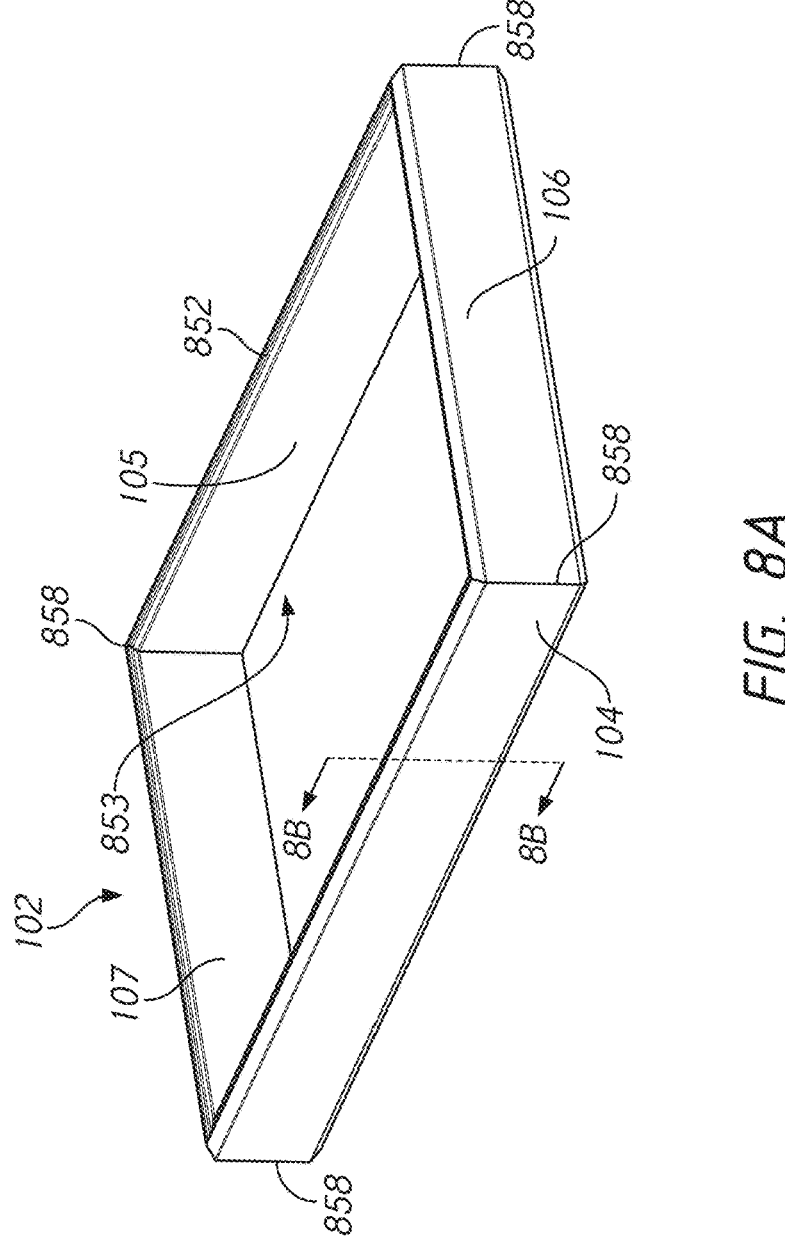

Turning to FIGS. 8A and 8B, FIG. 8A is a perspective view of the perimeter frame or structure 102 of the battery assembly 100. The perimeter frame 102 comprises four members or walls, namely the first, second, third, and fourth walls 104, 105, 106, and 107. The four perimeter walls meet at corners 858. In this embodiment, the corners 858 are desirably mitered corners that are welded together to form a unitary frame structure 102. In some embodiments, the perimeter walls are formed from aluminum, such as extruded aluminum. Other embodiments may use different materials and/or different manufacturing processes.

With reference to FIG. 8B, FIG. 8B is a cross-sectional view of an extrusion profile 851 that forms the four perimeter walls 104, 105, 106, and 107. It can be desirable to form the perimeter walls as an extrusion, for example, because it can allow for efficient manufacturing of a relatively lightweight but strong and impact-absorbing design. Specifically, the extrusion profile 851 includes an impact absorbing structure 860 that is formed by a plurality of structural members 862 (e.g., struts, braces, beams, support members, and/or the like) positioned between an external or outer surface or wall 854 and an internal or inner surface or wall 856. The plurality of structural members 862 have a plurality of voids 864 position therebetween. Such a structure can have a variety of benefits. For example, the structure can form a strong perimeter frame 102 that can support most or all of the internal components of the battery assembly without requiring the top and/or bottom covers 108, 109 to support internal components of the battery assembly. This can allow the top and bottom covers 108 and 109 to be relatively simple and/or lightweight in design. As another example, the impact absorbing structure 860 can help to absorb impact loads, such as loads that may occur during a vehicle crash, by allowing the internal structural members 862 to deform, collapse, bend, and/or the like when the external or outer surface 854 is impacted. This can help to protect the battery modules inside the battery assembly during a crash, thus increasing safety of the battery assembly. Further, by including at least some impact absorbing structures in the perimeter frame 102, the battery assembly may be able to be installed on a vehicle without any additional impact protection structures mounted adjacent to or around the battery assembly, thus making more efficient use of space.

In the embodiment of FIG. 8B, the extrusion profile 851 includes five structural members 862, with four of them oriented at an approximately 45° angle and one of them oriented horizontally. Various other configurations of the impact absorbing structure 860 may be used, and some embodiments may not include such an impact absorbing structure 860. Further, some embodiments may include the impact absorbing structure 860 in some walls, but not in others. For example, if the battery assembly is intended to be mounted in an orientation where walls 106 and 107 extend along a longitudinal direction of a vehicle frame, and thus are more likely to be impacted in a side-impact collision, the walls 106 and 107 may include the impact absorbing structure 860, and the walls 104 and 105 may not (or the walls 104 and 105 may include a thinner and/or lighter-weight impact absorbing structure that is not configured to absorb as much impact as the impact absorbing structure 860).

FIG. 8B further shows that the extrusion profile 851 includes top and bottom recesses 852, 853. These recesses 852, 853 are desirably configured such that, when the four perimeter walls are connected together to form the perimeter frame structure 102, the top and bottom covers 108, 109 can fit within to the recesses 852, 853, respectively. Further detail of this structure is shown in FIGS. 8C and 8D.

Figures 8C, 8D:
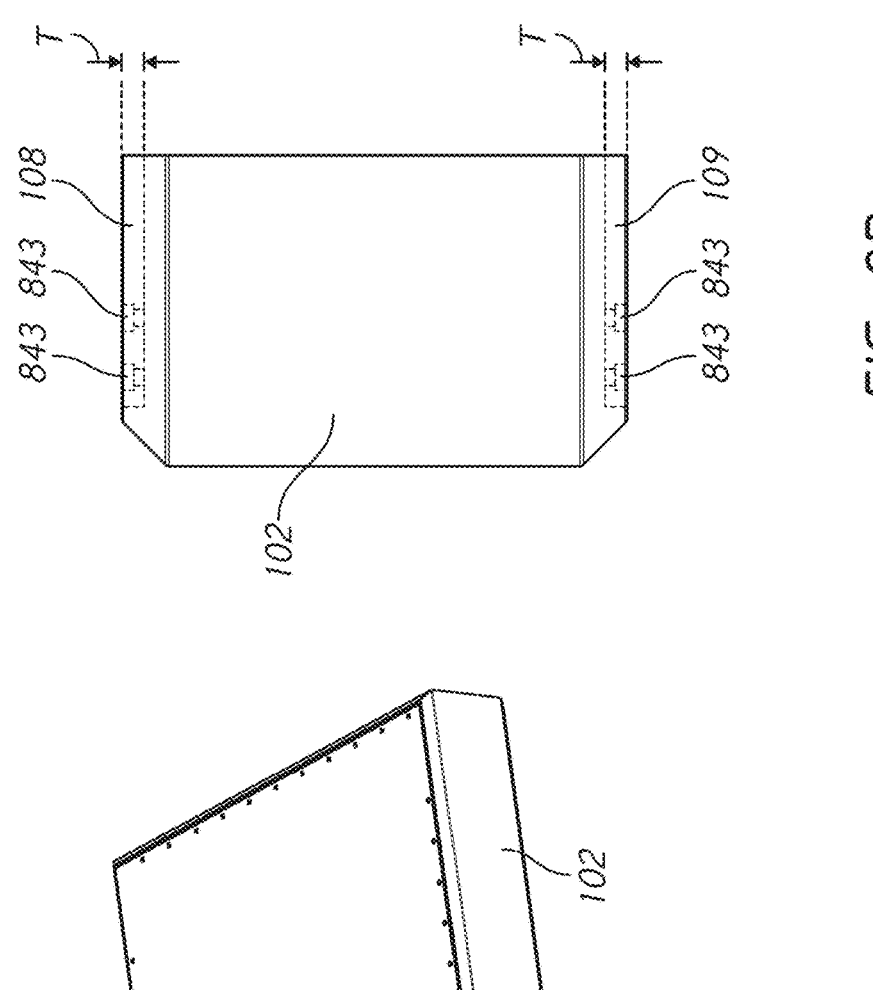

FIG. 8C is a perspective view of the perimeter structure 102 with the top cover 108 shown attached by a plurality of fasteners 841. FIG. 8D is a side view of a portion of the perimeter frame 102, with the top cover 108 and bottom cover 109 shown in hidden lines. It can be seen that each of the top cover 108 and 109 include a plurality of countersunk fastener holes 843 for insertion therein of the fasteners 841. Although not shown in FIG. 8D, the recesses 852, 853 may include threaded apertures that the fasteners 841 engage to hold the top and bottom covers 108, 109 in place. With reference to both FIGS. 8B and 8D, the recesses 852 and 853 each comprise a depth D, and the top and bottom covers 108 and 109 each comprise a thickness T. In some embodiments, the thickness T is equal to or approximately equal to the depth D, such that the outer surfaces of the top and bottom covers 108, 109 will be aligned with or approximately aligned with the uppermost and lowermost surfaces of the wall extrusion profile 851. In some embodiments, however, the thickness T may be less than the depth D, resulting in a somewhat recessed outer surface of the top and bottom covers 108 109, or the thickness T may be somewhat greater than the depth D, resulting in the outer surfaces of the top and bottom covers 108 109 extending beyond the uppermost and lowermost surfaces of the extrusion profile 851.

With continued reference to FIG. 8B, the extrusion profile 851 comprises a thickness T that defines the thickness of the perimeter frame structure walls. In some embodiments, it is desirable for the thickness T of the walls (FIG. 8B) to be greater than the thickness T of the top and bottom covers 108, 109 (FIG. 8D). This can be desirable, for example, because the perimeter walls may be designed to be structural members that support most or all of the components of the battery assembly, while the top and bottom covers 108, 109 may be designed to be covers that separate the internal components of the battery assembly from the external environment, but that do not support internal components of the battery assembly. It should be noted, however, that even if the top and bottom covers 108 and 109 are not intended to be primary loadbearing structural members of the battery assembly, the top and bottom covers 108, 109 may at least provide some additional rigidity to the battery assembly through their connection to the four walls of the perimeter structure 102. In some embodiments, the thickness T of the top and/or bottom covers 108, 109 (FIG. 8D) is no greater than 10%, 20%, 30%, 40%, 50%, 60%, 70%, or 80% of the thickness T of the walls (FIG. 8B).

With continued reference to FIG. 8B, in this embodiment, desirably the voids 864 are not filled with anything, other than potentially air from the atmosphere when the perimeter frame 102 was assembled. In some embodiments, however, one or more of the voids 864 may be filled with, for example, a compressible material, such as foam, a polymer, and/or the like. Filling the voids 864 with such a material may have certain benefits, such as vibration dampening, thermal insulation, and/or the like. Further, in some embodiments, the perimeter frame 102 may be assembled in a vacuum environment, resulting in no air being present in at some or all of the voids 864.

Figures 8E, 8F:
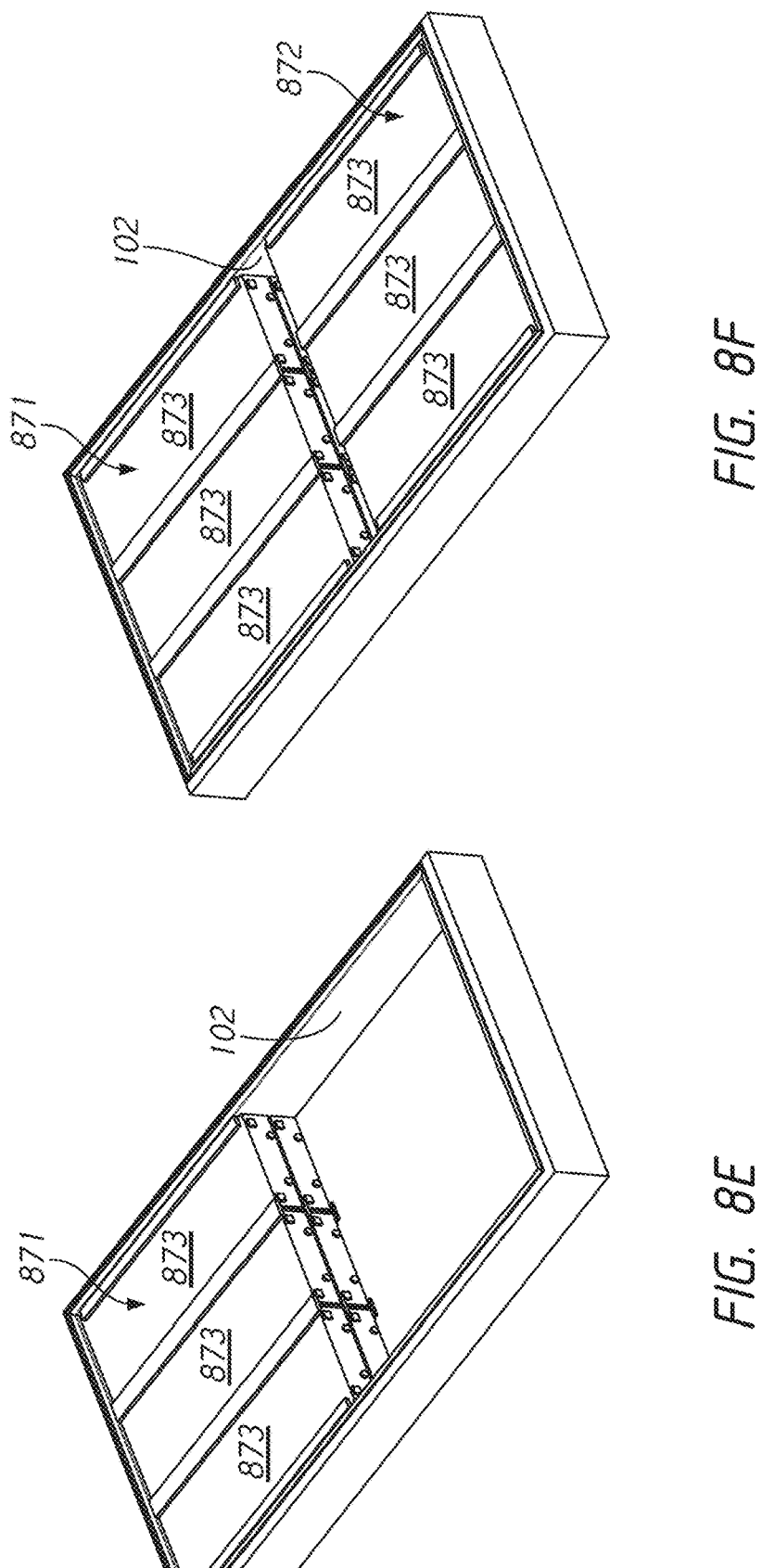
Figure 8H:
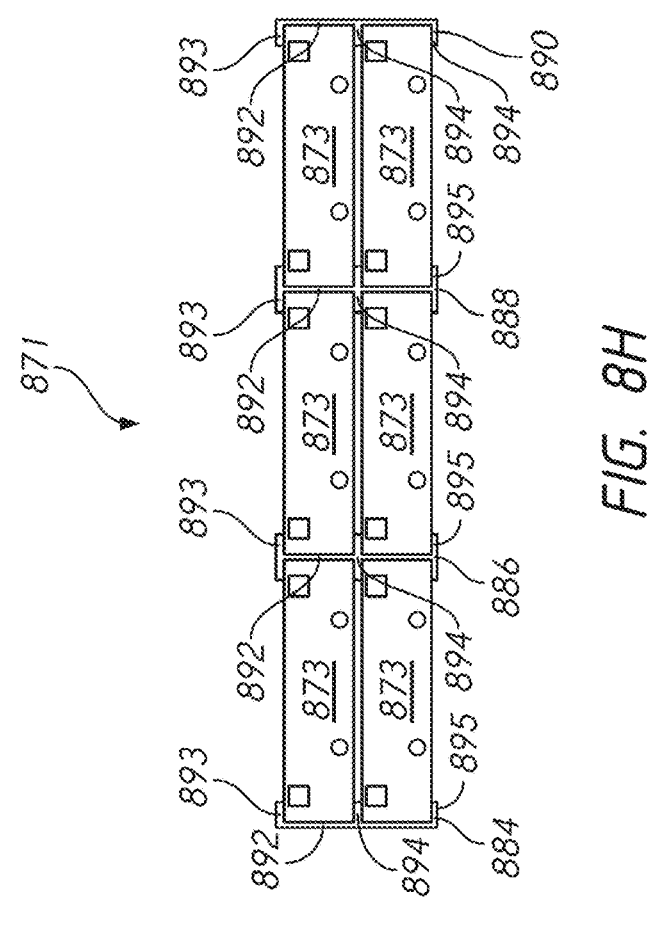
Figure 8G:
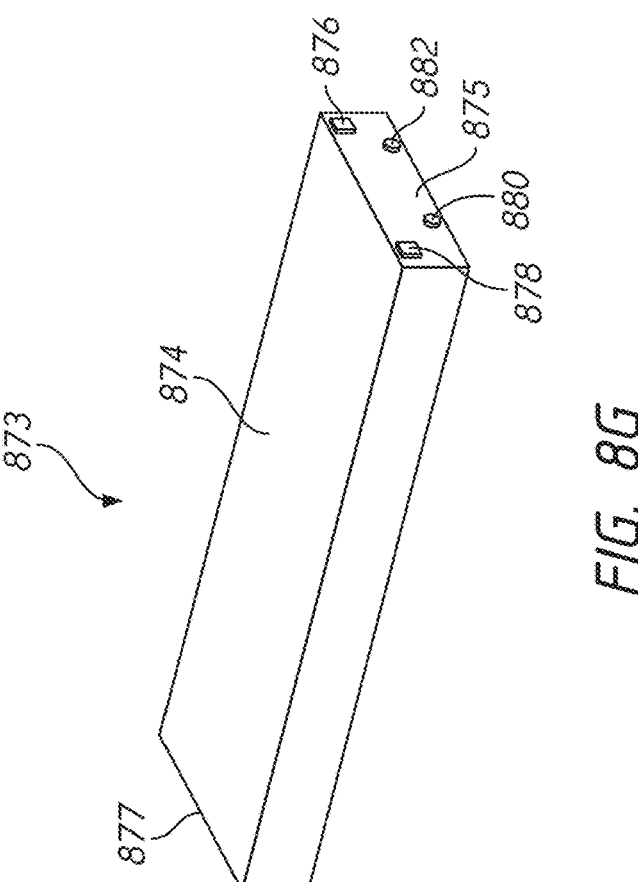
Figures 8I, 8J:
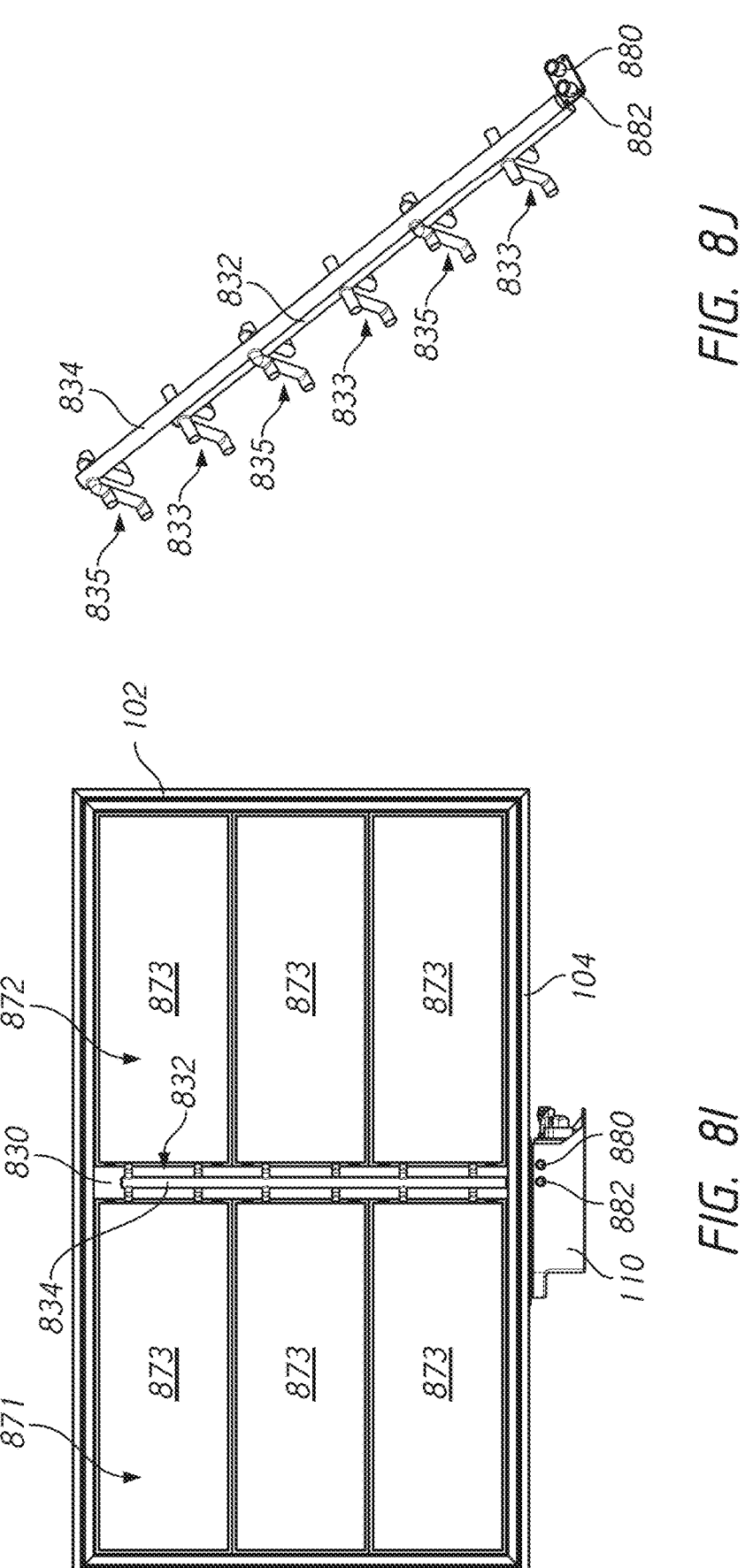

Turning to FIGS. 8E through 8H, these figures illustrate a plurality of battery modules 873 and how they can be positioned inside the perimeter frame 102 in constructing the battery assembly 100. With reference to FIG. 8G, this figure illustrates a perspective view of a battery module 873. The battery module 873 comprises a housing 874 having a first end 875 and a second end 877. At one end of the housing 874, in this case the first end 875, the battery module 873 comprises a positive electrical terminal 876, a negative electrical terminal 878, a coolant inlet 880, and a coolant outlet 882. It can be desirable to have each of these four features at the same general location, such as at the same end of the housing, in order to, for example, allow routing of power and coolant through a common central channel 830, as shown in FIG. 8I. The housing 874 may house one or more battery cells (desirably a plurality of battery cells), and coolant lines for transferring heat from the battery cells.

Turning to FIG. 8H, this figure illustrates a first bank 871 of six battery modules 873. The battery modules 873 are retained together using four module support members 884, 886, 888, and 890. Each of the module support members includes a vertical member 892 and a plurality of lateral protrusions 893, 894, 895. The vertical members and lateral protrusions cooperate to form spaces into which the battery modules 873 are positioned and supported.

Various embodiments may use various mechanisms for positioning and/or supporting the battery modules 873. The support members 884, 886, 888, 890 can be desirable, however, because, among other reasons, they can also be formed through an extrusion process similar to the extrusion process that can form the extrusion profile 851 of FIG. 8B. In some embodiments, the walls of the perimeter frame structure 102 and the support members 884, 886, 888, 890 can be formed using only three extrusion profiles; namely, a first extrusion profile 851 for the perimeter walls, a second extrusion profile for the outer support members 884 and 890, and a third extrusion profile for the inner support members 886 and 888. Although not required, such a design can increase efficiency of manufacturing by, for example, reducing tooling requirements, reducing inventory requirements, increasing production volume, and/or the like.

Turning to FIGS. 8E and 8F, FIG. 8E illustrates the first bank 871 of battery modules inserted into the perimeter frame 102. FIG. 8F illustrates a second bank 872 of battery modules 873 inserted into the perimeter frame 102. The second bank 872 may in some embodiments be identical to the first bank 871. In some embodiments, the first and second banks 871, 872 are affixed to the perimeter frame 102 using fasteners, welding, interlocking features, and/or the like. In some embodiments, the bottom cover 109 of the battery assembly 100 is affixed to the perimeter frame 102 before inserting the banks of battery modules 871 and 872, and at least a portion of the banks 871 and 872 are affixed to the bottom cover 109 using fasteners or other fastening means. In some embodiments, however, the banks 871 and 872 are supported only by the perimeter frame 102 and are not affixed to the top or bottom covers 108, 109.

Moving to FIGS. 8I and 8J, these figures illustrate how coolant is routed through the battery assembly 100. FIG. 8I is a top view of the battery assembly with the top cover removed. This figure shows that a central space or void 830 is formed between the first and second banks of battery modules 871 and 872. Within this central space or void 830 is positioned a coolant inlet pipe 832 and a coolant outlet pipe 834, additional details of which are shown in the perspective view of FIG. 8J. At a proximal end of the coolant inlet and outlet pipes 832, 834 the pipes may pass through perimeter wall 104 and into the power electronics module 110. The pipes are then fluidly coupled to coolant inlets and outlets 880, 882, which are desirably positioned on a wall of the power electronics module 110 to enable coupling to an external coolant pump system (which may, for example, be part of the front-end accessory assembly 204 of FIG. 2A).

As can be seen in FIGS. 8I and 8J, the coolant inlet pipe 832 comprises a plurality of coupling pipes 833 that are configured to be fluidly coupled to the coolant inlets 880 of the battery modules 873 (see FIGS. 8G and 8H). Further, the coolant outlet pipe 834 comprises a plurality of coupling pipes 835 that are configured to be fluidly coupled to the coolant outlets 882 of the battery modules 873 (see FIGS. 8G and 8H). The coolant routing configuration shown in FIGS. 8I and 8J can be beneficial, for example, because it can be relatively simple and efficient, and it can provide limited leak points due to the relatively direct run and relatively simple routing in the central space or void 830. In some embodiments, the same or similar parts can be used for the coolant inlet and outlet pipes 832, 834, which can increase manufacturing efficiency.

Figures 8K, 8L, 8M:
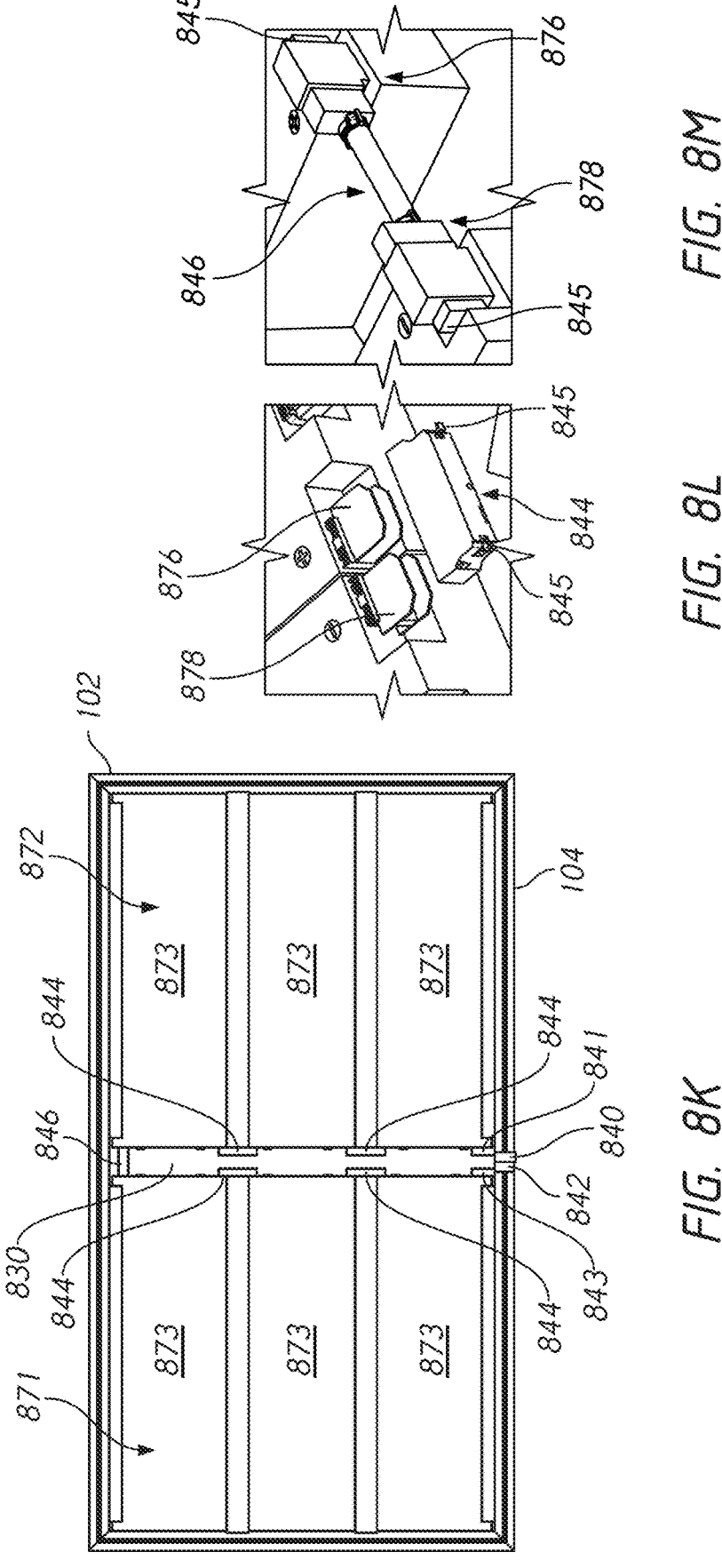

Turning to FIGS. 8K, 8L, and 8M, these figures illustrate how electrical power is routed within the battery assembly and into and out of the battery assembly. Similar to the coolant routing, the electrical routing occurs within a central void or space 830. The electrical routing includes a positive electrical terminal 840 and negative electrical terminal 842 that passes through the front wall 104 of the perimeter structure 102. Although not shown in FIG. 8K, the power electronics module 110 is desirably positioned over the positive and negative electrical terminals 840, 842, such that a power connection to the positive and negative electrical terminals 840, 842 can be made within the power electronics module 110.

The positive electrical terminal 840 is electrically coupled to a connector 841 that couples the positive electrical terminal 840 to the positive electrical terminal 876 of one of the battery modules (see FIG. 8G). Likewise, the negative electrical terminal 842 is electrically coupled to a connector 843 that couples the negative electrical terminal 842 to a negative electrical terminal 878 of another battery module (see FIG. 8G). A plurality of connectors 844 and 846 electrically couple the various battery modules of the first and second banks 871, 872 to one another. The individual battery modules may be connected in series, in parallel, and/or the like, to arrive at an appropriate voltage level and capacity for the overall battery assembly. For example, the battery assembly 100 that includes twelve battery modules 873 may be configured to have a 138 kWh capacity, with a nominal string voltage of 653 V and a max string voltage of 756 V.

In some embodiments, the connectors 844 and 846 are formed by bus bars or other components that are, for example, soldered, welded, mechanically fastened, and/or the like to the positive or negative electrical terminals 876, 878 of the battery modules (see FIG. 8G). It can be desirable to utilize an electrical connection method that is more efficient to couple to and decouple from the battery modules, however. Accordingly, FIGS. 8L and 8M depict example connectors 844 and 846 that can be used as an alternative to bus bars. The connectors 844 and 846 of FIGS. 8L and 8M may comprise electrical connectors that, for example, are pressed onto the positive or negative electrical terminals 876, 878, click into place, and may be easily removed, such as by pressing on the tabs 845. In some embodiments, the connectors 844, 846 may utilize battery module connectors similar to as illustrated in FIGS. 8L and 8M that are sold by KOSTAL Kontakt Systeme GmbH.

Example Power Electronics Module

Figures 9A, 9B:
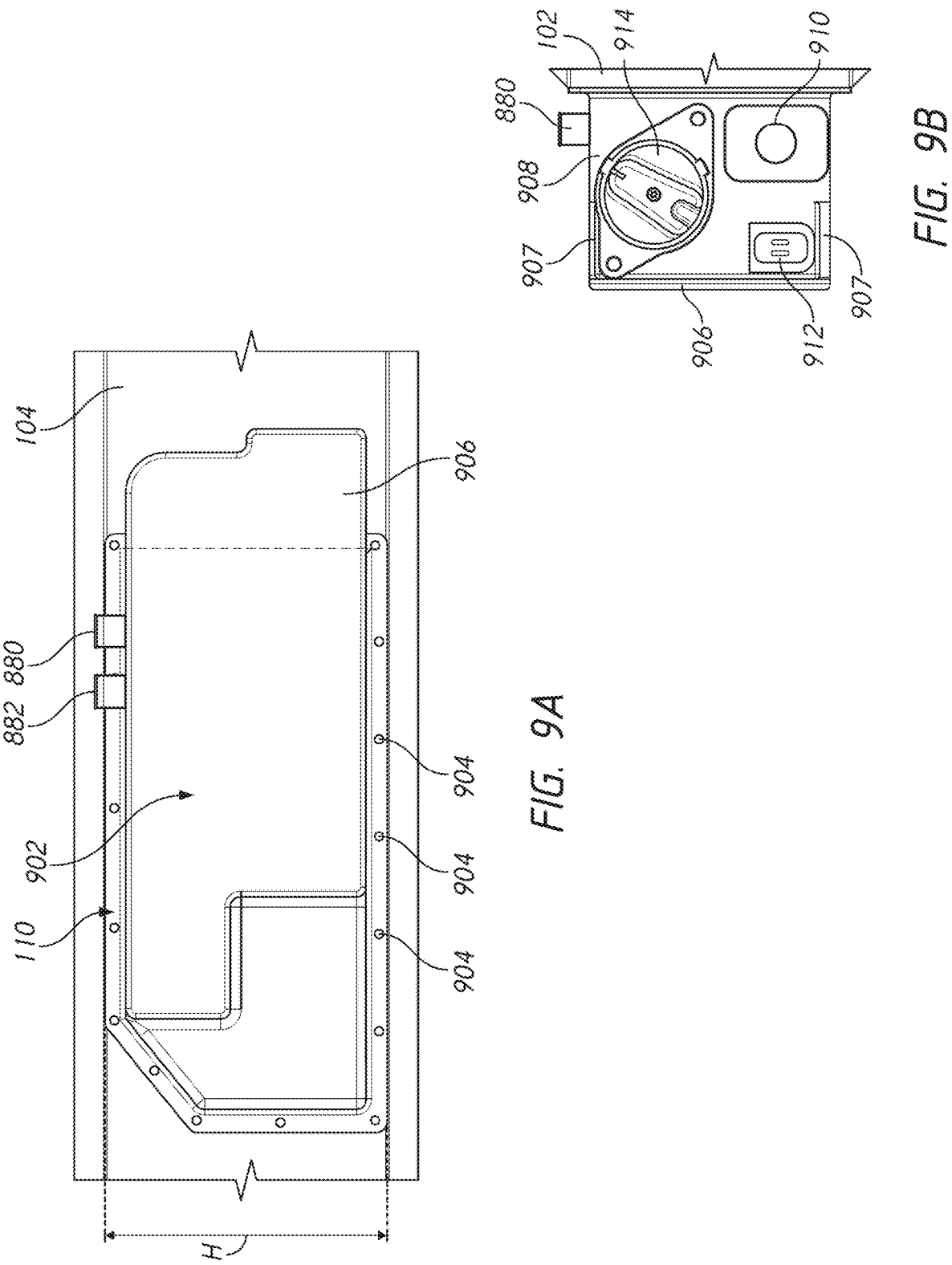
FIGS. 9A-9C illustrate further details of a power electronics module of the battery assembly of FIG. 1.
Figure 9C:
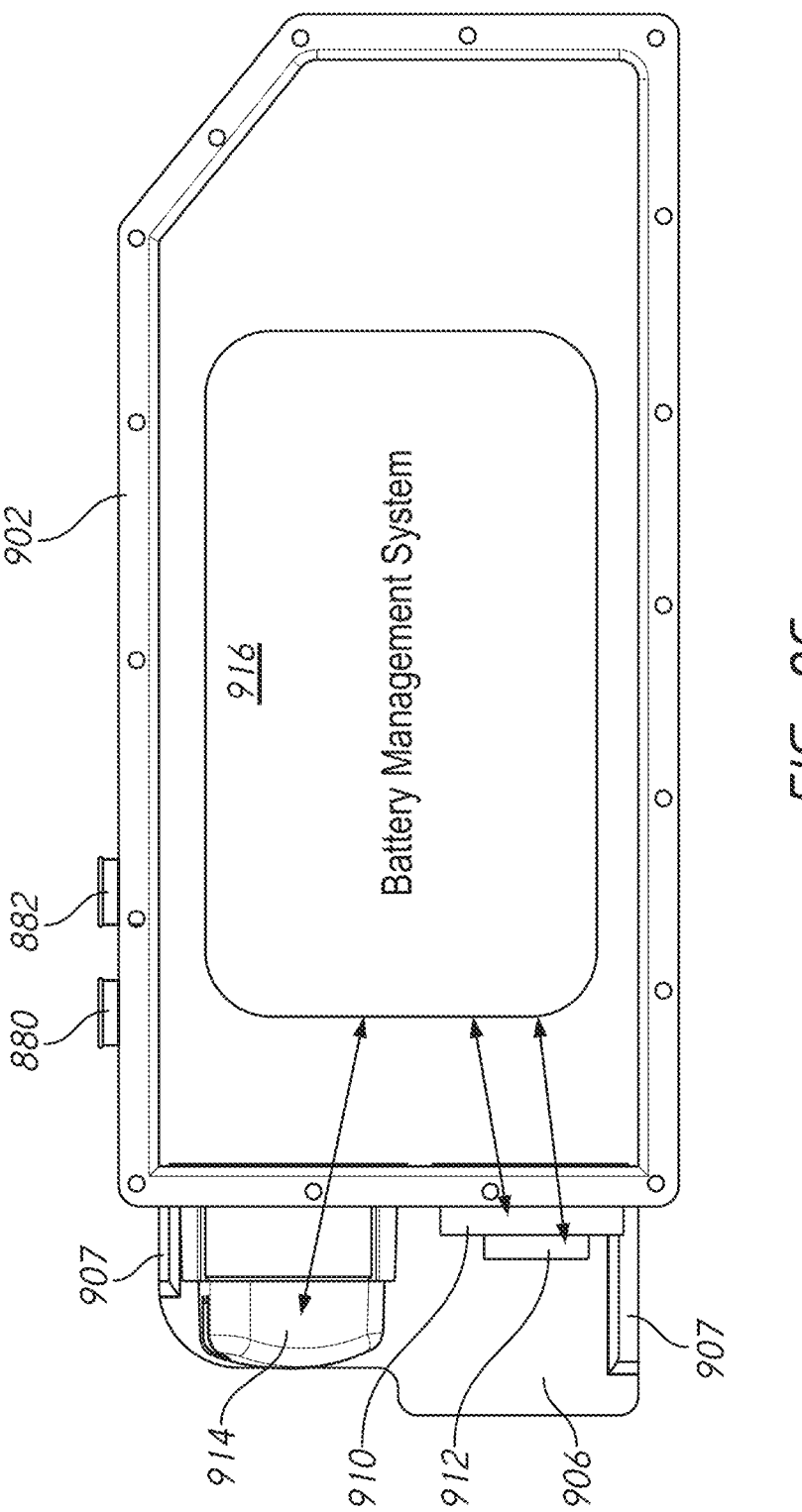

FIGS. 9A-9C illustrate additional details of the power electronics module 110 that is mounted to the external surface of the front perimeter wall 104 of perimeter structure 102 (see FIG. 1). The power electronics module 110 comprises a housing 902 that is attached to the perimeter wall 104 using a plurality of fasteners 904. It can be desirable to have the housing 902 be separable from the perimeter structure of the battery housing, such as to allow for easy maintenance, replacement of the power electronics module 110, replacement of individual components within the power electronics mother 110, and/or the like. In some embodiments, the housing 902 is a cast aluminum housing.

FIG. 9A illustrates an external front view of the power electronics module 110, FIG. 9B illustrates an external side view, and FIG. 9C illustrates an internal rear view. The power electronics module 110 includes coolant inlet 880 and outlet 882, as discussed above with reference to FIGS. 81 and 8J. The power electronics module 110 further comprises a high-voltage connector 910, a low-voltage connector 912, and a switch or service disconnect switch 914. With reference to FIG. 9C, the internal portion of the power electronics module 110 is illustrated as a block diagram that includes a battery management system 916 that is electrically coupled to the high-voltage connector 910, low-voltage connector 912, and service disconnect switch 914. The battery management system 916 may include a number of components, such as fuses, charge controllers, safety devices, microprocessors, and/or the like that cooperate to manage the charging and discharging of the battery modules 873 of the first and second banks 871, 872 (see FIG. 8F). For example, the high-voltage connector 910 may be used to transmit electrical energy to and/or from the battery modules through the battery management system 916, and the low-voltage connector 912 may be used to, for example, communicate with the battery management system 916, supply low-voltage electricity for use in charging the battery modules, and/or the like. The service disconnect switch 914 may, for example, be configured to electrically decouple the battery modules from the high-voltage connector 910 for safety purposes during service.

In some embodiments, the housing 902 of the power electronics module 110 desirably includes a guard or protruding portion 906, as seen in FIGS. 9A through 9C. The guard 906 may comprise a protruding member that protrudes from a forward side of the housing 902 such that the electrical connectors 910, 912 and the service disconnect switch 914 are positioned between or at least partially between the guard 906 and the forward wall 104 of the battery housing. The guard 906 can help to protect the electrical connectors and the switch from road debris and/or the like. In some embodiments, the guard 906 further comprises upper and/or lower gussets 907 that help to strengthen the guard 906 and help to prevent the guard 906 from collapsing in response to an impact load.

With reference to FIG. 9A, the housing 902 of the power electronics module 110 comprises a height H. It can be desirable for the height H to be sized such that the power electronics module 110 does not extend above the top of the battery assembly housing or below the bottom of the battery assembly housing. This can be desirable, for example, to enable stacking of battery assemblies (as shown for example in FIG. 4B) without the power electronics modules 110 interfering with each other or with other portions of the vehicle or battery systems.

Example Mounting Bracket Assemblies

Figure 10A:
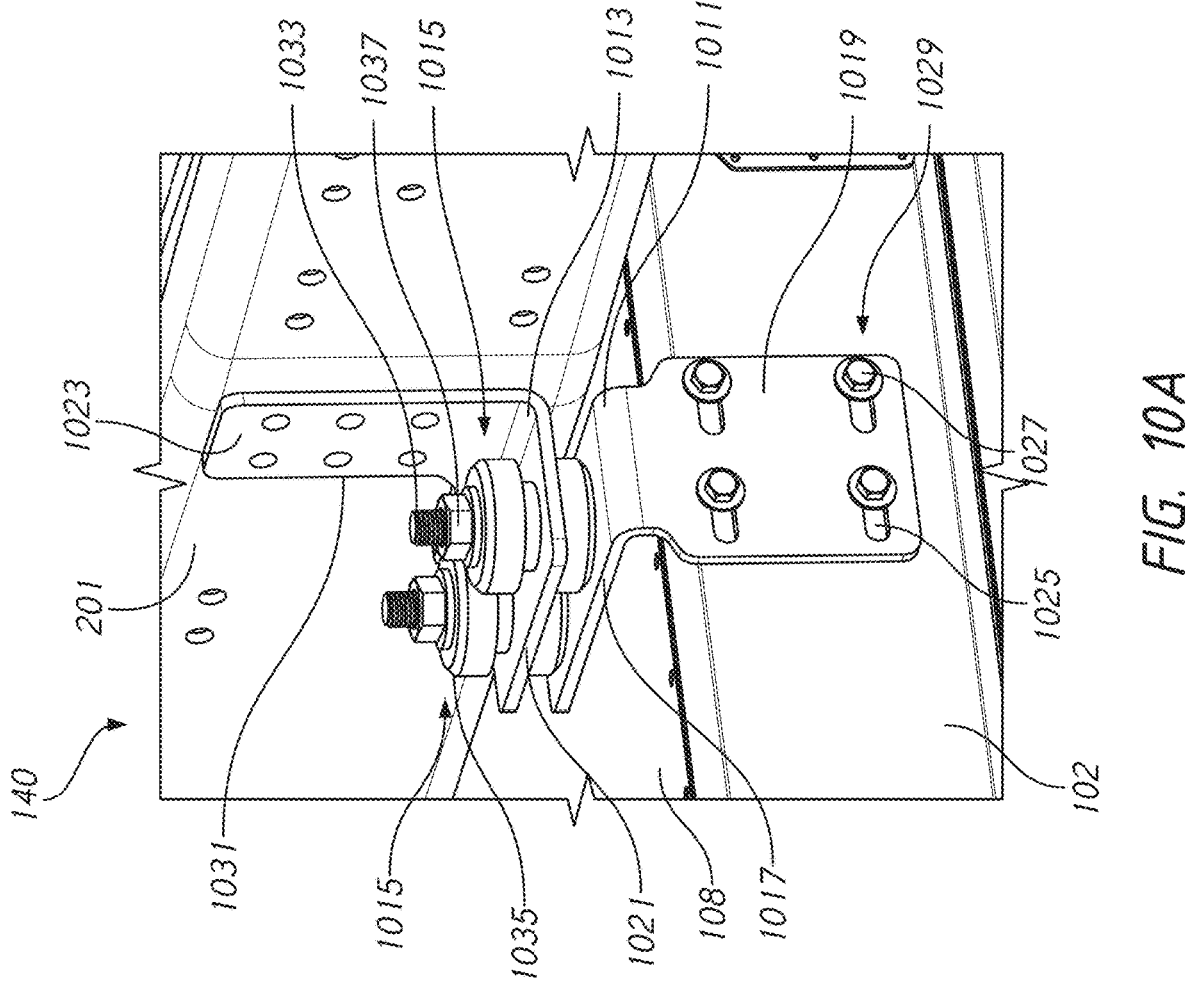
FIGS. 10A and 10B illustrate two embodiments of mounting systems for use with battery assemblies disclosed herein.
Figure 10B:
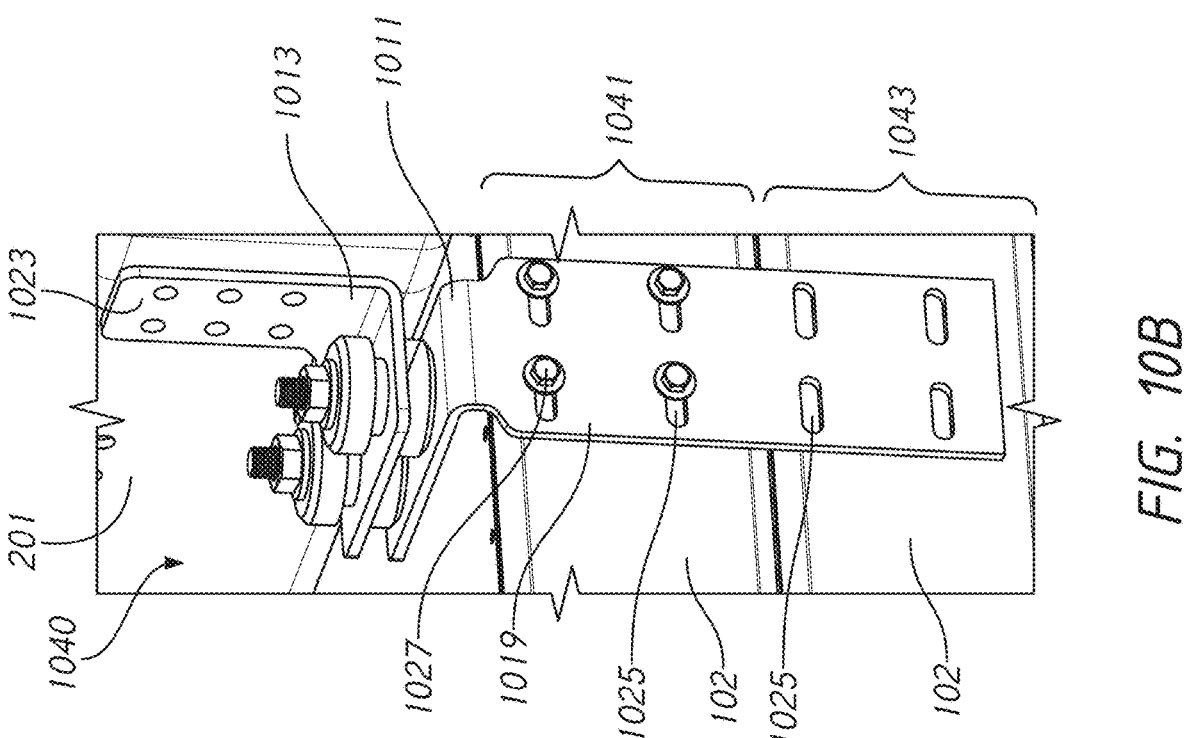

FIGS. 10A and 10B illustrate two examples of mounting systems or mounting bracket assemblies 140 and 1040, respectively. The mounting bracket assembly 140 is configured to support a single battery assembly (e.g., by coupling to perimeter frame 102), while the mounting bracket assembly 1040 is configured to support multiple battery assemblies (e.g., by coupling to multiple perimeters frames 102 of multiple battery assemblies stacked on top of one another). Each of the mounting bracket assemblies 140, 1040 comprises a housing bracket 1011 having a plurality of openings or slots 1025 configured to receive fasteners 1027 to couple the housing bracket 1011 to a perimeter frame 102 of a battery assembly. Using slots (and/or a plurality of holes) may be desirable, for example, to accommodate various vehicles having different spacing between their frame members.

The main difference between the two mounting bracket assemblies 140 and 1040 is that the vertical portion 1019 (e.g., fixed portion, vertical portion, flat portion, and/or the like) of the housing bracket 1011 is longer in the mounting bracket assembly 1040. Specifically, in the mounting bracket assembly 1040, the vertical portion 1019 of the housing bracket 1011 includes both an upper portion 1041 and a lower portion 1043. The upper portion 1041 is configured to be coupled to an upper battery assembly, while the lower portion 1043 is configured to be coupled to a lower battery assembly.

Although not visible in these figures, the perimeter frames 102 of the battery assemblies that the housing brackets 1011 are coupled to may include one or more fastening features 1029 that enable coupling the housing bracket 1011 to the battery assembly perimeter frame 102. For example, the fastening features 1029 may comprise threaded holes that engage the fasteners 1027, an opening, a slot, and/or the like. It should also be noted that the embodiment shown in FIG. 10B is merely intended to show the concept of having a longer vertical portion 1019, and this figure does not show the fasteners 1027 or fastening features 1029 for the bottom battery assembly.

Each of the mounting bracket assemblies 140, 1040 also includes a vehicle bracket 1013 configured to be coupled to a vehicle frame member, such as frame member 201. The vehicle bracket 1013 may comprise a vertical portion 1023 (e.g., fixed portion, vertical portion, flat portion, and/or the like) that includes a plurality of openings 1031 for receiving fasteners (not shown in these figures). In some embodiments, it can be desirable to have an array of openings 1031, with not necessarily every one of the openings 1031 intended to be used in each use case or application. For example, it may be desirable to have more openings 1031 that are needed, such as to accommodate different vehicle frame members.

It can be desirable in some embodiments to include vibration dampening features that at least partially isolate the supported battery assemblies from vehicle vibrations that are transmitted through the frame member 201. Accordingly, the mounting bracket assemblies 140, 1040 each include two vibration dampening assemblies 1015 that couple the housing bracket 1011 to the vehicle bracket 1013. In these embodiments, each of the vibration dampening assemblies 1015 comprises a compressible member 1035, a bolt 1033 that extends from an underside of a horizontal portion 1017 of the housing bracket 1011, through the horizontal portion 1017, the compressible member 1035, and a horizontal portion 1021 of the vehicle bracket 1013, and that extends above a top of the compressible member 1035. The bolt 1033 is retained in place using a nut 1037. In use, the compressible members 1035 can help to dampen vibrations between the housing bracket 1011 and vehicle bracket 1013. The horizontal portions 1017 and/or 1021 may be referred to as overlapping portions that that extend over the top of the housing of the battery assembly. In this embodiment, which positions the battery assembly in an underslung arrangement, with the housing brackets 1011 coupled to forward and rear surfaces of the perimeter frame 102, and the vehicle brackets 1013 coupled to lateral sides of the frame members 201, the overlapping portions 1017 and 1021 extend over the top of the battery assembly housing along a fore-aft direction.

In the embodiments shown in FIGS. 10A and 10B, two vibration dampening assemblies 1015 are utilized, and central axes of each of the vibration dampening assemblies 1015 are oriented parallel to one another. Other arrangements may be used, however. For example, only one vibration dampening assembly may be used, more than two may be used, multiple vibration dampening assemblies may be used and be oriented at different angles to one another, such as to dampen vibrations along multiple directions, and/or the like.

Figure 14A:
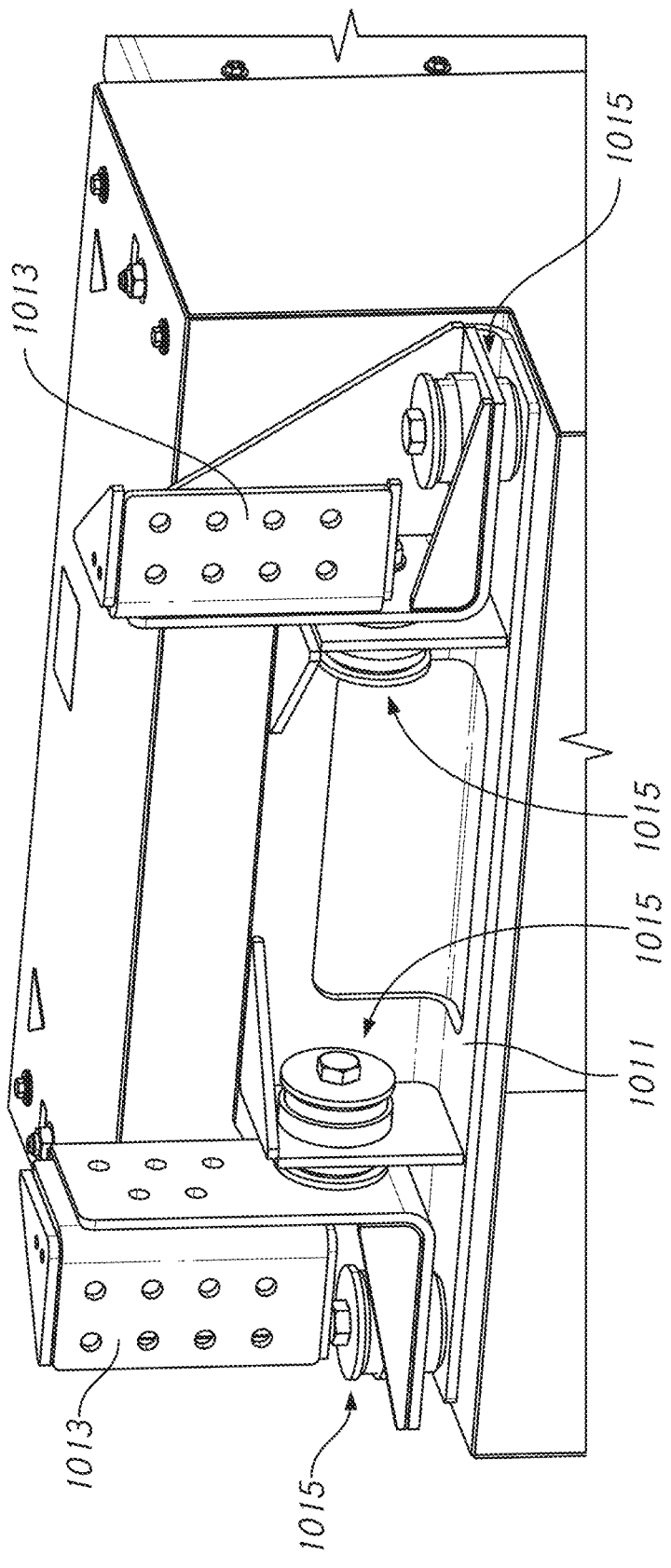
FIGS. 14A-14C illustrate another embodiment of a mounting system for use with battery assemblies disclosed herein.
Figure 14B:
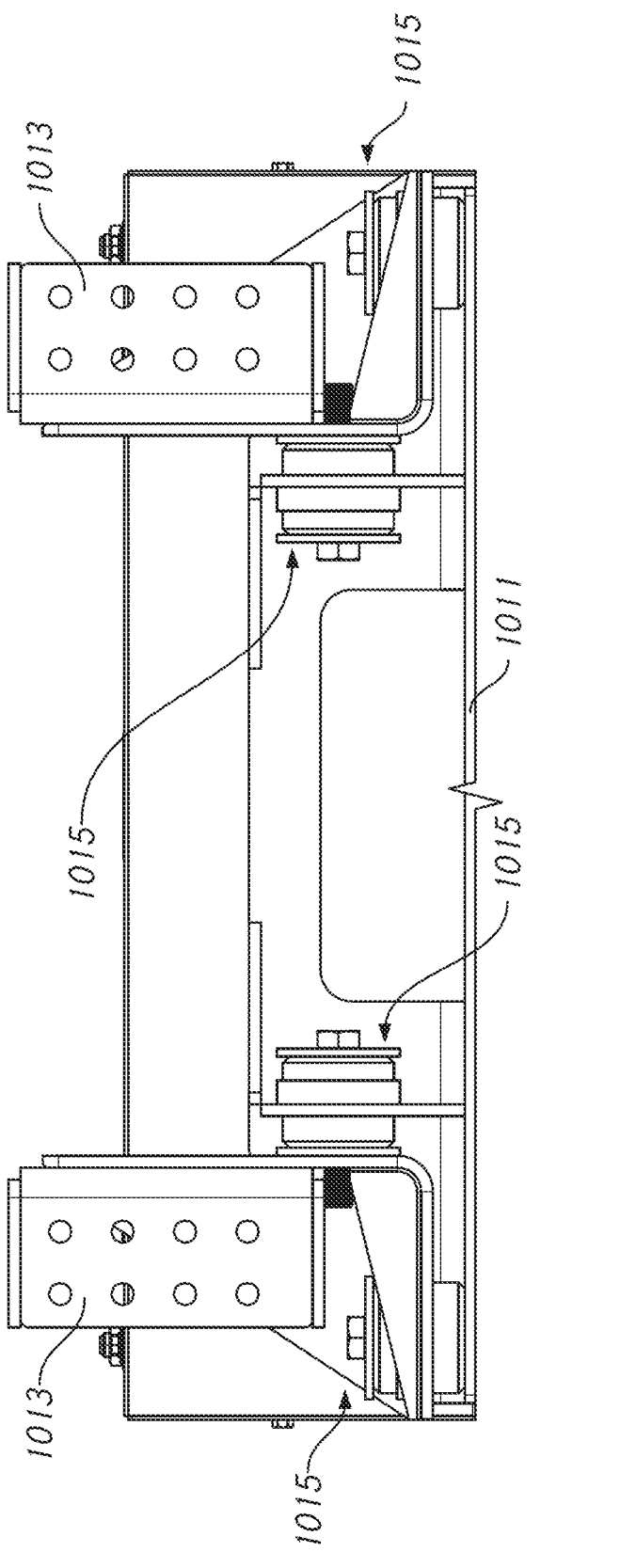
Figure 14C:
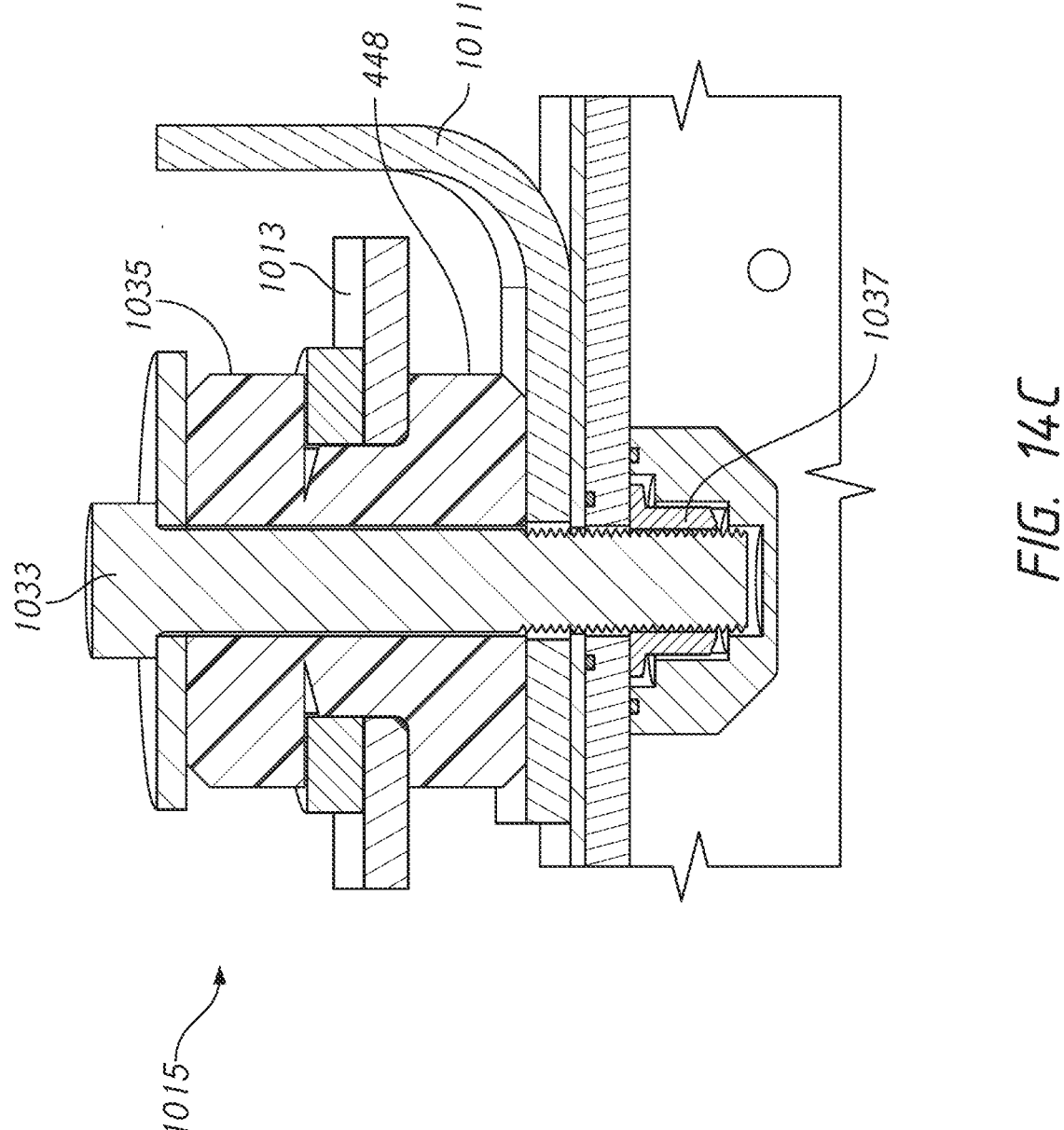

In some embodiments, the mounting system and/or vibration dampening concepts disclosed in U.S. Pat. No. 11,040,610, titled ELECTRIC POWERTRAIN SYSTEM FOR HEAVY DUTY VEHICLES, may be used or modified for use with the systems disclosed herein. For example, the same or similar vibration isolation structure shown in FIG. 8 of the '610 patent may be used or modified for use with the embodiments disclosed herein. As another example, the same or similar mounting bracket and vibration isolation structure shown in FIG. 6 of the '610 patent may be used or modified for use with the embodiments disclosed herein. Notably, the structure shown in FIG. 6 of the '610 patent includes the concept of having vibration isolation or dampening in more than one direction. U.S. Pat. No. 11,040,610 is incorporated by reference herein in its entirety. FIGS. 14A-14C of the present application illustrate concepts similar to as shown in the '610 patent. Specifically, FIGS. 14A and 14B illustrate a configuration wherein multiple vibration dampening assemblies 1015 are oriented at different angles, and FIG. 14C illustrates a cross-sectional view of a vibration dampening assembly 1015 of FIGS. 14A and 14B.

Returning to FIGS. 10A and 10B, in these embodiments, the vertical portions 1023 of the vehicle brackets 1013 are desirably oriented perpendicularly to the vertical portions 1019 of the housing brackets 1011. Further, the vertical portions 1023 and 1019 both extend along a vertical direction. This configuration can be desirable, for example, because it can result in a relatively strong connection to both the frame member 201 and the battery assembly perimeter frame 102. Further, this configuration can be desirable because the fasteners that attach the vertical portion 1023 to the frame member 201 and the vertical portion 1019 to the housing 102 are oriented perpendicularly to the main axis of vibration dampening (e.g., the vertical or up and down direction).

The embodiments of FIGS. 10A and 10B illustrate mounting bracket assemblies 140 and 1040 used in an underslung configuration, such as is shown in FIGS. 2A, 3A, and 4A. The same mounting bracket assemblies, or modified versions thereof, may be used to mount battery assemblies in, for example, a roof mount configuration (see FIG. 5A), or a behind the cab configuration (see FIG. 6A). In each case, it can be desirable for the housing bracket 1011 to be configured to couple to the perimeter frame 102 of the battery assembly. Depending on the use case, however, such as the orientation of the battery assemblies in use, the orientation of the frame member relative to the battery assemblies, and/or the like, the relative positions of the various portions of the mounting bracket assemblies (e.g., portions 1023, 1021, 1017, 1019, and vibration dampening assemblies 1015) may be varied.

It should be noted that, although the embodiments of FIGS. 10A and 10B are both configured to attach to the lateral outer surfaces of the perimeter frame 102 of a battery assembly, some embodiments may additionally or alternatively attach elsewhere, such as on the top or bottom covers 108, 109 of the battery assemblies, on the top or bottom edges of the perimeter frame 102, and/or the like.

Figure 11A:
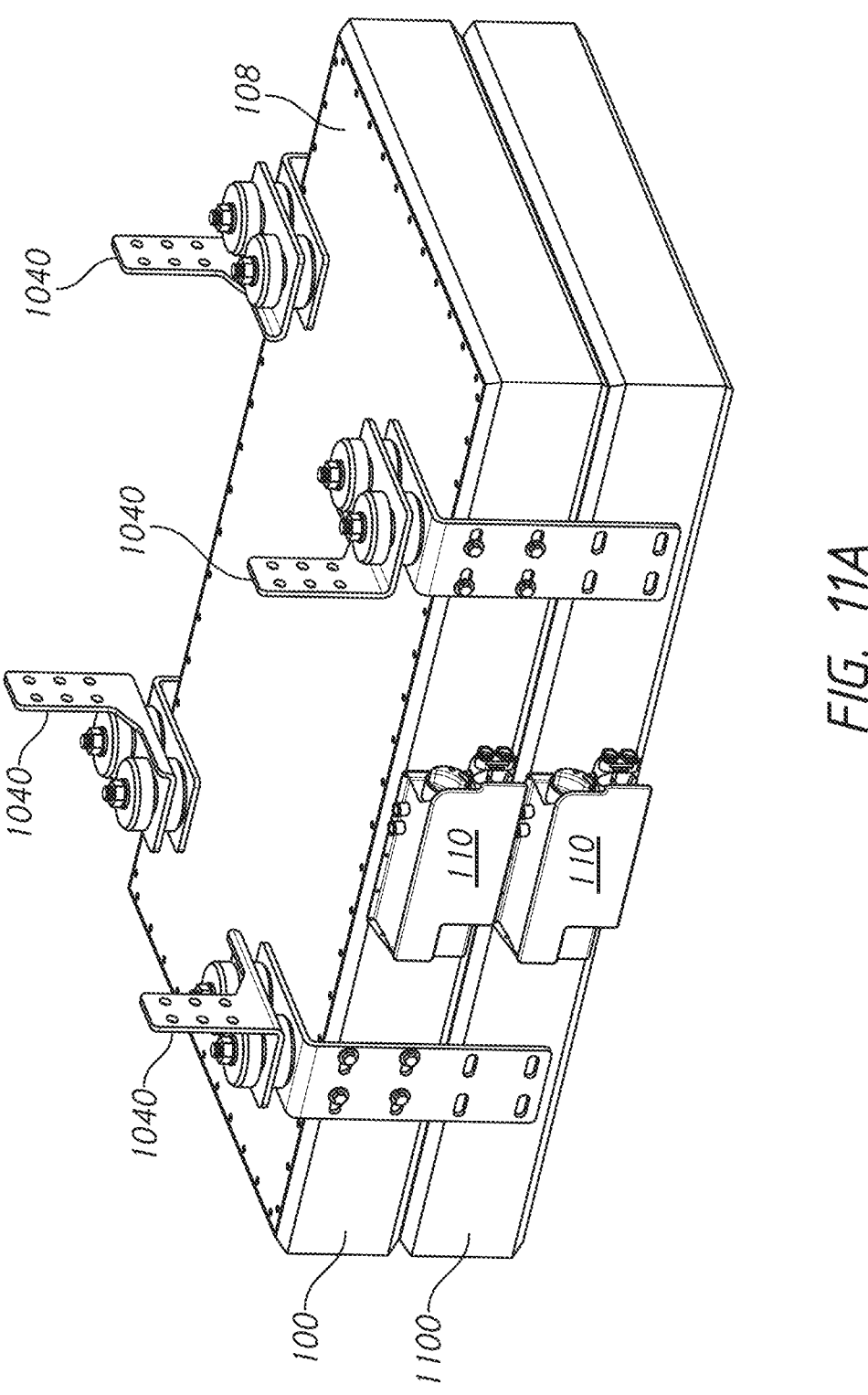
FIGS. 11A-11C illustrate an embodiment of a stacked configuration that utilizes two of the battery assemblies of FIG. 1.
Figure 11B:
Figure 11C:
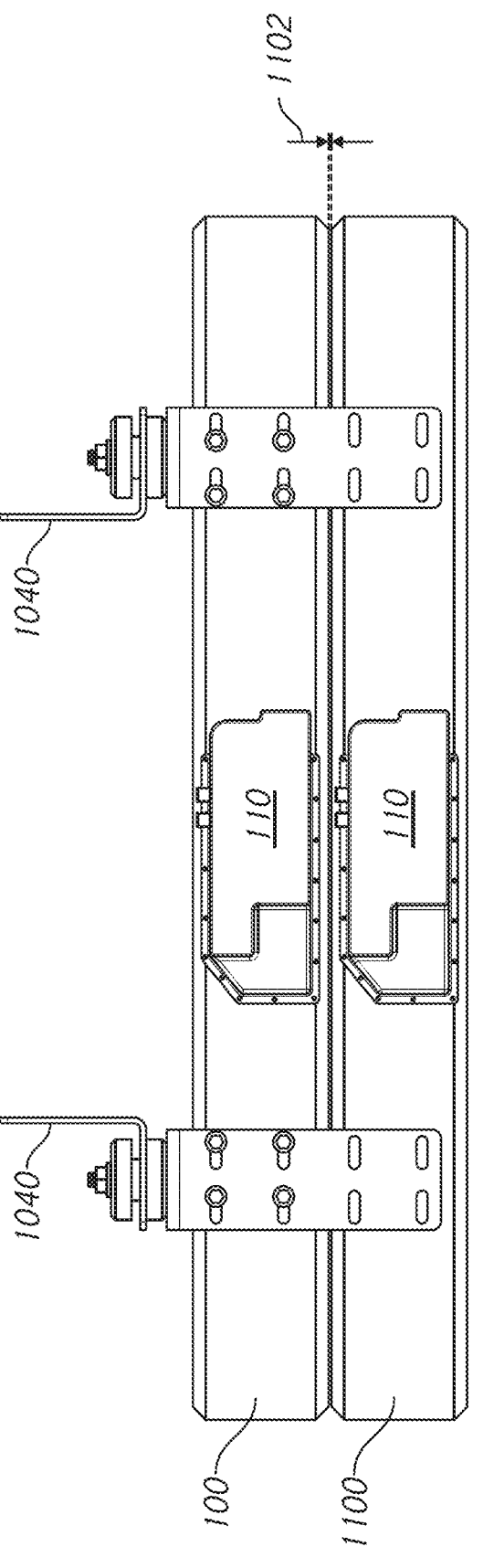

Turning now to FIGS. 11A through 11C, these figures provide additional views of mounting bracket assemblies 1040 used in a configuration that supports two battery assemblies 100, 1100 stacked on top of one another. The first battery assembly 100 can be identical to the battery assembly 100 of FIG. 1, and the second battery assembly 1100 may also be identical to the battery assembly 100 of FIG. 1. FIG. 11A is a perspective view, FIG. 11B is a top view, and FIG. 11C is a front view. Such a configuration may be desirable, for example, to double the battery storage capacity of the battery system (such as, for example, to go from approximately 138 kWh to approximately 276 kWh).

With reference to the front view of FIG. 11C, in some embodiments, there may be a gap 1102 between the first battery assembly 100 and the second battery assembly 1100 when attached to the mounting bracket assemblies 1040. It may be desirable for the gap 1102 to be relatively small in order to conserve space. For example, the gap 1102 may be designed to be large enough to account for different rates of thermal expansion in different components of the assembly but otherwise as small as is practical. For example, the gap 1102 in some embodiments may be no greater than the thickness T of the top or bottom covers 108, 109 (see FIG. 8D). In some embodiments, the gap 1102 may be no greater than 10%, 25%, 50%, 75%, 100%, 125%, 150%, 175%, or 200% of the thickness T of the top or bottom covers 108, 109. In some embodiments, the gap 1102 may be no greater than 1%, 5%, 10%, 20%, or 25% of the height H of the battery assembly (see FIG. 7C). In some embodiments, there may be no gap 1102, and the mounting bracket assemblies 1040 may be configured to have a topmost portion of the second battery assembly 1100 abutted against a bottommost portion of the first battery assembly 100.

Example Range Extender Assemblies

Figures 12A, 12B:
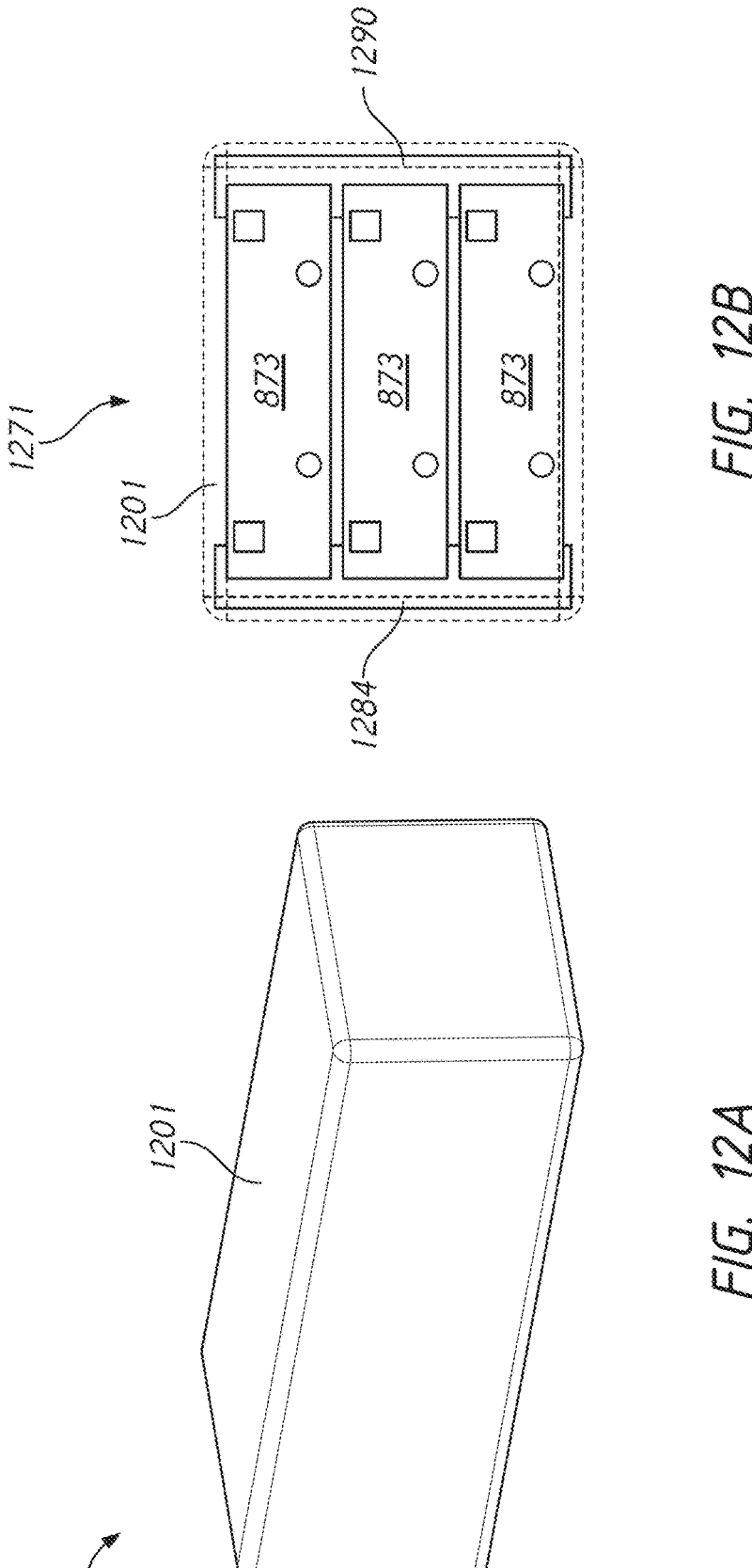
FIGS. 12A-12D illustrate an embodiment of a range extension module and its use with the battery assembly of FIG. 1.

FIGS. 12A through 12D illustrate an example of a range extension system that can be used to add additional capacity to the modular battery systems disclosed herein without having to add another full battery assembly 100. FIG. 12A illustrates a perspective view of such a range extension battery assembly 1200. The battery assembly 1200 comprises a housing 1201 that may take various forms or be constructed in various ways. For example, in this embodiment, the housing 1201 comprises an elongate rectangular or cuboid structure. The structure of the housing 1201 may be formed similarly to the housing 101 of battery assembly 100 (e.g. as a structural perimeter frame with top and bottom covers), or the housing 1201 may be formed differently.

FIG. 12B illustrates an end view of the battery assembly 1200 with the housing 1201 shown partially transparent so that internal features of the battery assembly 1200 can be seen. Specifically, the battery assembly 1200 includes a single bank 1271 of three battery modules 873. The battery modules 873 may be similar or identical to the battery modules 873 discussed above with reference to FIGS. 8G and 8H. further, the three battery modules 873 may be retained in place using module supports 1284 and 1290, which may be similar or identical to module supports 884 and 890 discussed above with reference to FIG. 8H.

Although not shown in FIGS. 12A and 12B, the housing 1201 of battery assembly 1200 may include one or more externally accessible connectors, couplings, and/or the like that enable electrical and/or coolant connections to an external power electronics module. For example, in some embodiments, a similar power electronics module to the power electronics module 110 of FIG. 1 could be mounted to an external surface of the housing 1201. In the illustrated embodiment, however, with reference to FIGS. 12C and 12D, an external power electronics module 1210 is attached at a location remote from the range extender battery assemblies 1200.

Figures 12C, 12D:
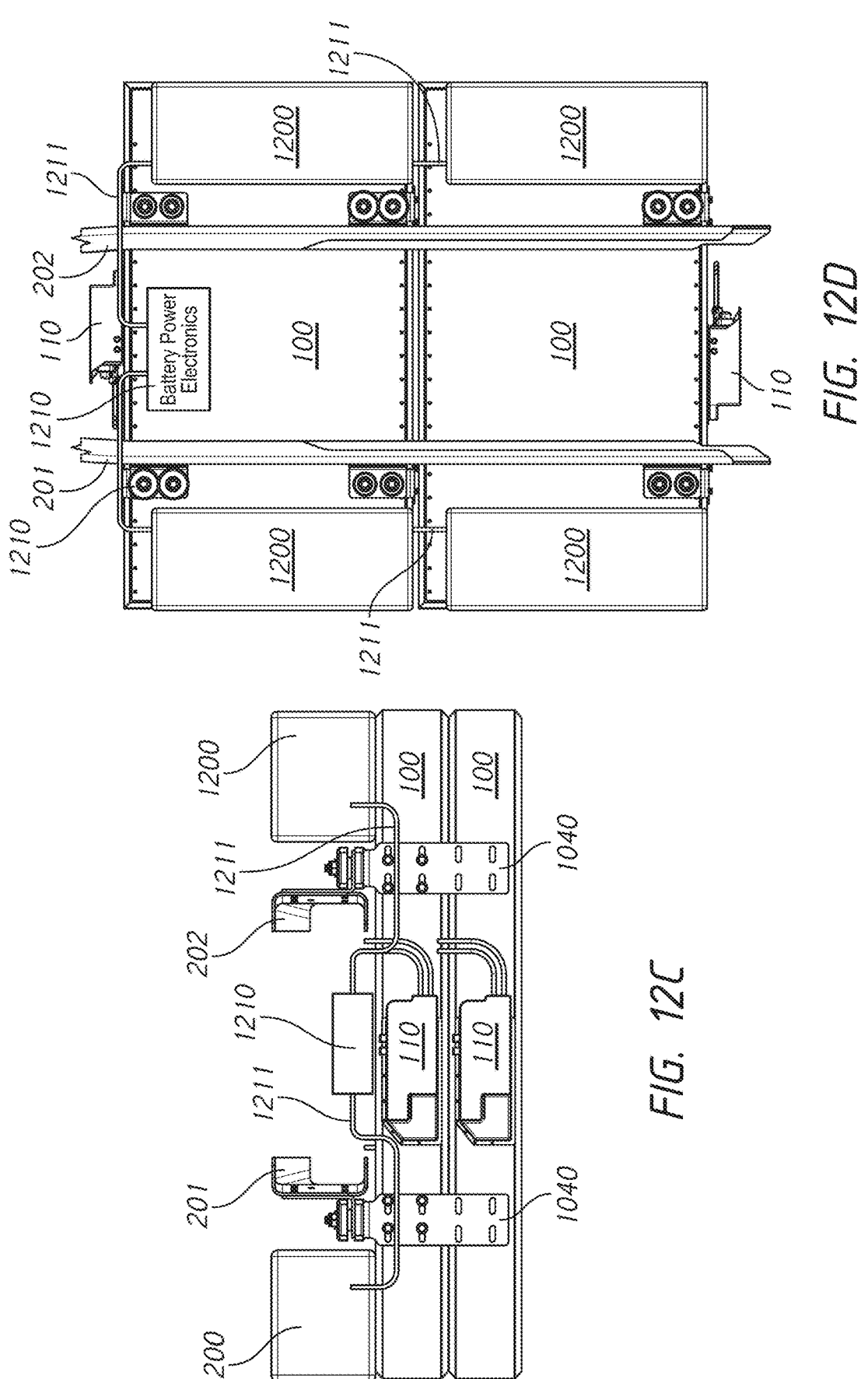

FIG. 12C is a front view, and FIG. 12D is a top view, of four range extender battery assemblies 1200 used in combination with the example battery system of FIGS. 4A and 4B, discussed above. In this embodiment, each of the four battery assemblies 1200 is positioned above a top surface of a battery assembly 100. The battery assemblies 1200 may be mounted in various ways, such as by attaching to the top surface of the battery assemblies 100, using mounting brackets (not shown) that extend from the perimeter wall structure of one or more of the battery assembly 100 to a perimeter wall structure of the battery assemblies 1200, and/or the like.

FIGS. 12C and 12D illustrate a single battery power electronics module 1210 that is also positioned atop a battery assembly 100 in a location remote from any of the battery assemblies 1200. In this case, the power electronics module 1210 is positioned in a space between the frame members or frame rails 201, 202, while the battery assemblies 1200 are positioned laterally outside of the space between the frame members or frame rails 201, 202. Such a configuration can result in an efficient use of space that allows the size of the battery assemblies 1200 to be increased or maximized, because the power electronics module 1210 does not need to be fit into the space where the battery assemblies 1200 are positioned.

The battery assemblies 1200 are desirably coupled to the power electronics module 1210, both electrically and for coolant distribution, through cables, cable assemblies, or umbilical assemblies 1211. For example, one or more electrical lines and/or coolant lines may pass from the power electronics module 1210 to one or more of the battery assemblies 1200. The power electronics module 1210 may be similar to and include similar features as the power electronics module 110 discussed above.

The configuration shown in FIGS. 12C and 12D may be desirable, for example, because individual coolant and/or electrical connections to other systems of the vehicle may not need to be made to each individual battery assembly 1200. Rather, the connections may be made to the power electronics module 1210, which then distributes coolant and/or electrical lines out to one or more of a plurality of battery assemblies 1200. In this embodiment, the power electronics module 1210 supports all four battery assemblies 1200, because there are also cables, hoses, and/or cable assemblies 1211 positioned between forward and rear battery assemblies 1200. Accordingly, in this embodiment, the power electronics module 1210 directly interfaces with two of the battery assemblies 1200, and then those two battery assemblies 1200 directly interface with the other two battery assemblies 1200. Various other configurations may be used, such as the single power electronics module 1210 supporting all four battery assemblies 1200 in parallel, the power electronics module 1210 supporting one battery assembly 1200, and then the other three battery assemblies 1200 being supported by the first battery assembly 1200 in series, using more than one power electronics module 1210, with each power electronics module 1210 supporting one or more battery assemblies 1200, and/or the like.

In the configuration of FIG. 12D, if each of the four battery assemblies 100 comprises a capacity of approximately 138 kWh, and if each of the battery assemblies 1200 comprises a capacity of approximately 28 kWh, then the overall system may have a capacity of approximately 667 kWh.

Example Electric Vehicle System

Figure 13:
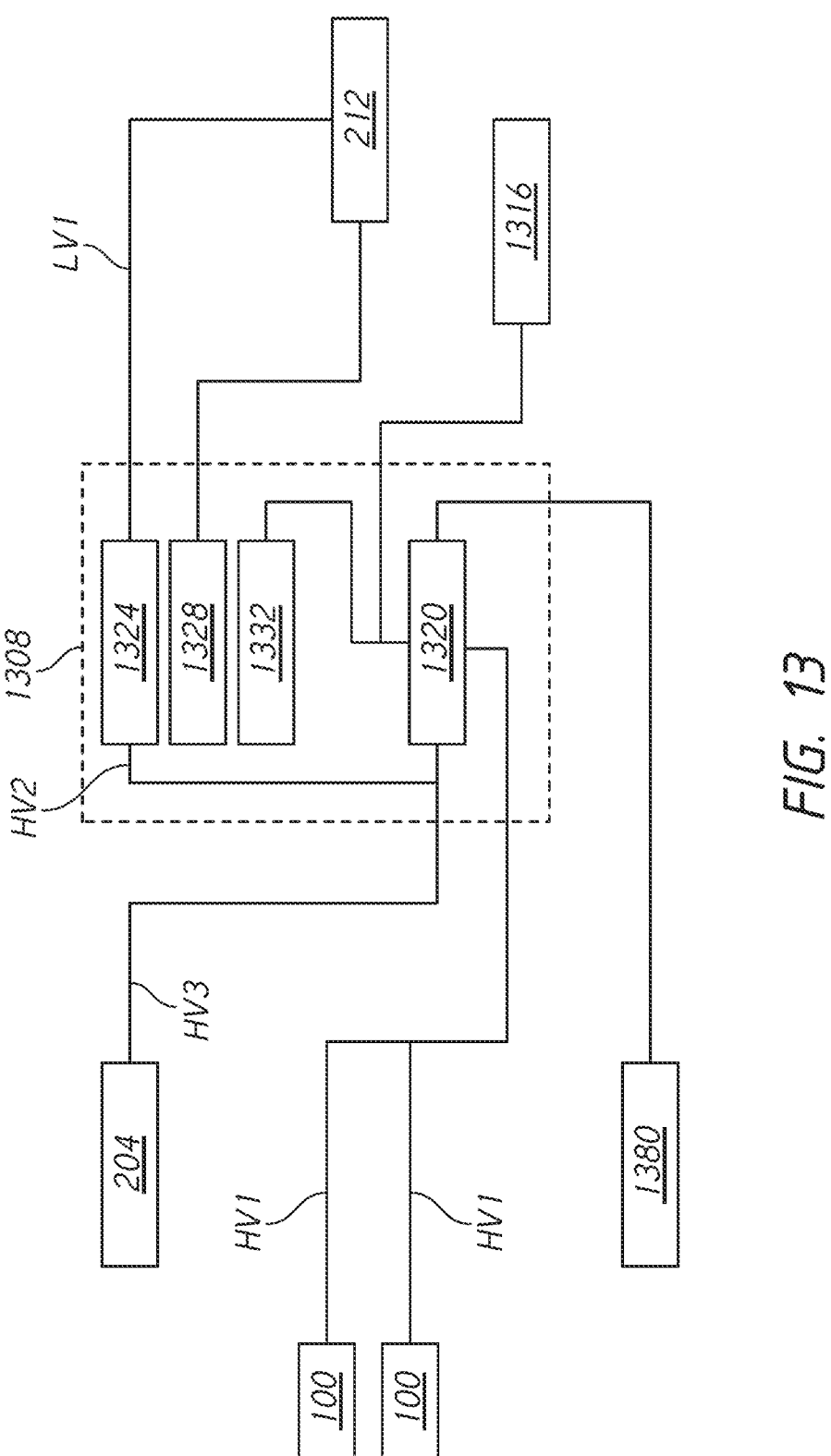
FIG. 13 is an embodiment of a block diagram illustrating certain components of an electric vehicle drive system.

FIG. 13 is a schematic diagram that shows one way of controlling the flow of electrical power through electrical drivetrain systems of, for example, the electric vehicles 200, 300, 400, 500, and 600 discussed above. The system may include one or more battery assemblies 100. The battery assemblies 100 can be coupled independently to a power distribution assembly 1308 via dedicated high voltage cables HV1. The power distribution assembly 1308 can be mounted in various locations of the electric vehicle. The power distribution assembly 1308 can include a power distribution unit 1320 configured to be coupled with the high voltage cables HV1 at a cable junction thereof. The power distribution unit 1320 includes circuits to control the flow of current between the storage of the battery assemblies 100 and loads of the electric drivetrain system. The power distribution unit 1320 outputs current via a high voltage cable HV2 to an inverter 1324. The inverter 1324 outputs current via low voltage cables LV1 to the axle drive assembly 212. The operation of the axle drive assembly 212 is controlled by a powertrain control circuit 1328 supported by the power distribution assembly 1308. The power distribution unit 1320 may be coupled with a range extender module 1332, which can include a fuel cell, additional batteries or other components to generate current to be used to recharge the battery assemblies 100.

The electric drivetrain system can include a charge receptacle 1316. The charge receptacle 1316 can be connected to a high voltage DC power supply to direct current to the power distribution unit 1320 and thereby to the battery assembly 100 or battery assemblies 100.

One or more components of the electric drivetrain system can be operated by a vehicle control unit 1380, which can be used to control the operation of the axle drive assembly 212, the power distribution unit 1320, the inverter 1324, powertrain control circuit 1328, and/or the range extender module 1332. The vehicle control unit 1380 also can control components on the front end accessory component assembly 204 in various configurations.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A battery assembly for an electric vehicle, the battery assembly comprising:
a first housing that defines an interior space, the first housing comprising:
a perimeter frame;
a top cover connected to a top portion of the perimeter frame; and
a bottom cover connected to a bottom portion of the perimeter frame;
wherein the perimeter frame comprises a first plurality of elongate frame members connected together at their ends to form a perimeter of the first housing, the first plurality of elongate frame members comprising at least a forward frame member, a rearward frame member, a first lateral side frame member, and a second lateral side frame member;
wherein at least the first lateral side frame member and the second lateral side frame member comprise a cross-sectional profile configured to at least partially absorb impact loads resulting from a crash, the cross-sectional profile comprising a plurality of braces separated by voids;
a first plurality of battery modules positioned within the interior space of the first housing, each of the first plurality of battery modules comprising one or more battery cells, a positive electric terminal, a negative electric terminal, a coolant inlet, and a coolant outlet;
a first rack structure positioned within the interior space of the first housing and coupled to the perimeter frame, the first rack structure comprising a plurality of support elements that cooperate to retain the first plurality of battery modules with respect to the first housing;
a second housing configured to house a second plurality of battery modules within an interior space of the second housing, the second housing having a second plurality of elongate frame members connected together at their ends to form a perimeter of the second housing;
a mounting bracket assembly for coupling the first housing and the second housing to a vehicle frame, the mounting bracket assembly including:
a housing bracket having a vertically extending portion that comprises one or more openings for receiving one or more fasteners for coupling to respective external vertically extending surfaces of one of the first plurality of elongate frame members and one of the second plurality of elongate frame members, such that the second housing is positioned underneath and adjacent to the first housing.

2. The battery assembly of claim 1, wherein the top cover of the housing is flat.

3. The battery assembly of claim 2, wherein the top portion of the perimeter frame comprises a recessed area that receives the top cover such that the top cover does not extend above the perimeter frame.

4. The battery assembly of claim 2, wherein the top cover comprises a thickness that is no greater than 60% of a thickness of at least the first lateral side frame member and the second lateral side frame member.

5. The battery assembly of claim 1, wherein the bottom cover of the first housing is flat.

6. The battery assembly of claim 5, wherein the bottom portion of the perimeter frame comprises a recessed area that receives the bottom cover such that the bottom cover does not extend below the perimeter frame.

7. The battery assembly of claim 1, wherein the first housing comprises an elongate shape having a length, a width, and a height, wherein at least one of the length or the width is at least 5 times the height.

8. The battery assembly of claim 7, wherein the at least one of the length or the width is at least 8 times the height.

9. The battery assembly of claim 7, wherein both of the length and the width are at least 5 times the height.

10. The battery assembly of claim 1, wherein at least the first lateral side frame member and the second lateral side frame member comprise extruded structures.

11. The battery assembly of claim 10, wherein each of the first plurality of elongate frame members comprise extruded structures.

12. The battery assembly of claim 11, wherein the first plurality of elongate frame members are welded together to form a continuous perimeter.

13. The battery assembly of claim 10, wherein each of the first plurality of elongate frame members comprise extruded aluminum.

14. The battery assembly of claim 1, wherein at least two of the first plurality of elongate frame members comprise an external surface extending along a vertical direction, the external surface comprising one or more mounting bracket fastening features for coupling thereto of a mounting bracket assembly.

15. The battery assembly of claim 14, wherein the one or more mounting bracket fastening features comprise one or more of a hole, a slot, a thread, or a stud.

16. The battery assembly of claim 14, wherein the at least two of the first plurality of elongate frame members comprises the forward frame member and the rearward frame member.

17. The battery assembly of claim 1, wherein the mounting bracket assembly further comprises:
a vehicle bracket configured to be coupled to the vehicle frame; and
one or more vibration dampening assemblies coupling the housing bracket to the vehicle bracket.

18. A battery assembly for an electric vehicle, the battery assembly comprising:
a housing that defines an interior space, the housing comprising:
a perimeter frame comprising a plurality of elongate frame members connected together at their ends to form a perimeter of the housing, the plurality of elongate frame members comprising at least a forward frame member, a rearward frame member, a first lateral side frame member, and a second lateral side frame member, wherein at least the first lateral side frame member and the second lateral side frame member are configured to at least partially absorb impact loads resulting from a crash;

a plurality of battery modules positioned within the interior space of the housing, each of the plurality of battery modules comprising one or more battery cells, a positive electric terminal, a negative electric terminal, a coolant inlet, and a coolant outlet; and a support structure configured to retain the plurality of battery modules with respect to the housing, wherein the plurality of battery modules are grouped into a first bank and a second bank, with a central space positioned between the first bank and the second bank, and with the coolant inlet and the coolant outlet of each of the plurality of battery modules positioned facing the central space; and wherein the battery assembly further comprises one or more coolant lines positioned within the central space, fluidly coupled to the coolant inlets and the coolant outlets of the plurality of battery modules, and fluidly coupleable through the perimeter frame to an externally located coolant pump.

19. The battery assembly of claim 18, wherein the housing has a generally flat, elongate shape having a length, a width, and a height, wherein at least one of the length or the width is at least 5 times the height.

20. A battery assembly for an electric vehicle, the battery assembly comprising:

a housing that defines an interior space, the housing comprising:

a perimeter frame comprising a plurality of elongate frame members connected together at their ends to form a perimeter of the housing, the plurality of elongate frame members comprising at least a forward frame member, a rearward frame member, a first lateral side frame member, and a second lateral side frame member, wherein at least the first lateral side frame member and the second lateral side frame member are configured to at least partially absorb impact loads resulting from a crash;

a plurality of battery modules positioned within the interior space of the housing, each of the plurality of battery modules comprising one or more battery cells;

a support structure configured to retain the plurality of battery modules with respect to the housing; and a power electronics module attached to an external front surface of the forward frame member or to an external rear surface of the rearward frame member, the power electronics module comprising at least battery management system (BMS) components electrically coupleable to the plurality of battery modules to control charging of and power distribution from the plurality of battery modules.

21. The battery assembly of claim 20, wherein the power electronics module is removably attached to the external front surface of the forward frame member or to the external rear surface of the rearward frame member.

22. The battery assembly of claim 20, wherein the power electronics module comprises:

a housing defining an internal cavity that houses the BMS components;

one or more electrical connectors for electrically coupling an electric vehicle drive system to the plurality of battery modules, the one or more electrical connectors being positioned at least partially external to the internal cavity of the power electronics module housing; and a guard member extending laterally from the housing of the power electronics module and positioned such that the one or more electrical connectors are positioned between the guard member and the external front surface of the forward frame member or the external rear surface of the rearward frame member to which the power electronics module is attached.

23. The battery assembly of claim 20, wherein the housing has a generally flat, elongate shape having a length, a width, and a height, wherein at least one of the length or the width is at least 5 times the height.

24. A battery assembly for an electric vehicle, the battery assembly comprising:

a first housing and a second housing that define respective interior spaces, the first housing and the second housing each comprising:

a perimeter frame comprising a plurality of elongate frame members connected together at their ends to form a perimeter, the plurality of elongate frame members comprising at least a forward frame member, a rearward frame member, a first lateral side frame member, and a second lateral side frame member, wherein at least the first lateral side frame member and the second lateral side frame member are configured to at least partially absorb impact loads resulting from a crash;

a first plurality of battery modules positioned within the interior space of the first housing and comprising one or more battery cells;

a second plurality of battery modules positioned within the interior space of the second housing and comprising one or more battery cells;

a first support structure within the first housing configured to retain the first plurality of battery modules with respect to the first housing;

a second support structure within the second housing configured to retain the second plurality of battery modules with respect to the second housing; and a mounting bracket assembly for coupling the first housing and the second housing to a vehicle frame, the mounting bracket assembly including a housing bracket configured to be coupled to an external vertical surface of the first housing and an external vertical surface of the second housing, such that the second housing is positioned underneath and adjacent to the first housing.

25. The battery assembly of claim 24, wherein at least one of the first housing or the second housing has a generally flat, elongate shape having a length, a width, and a height, wherein at least one of the length or the width is at least 5 times the height.

* * * * *